US011658961B2

(12) United States Patent
Ebrahimi et al.

(10) Patent No.: US 11,658,961 B2
(45) Date of Patent: *May 23, 2023

(54) METHOD AND SYSTEM FOR AUTHENTICATED LOGIN USING STATIC OR DYNAMIC CODES

(71) Applicant: Ping Identity Corporation, Denver, CO (US)

(72) Inventors: Armin Ebrahimi, Los Gatos, CA (US); Gaurav Khot, Cupertino, CA (US); Vladimir Reshetnikov, San Jose, CA (US); Robert Gadbois, Los Gatos, CA (US)

(73) Assignee: Ping Identity Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,673

(22) Filed: Sep. 21, 2021

(65) Prior Publication Data

US 2022/0078178 A1    Mar. 10, 2022

Related U.S. Application Data

(63) Continuation of application No. 16/227,632, filed on Dec. 20, 2018, now Pat. No. 11,134,075, which is a (Continued)

(51) Int. Cl.
*H04L 9/40* (2022.01)
*G06F 21/31* (2013.01)
(Continued)

(52) U.S. Cl.
CPC ............ *H04L 63/083* (2013.01); *G06F 21/31* (2013.01); *G06F 21/645* (2013.01);
(Continued)

(58) Field of Classification Search
CPC ....... H04L 9/3247; H04L 9/30; H04L 9/3236; H04L 9/0643; H04L 9/3234;
(Continued)

(56) References Cited

U.S. PATENT DOCUMENTS 5,005,200 A    4/1991    Fischer
5,901,229 A    5/1999    Fujisaki et al.
(Continued)

FOREIGN PATENT DOCUMENTS

JP    2005260490 A    9/2005
JP    2006179016 A    7/2006
(Continued)

OTHER PUBLICATIONS

Eminagaoglu, M. et al., "A Two-Factor Authentication System with QR Codes for Web and Mobile Applications," 2014 Fifth International Conference on Emerging Security Technologies, IEEE, Sep. 2014, pp. 105-112.
(Continued)

*Primary Examiner* — Tae K Kim
(74) *Attorney, Agent, or Firm* — Cooley LLP

(57) ABSTRACT

Method of authentication including sending a login web page to a first device of a user including a scannable code having an envelope ID and a login challenge. The envelope ID generated by an identity manager is associated with a first envelope of data including a session ID. A confirmation login request is received from a second device associated with the user, and includes a second envelope of data comprising the session ID, a user ID, and a seal of the user ID registering the user ID with the identity manager. The confirmation login request to the login challenge is verified using the session ID, and the user is verified using the user ID and seal. User login is authorized upon successful verification of the login challenge and user, and a commu-
(Continued)

nication session having the session ID is established between the web server and the first device.

21 Claims, 28 Drawing Sheets

Related U.S. Application Data continuation of application No. 15/449,902, filed on Mar. 3, 2017, now Pat. No. 10,587,609.

(60) Provisional application No. 62/455,199, filed on Feb. 6, 2017, provisional application No. 62/304,934, filed on Mar. 7, 2016, provisional application No. 62/304,144, filed on Mar. 4, 2016.

(51) Int. Cl.
*G06F 21/64* (2013.01)
*H04L 9/32* (2006.01)
*H04L 9/00* (2022.01)

(52) U.S. Cl.
CPC .......... *H04L 9/3236* (2013.01); *H04L 9/3247* (2013.01); *H04L 9/3271* (2013.01); *H04L 9/3297* (2013.01); *H04L 9/40* (2022.05); *H04L 63/0435* (2013.01); *H04L 63/0442* (2013.01); *H04L 63/061* (2013.01); *H04L 63/08* (2013.01); *H04L 63/0861* (2013.01); *H04L 9/50* (2022.05); *H04L 63/0876* (2013.01)

(58) Field of Classification Search
CPC ....... H04L 9/3242; H04L 9/0825; H04L 9/32; H04L 9/006; H04L 9/0866; H04L 9/0827; H04L 9/0897; H04L 9/3271; H04L 9/3273; H04L 9/321; H04L 2209/38; H04L 63/20

See application file for complete search history.

(56) References Cited

U.S. PATENT DOCUMENTS

| | | | |
|---|---|---|---|
| 5,923,763 A | 7/1999 | Walker et al. | |
| 5,996,076 A | 11/1999 | Rowney et al. | |
| 6,088,717 A | 7/2000 | Reed et al. | |
| 6,310,966 B1 | 10/2001 | Dulude et al. | |
| 6,785,815 B1 | 8/2004 | Serret-Avila et al. | |
| 6,792,536 B1 | 9/2004 | Teppler | |
| 7,043,635 B1 | 5/2006 | Keech | |
| 7,225,161 B2 | 5/2007 | Lam et al. | |
| 7,406,596 B2 | 7/2008 | Tararoukhine et al. | |
| 7,451,116 B2 | 11/2008 | Parmelee et al. | |
| 7,502,467 B2 | 3/2009 | Brainard et al. | |
| 7,873,573 B2 | 1/2011 | Realini | |
| 7,949,606 B1 | 5/2011 | Sweet | |
| 8,056,822 B2 | 11/2011 | Bourrieres et al. | |
| 8,078,880 B2 | 12/2011 | Nanda et al. | |
| 8,249,965 B2 | 8/2012 | Tumminaro | |
| 8,447,967 B1 | 5/2013 | Janacek et al. | |
| 8,502,060 B2 | 8/2013 | Ribner | |
| 8,607,358 B1 | 12/2013 | Shankar et al. | |
| 8,744,076 B2 | 6/2014 | Youn | |
| 8,762,712 B1 | 6/2014 | Kwan et al. | |
| 8,832,807 B1 | 9/2014 | Kuo et al. | |
| 8,874,915 B1 | 10/2014 | Rodoper et al. | |
| 8,966,276 B2 | 2/2015 | Nanopoulos et al. | |
| 9,059,858 B1 | 6/2015 | Giardina et al. | |
| 9,135,787 B1 | 9/2015 | Russell et al. | |
| 9,172,699 B1* | 10/2015 | Vazquez ............. H04L 63/0861 | |
| 9,189,788 B1* | 11/2015 | Robinson ......... G06Q 20/40145 | |
| 9,240,058 B1 | 1/2016 | Amacker et al. | |
| 9,288,047 B2 | 3/2016 | Brouwer et al. | |
| 9,331,856 B1 | 5/2016 | Song | |
| 9,397,985 B1 | 7/2016 | Seger, II et al. | |
| 9,608,822 B2 | 3/2017 | Lochmatter et al. | |
| 9,646,150 B2 | 5/2017 | Toth | |
| 9,679,276 B1 | 6/2017 | Cuende | |
| 9,722,790 B2 | 8/2017 | Ebrahimi | |
| 9,876,646 B2* | 1/2018 | Ebrahimi ............. H04L 9/3263 | |
| 9,887,975 B1* | 2/2018 | Gifford ............. H04W 12/0431 | |
| 9,917,828 B2 | 3/2018 | Byrum et al. | |
| 9,948,467 B2 | 4/2018 | King | |
| 10,007,826 B2 | 6/2018 | Ebrahimi et al. | |
| 10,007,913 B2 | 6/2018 | Ebrahimi | |
| 10,108,954 B2 | 10/2018 | Dunlevy et al. | |
| 10,110,385 B1 | 10/2018 | Rush et al. | |
| 10,163,105 B1* | 12/2018 | Ziraknejad ......... G06Q 20/3274 | |
| 10,255,419 B1* | 4/2019 | Kragh ..................... G06F 21/32 | |
| 10,257,179 B1* | 4/2019 | Saylor ................ H04W 12/068 | |
| 10,341,091 B2 | 7/2019 | Keranen et al. | |
| 10,341,123 B2 | 7/2019 | Ebrahimi et al. | |
| 10,417,219 B1 | 9/2019 | Yang et al. | |
| 10,498,541 B2 | 12/2019 | Ebrahimi et al. | |
| 10,498,542 B2 | 12/2019 | Ebrahimi et al. | |
| 10,509,932 B2 | 12/2019 | Ebrahimi et al. | |
| 10,554,654 B1 | 2/2020 | Ramanathan et al. | |
| 10,587,609 B2 | 3/2020 | Ebrahimi et al. | |
| 10,657,532 B2 | 5/2020 | Ebrahimi | |
| 10,740,584 B2 | 8/2020 | Ebrahimi et al. | |
| 10,805,085 B1 | 10/2020 | Liang | |
| 10,979,227 B2 | 4/2021 | Ebrahimi | |
| 11,025,626 B1 | 6/2021 | Todd et al. | |
| 11,030,187 B1 | 6/2021 | Boodman et al. | |
| 11,062,106 B2 | 7/2021 | Ebrahimi et al. | |
| 11,082,221 B2 | 8/2021 | Ebrahimi et al. | |
| 11,134,075 B2 | 9/2021 | Ebrahimi et al. | |
| 11,206,133 B2 | 12/2021 | Ebrahimi et al. | |
| 11,263,415 B2 | 3/2022 | Ebrahimi et al. | |
| 11,323,272 B2 | 5/2022 | Ebrahimi et al. | |
| 2001/0011350 A1 | 8/2001 | Zabetian | |
| 2002/0016913 A1 | 2/2002 | Wheeler et al. | |
| 2002/0071565 A1 | 6/2002 | Kurn et al. | |
| 2002/0138735 A1 | 9/2002 | Felt et al. | |
| 2002/0141593 A1 | 10/2002 | Kurn et al. | |
| 2002/0170966 A1 | 11/2002 | Hannigan et al. | |
| 2003/0014372 A1 | 1/2003 | Wheeler et al. | |
| 2003/0037261 A1 | 2/2003 | Meffert et al. | |
| 2003/0046159 A1 | 3/2003 | Ebrahimi et al. | |
| 2003/0070075 A1 | 4/2003 | Deguillaume et al. | |
| 2003/0172273 A1 | 9/2003 | Hans | |
| 2004/0064693 A1 | 4/2004 | Pabla et al. | |
| 2005/0039040 A1 | 2/2005 | Ransom et al. | |
| 2005/0091495 A1 | 4/2005 | Cameron et al. | |
| 2005/0114447 A1 | 5/2005 | Cameron et al. | |
| 2006/0041756 A1 | 2/2006 | Ashok et al. | |
| 2006/0071077 A1 | 4/2006 | Suomela et al. | |
| 2006/0075255 A1* | 4/2006 | Duffy ................... H04L 9/3236 | |
| | | | 713/186 |
| 2006/0256961 A1 | 11/2006 | Brainard et al. | |
| 2007/0016785 A1 | 1/2007 | Guay et al. | |
| 2007/0017996 A1 | 1/2007 | Xia et al. | |
| 2007/0033150 A1* | 2/2007 | Nwosu ................... G06Q 20/12 | |
| | | | 705/76 |
| 2007/0118479 A1 | 5/2007 | Halsema et al. | |
| 2007/0277013 A1 | 11/2007 | Rexha et al. | |
| 2007/0294538 A1 | 12/2007 | Lim et al. | |
| 2008/0078836 A1 | 4/2008 | Tomita | |
| 2008/0116277 A1 | 5/2008 | Tomita | |
| 2008/0155253 A1 | 6/2008 | Liu | |
| 2008/0178008 A1 | 7/2008 | Takahashi et al. | |
| 2008/0235772 A1 | 9/2008 | Janzen | |
| 2008/0267511 A1 | 10/2008 | Bourrieres et al. | |
| 2009/0066478 A1* | 3/2009 | Colella .................. G06Q 30/04 | |
| | | | 340/5.83 |
| 2009/0132813 A1 | 5/2009 | Schibuk | |
| 2009/0232346 A1 | 9/2009 | Zilch | |
| 2009/0266882 A1 | 10/2009 | Sajkowsky | |
| 2010/0020970 A1 | 1/2010 | Liu et al. | |
| 2010/0023758 A1 | 1/2010 | Han et al. | |
| 2010/0052852 A1* | 3/2010 | Mohanty ................ G07C 9/257 | |
| | | | 380/243 |

(56) References Cited

U.S. PATENT DOCUMENTS

| | | |
|---|---|---|
| 2010/0070759 A1 | 3/2010 | Cobos et al. |
| 2010/0088517 A1 | 4/2010 | Piersol |
| 2010/0100724 A1 | 4/2010 | Kaliski, Jr. |
| 2010/0191972 A1 | 7/2010 | Kiliccote |
| 2010/0228674 A1 | 9/2010 | Ogg et al. |
| 2010/0250939 A1 | 9/2010 | Adams et al. |
| 2010/0272193 A1 | 10/2010 | Khan et al. |
| 2011/0093249 A1 | 4/2011 | Holmes et al. |
| 2011/0121066 A1 | 5/2011 | Tian et al. |
| 2011/0231913 A1 | 9/2011 | Feng et al. |
| 2011/0286595 A1 | 11/2011 | Resch et al. |
| 2011/0302412 A1 | 12/2011 | Deng et al. |
| 2011/0307703 A1 | 12/2011 | Ogg et al. |
| 2012/0061461 A1 | 3/2012 | Bourrieres et al. |
| 2012/0067943 A1 | 3/2012 | Saunders et al. |
| 2012/0086971 A1 | 4/2012 | Bisbee et al. |
| 2012/0125997 A1 | 5/2012 | Burra et al. |
| 2012/0137131 A1 | 5/2012 | Lu et al. |
| 2012/0185398 A1 | 7/2012 | Weis et al. |
| 2012/0211567 A1 | 8/2012 | Herzig |
| 2012/0297190 A1* | 11/2012 | Shen ............... H04L 9/0866 713/168 |
| 2012/0297464 A1 | 11/2012 | Busch et al. |
| 2012/0308003 A1 | 12/2012 | Mukherjee |
| 2013/0010958 A1 | 1/2013 | Yao |
| 2013/0014152 A1 | 1/2013 | Johnson et al. |
| 2013/0037607 A1 | 2/2013 | Bullwinkel |
| 2013/0065564 A1 | 3/2013 | Conner et al. |
| 2013/0111208 A1 | 5/2013 | Sabin et al. |
| 2013/0145152 A1 | 6/2013 | Maino et al. |
| 2013/0153666 A1 | 6/2013 | Edwards |
| 2013/0159021 A1 | 6/2013 | Felsher |
| 2013/0173915 A1* | 7/2013 | Haulund ............ H04L 63/18 713/155 |
| 2013/0198822 A1* | 8/2013 | Hitchcock ......... G06F 21/335 726/5 |
| 2013/0228624 A1 | 9/2013 | Byrd et al. |
| 2013/0246261 A1 | 9/2013 | Purves et al. |
| 2013/0262309 A1 | 10/2013 | Gadotti |
| 2013/0262857 A1* | 10/2013 | Neuman ............ H04L 63/083 713/155 |
| 2013/0290733 A1 | 10/2013 | Branton et al. |
| 2013/0305059 A1* | 11/2013 | Gormley ............. G07F 7/08 713/189 |
| 2013/0311768 A1* | 11/2013 | Fosmark ........... G06Q 20/027 713/170 |
| 2013/0318354 A1 | 11/2013 | Entschew et al. |
| 2013/0333009 A1 | 12/2013 | Mackler |
| 2014/0001253 A1 | 1/2014 | Smith |
| 2014/0006247 A1 | 1/2014 | Chai et al. |
| 2014/0006806 A1 | 1/2014 | Corella et al. |
| 2014/0032913 A1 | 1/2014 | Tenenboym et al. |
| 2014/0084067 A1 | 3/2014 | Vanderhulst |
| 2014/0093144 A1* | 4/2014 | Feekes ............ G06V 40/1365 382/124 |
| 2014/0188790 A1 | 7/2014 | Hunter |
| 2014/0208403 A1 | 7/2014 | Lu et al. |
| 2014/0223175 A1* | 8/2014 | Bhatnagar .......... H04L 63/18 713/159 |
| 2014/0237565 A1 | 8/2014 | Fleysher |
| 2014/0254796 A1* | 9/2014 | Li ................... H04L 9/3263 380/246 |
| 2014/0256423 A1 | 9/2014 | Williams et al. |
| 2014/0282961 A1* | 9/2014 | Dorfman .......... G06Q 20/3276 726/7 |
| 2014/0289842 A1* | 9/2014 | Cornick ............ G06F 21/32 726/19 |
| 2014/0304517 A1 | 10/2014 | Chidambaram et al. |
| 2014/0344015 A1 | 11/2014 | Puertolas-Montanes et al. |
| 2015/0019456 A1 | 1/2015 | Smith |
| 2015/0047000 A1* | 2/2015 | Spencer, III ........ H04L 63/18 726/7 |
| 2015/0081567 A1 | 3/2015 | Boyle et al. |
| 2015/0095352 A1 | 4/2015 | Lacey |
| 2015/0095999 A1 | 4/2015 | Toth |
| 2015/0104013 A1 | 4/2015 | Holman et al. |
| 2015/0106626 A1 | 4/2015 | Kremp et al. |
| 2015/0178515 A1 | 6/2015 | Cooley et al. |
| 2015/0244690 A1 | 8/2015 | Mossbarger |
| 2015/0262138 A1 | 9/2015 | Hudon |
| 2015/0269389 A1 | 9/2015 | Lee |
| 2015/0269614 A1 | 9/2015 | Kramer |
| 2015/0278805 A1* | 10/2015 | Spencer, III ....... G06Q 20/3274 705/44 |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2016/0005032 A1 | 1/2016 | Yau et al. |
| 2016/0012465 A1 | 1/2016 | Sharp |
| 2016/0028452 A1 | 1/2016 | Chu et al. |
| 2016/0028552 A1 | 1/2016 | Spanos et al. |
| 2016/0072800 A1 | 3/2016 | Soon-Shiong et al. |
| 2016/0094348 A1 | 3/2016 | Takahashi |
| 2016/0098723 A1 | 4/2016 | Feeney |
| 2016/0098730 A1 | 4/2016 | Feeney |
| 2016/0125416 A1* | 5/2016 | Spencer ............ G06Q 20/3829 705/71 |
| 2016/0134593 A1 | 5/2016 | Gvili |
| 2016/0162897 A1 | 6/2016 | Feeney |
| 2016/0180338 A1 | 6/2016 | Androulaki et al. |
| 2016/0203572 A1 | 7/2016 | McConaghy et al. |
| 2016/0212146 A1 | 7/2016 | Wilson |
| 2016/0217356 A1* | 7/2016 | Wesby ............... G07D 7/004 |
| 2016/0217436 A1 | 7/2016 | Brama |
| 2016/0261411 A1 | 9/2016 | Yau et al. |
| 2016/0269403 A1* | 9/2016 | Koutenaei .......... H04L 63/102 |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1* | 10/2016 | Moss-Pultz ........ G06Q 20/3829 |
| 2016/0314462 A1 | 10/2016 | Hong et al. |
| 2016/0328713 A1 | 11/2016 | Ebrahimi |
| 2016/0330027 A1 | 11/2016 | Ebrahimi |
| 2016/0330035 A1* | 11/2016 | Ebrahimi ........... H04L 9/3263 |
| 2016/0337351 A1* | 11/2016 | Spencer ............ H04L 63/0876 |
| 2016/0351080 A1 | 12/2016 | Bhatnagar et al. |
| 2016/0373440 A1* | 12/2016 | Mather ............. G06F 21/6218 |
| 2017/0041296 A1 | 2/2017 | Ford et al. |
| 2017/0048252 A1 | 2/2017 | Straub et al. |
| 2017/0085377 A1 | 3/2017 | Pogmore et al. |
| 2017/0103389 A1 | 4/2017 | Sorensen et al. |
| 2017/0109735 A1 | 4/2017 | Sheng et al. |
| 2017/0180128 A1 | 6/2017 | Lu |
| 2017/0200160 A1 | 7/2017 | Kumar et al. |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1* | 9/2017 | Ebrahimi ........... H04L 63/083 |
| 2017/0279788 A1 | 9/2017 | Rosenblum et al. |
| 2017/0324711 A1 | 11/2017 | Feeney et al. |
| 2017/0344987 A1 | 11/2017 | Davis |
| 2017/0344988 A1 | 11/2017 | Cusden et al. |
| 2017/0346851 A1* | 11/2017 | Drake ............... H04L 9/0838 |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0019879 A1 | 1/2018 | Kravitz et al. |
| 2018/0068103 A1 | 3/2018 | Pitkanen et al. |
| 2018/0077144 A1 | 3/2018 | Gangawane et al. |
| 2018/0082050 A1* | 3/2018 | Flink ............... H04L 9/3228 |
| 2018/0082256 A1 | 3/2018 | Tummuru et al. |
| 2018/0083771 A1 | 3/2018 | Bonnell |
| 2018/0144153 A1 | 5/2018 | Pead |
| 2018/0173906 A1* | 6/2018 | Rodriguez .......... G06Q 40/00 |
| 2018/0176017 A1* | 6/2018 | Rodriguez .......... H04L 63/20 |
| 2018/0205556 A1 | 7/2018 | Rieul |
| 2018/0240107 A1 | 8/2018 | Andrade |
| 2018/0248699 A1* | 8/2018 | Andrade ............ H04L 9/0897 |
| 2018/0308098 A1 | 10/2018 | Ebrahimi |
| 2018/0343120 A1* | 11/2018 | Andrade ............ H04L 9/0637 |

(56) References Cited

U.S. PATENT DOCUMENTS

| | | | |
|---|---|---|---|
| 2018/0359103 A1* | 12/2018 | Geupel | H04L 9/3273 |
| 2019/0005470 A1 | 1/2019 | Uhr et al. | |
| 2019/0007381 A1 | 1/2019 | Isaacson et al. | |
| 2019/0149537 A1 | 5/2019 | Ebrahimi et al. | |
| 2019/0163896 A1 | 5/2019 | Balaraman et al. | |
| 2019/0182042 A1 | 6/2019 | Ebrahimi et al. | |
| 2019/0228178 A1 | 7/2019 | Sharma et al. | |
| 2019/0342096 A1* | 11/2019 | Starosielsky | H04L 63/0428 |
| 2019/0372956 A1 | 12/2019 | Breu | |
| 2020/0127826 A1 | 4/2020 | Ebrahimi et al. | |
| 2020/0127832 A1 | 4/2020 | Ebrahimi | |
| 2020/0145219 A1* | 5/2020 | Sebastian | G06F 21/32 |
| 2020/0186505 A1 | 6/2020 | Amar et al. | |
| 2020/0265202 A1 | 8/2020 | Ebrahimi et al. | |
| 2020/0267003 A1 | 8/2020 | Ebrahimi et al. | |
| 2020/0344062 A1 | 10/2020 | Haldar et al. | |
| 2021/0064780 A1 | 3/2021 | Riedel et al. | |
| 2021/0192166 A1 | 6/2021 | Ebrahimi et al. | |
| 2021/0334808 A1 | 10/2021 | Ebrahimi | |
| 2021/0406495 A1 | 12/2021 | Ebrahimi et al. | |
| 2022/0029799 A1 | 1/2022 | Subudhi et al. | |
| 2022/0029802 A1 | 1/2022 | Ebrahimi et al. | |
| 2022/0029807 A1 | 1/2022 | Ebrahimi | |
| 2022/0255737 A1 | 8/2022 | Ebrahimi et al. | |
| 2022/0327304 A1 | 10/2022 | Ebrahimi et al. | |
| 2022/0337419 A1 | 10/2022 | Ebrahimi | |
| 2022/0342973 A1 | 10/2022 | Ebrahimi | |
| 2022/0407720 A1 | 12/2022 | Ebrahimi et al. | |

FOREIGN PATENT DOCUMENTS

| | | |
|---|---|---|
| JP | 2008518335 A | 5/2008 |
| JP | 2012114907 A | 6/2012 |
| KR | 20130055794 A | 5/2013 |
| WO | WO-2016179334 A1 | 11/2016 |
| WO | WO-2017152150 A1 | 9/2017 |
| WO | WO-2018145127 A1 | 8/2018 |
| WO | WO-2019113552 A1 | 6/2019 |

OTHER PUBLICATIONS

Extended European Search Report for European Application No. 21181229.2, dated Jan. 14, 2022, 9 pages.

Office Action for U.S. Appl. No. 17/370,731, dated Apr. 25, 2022, 12 pages.

Office Action for U.S. Appl. No. 17/738,106, dated Jul. 11, 2022, 11 pages.

Panchamia, S. et al., "Passport, VISA and Immigration Management using Blockchain," 2017 23rd Annual Conference on Advanced Computing and Communications, 2018, 10 pages.

Partial European Search Report for European Application No. 22156663.1, dated Jun. 3, 2022, 10 pages.

Stallings, W, Chapter 10: Digital Signatures and Authentication Protocols in: Cryptography and network security: Principles and Practice, Second Edition, p. 299-314, 1998.

Vapen, A. et al., "2-clickAuth Optical Challenge-Response Authentication," 2010 International Conference on Availability, Reliability, and Security, IEEE, Piscataway, NJ, Feb. 2010, pp. 79-86.

Extended European Search Report for European Application No. 22156663.1, dated Sep. 7, 2022, 9 pages.

Barreto, P. S. L. M. et al., (2001) "Fast hashing onto elliptic curves over fields of characteristic 3," [Online], Cryptology ePrint Archive: Report 2001/098, Retrieved from the Internet: URL: https://eprint.iacr.org/2001/098/, 12 pages.

Biggs, J., "Your Next Passport Could Be on the Blockchain", Oct. 31, 2014, 6 pages.

Boneh, D. et al., (2001) "Short signatures from the Weil pairing," International Conference on the Theory and Application of Cryptology and Information Security, ASIACRYPT 2001: Advances in Cryptology, [Online], Retrieved from the Internet: URL: https://www.iacr.org/archive/asiacrypt2001/22480516.pdf, pp. 516-534.

Dillet, R., "Stampery Now Lets You Certify Documents Using the Blockchain and Your Real Identity," Nov. 20, 2015, 6 pages.

Drew-Cordell, "Developer Creates Blockchain Passport Technology Based on Bitcoin", Oct. 31, 2014, 16 pages.

Ellis, C., "Create Your Own Blockchain ID", Bitnation, Oct. 24, 2014, 14 pages.

Ellison, C. et al., (2000) "Ten risks of PKI: What you're not being told about public key infrastructure," Computer Security Journal, vol. 16, No. 1, pp. 1-8.

Extended European Search Report for European Application No. 16790050.5, dated Apr. 26, 2018, 10 pages.

Extended European Search Report for European Application No. 17760964.1, dated Oct. 24, 2019, 11 pages.

Extended European Search Report for European Application No. 18885688.4, dated Jul. 23, 2021, 5 pages.

GitHub, Inc., "World Citizenship, Creating Affordable Decentralised Passport Services Using Available Cryptographic Tools," (Oct. 2014), Retrieved from the Internet on Nov. 17, 2017, URL: https://github.com/MrChrisJ/World-Citizenship, 12 pages.

Gupta, V., "State in a Box—Identity Services Architecture," CheapID, 2006-2009, 42 pages.

International Search Report and Written Opinion for International Application No. PCT/US2016/030863, dated Sep. 14, 2016, 9 pages.

International Search Report and Written Opinion for International Application No. PCT/US2017/020829, dated Jul. 17, 2017, 12 pages.

International Search Report and Written Opinion for International Application No. PCT/US2018/017136, dated Apr. 26, 2018, 12 pages.

International Search Report and Written Opinion for International Application No. PCT/US2018/064623, dated May 14, 2019, 7 pages.

Kirk, J., "Could the Bitcoin network be used as an ultrasecure notary service?", IDG News Service, Computerworld, Inc., May 23, 2013, 3 pages.

Menezes, A. J. et al., Chapter 9: Handbook of Applied Cryptography, CRC Press, Boca Raton, FL, pp. 321-383 (Oct. 1996).

Nakamoto, S., "Bitcoin: A peer-to-peer electronic cash system," Retrieved from the Internet: <url:<a href="http://www.bitcoin.org">http://www.bitcoin.org, Jan. 2009, 9 pages</url:.<a>.

Notice of Reasons for Refusal for Japanese Application No. 2018-510317, dated Sep. 1, 2020, 6 pages.

Office Action for European Application No. 16790050.5, dated Nov. 21, 2019, 7 pages.

Office Action for European Application No. 17760964.1, dated Oct. 20, 2020, 3 pages.

Office Action for U.S. Appl. No. 15/146,872, dated Jun. 15, 2017, 12 pages.

Office Action for U.S. Appl. No. 15/146,872, dated Sep. 27, 2016, 8 pages.

Office Action for U.S. Appl. No. 15/146,881, dated Oct. 13, 2016, 8 pages.

Office Action for U.S. Appl. No. 15/208,580, dated Jul. 7, 2017, 9 pages.

Office Action for U.S. Appl. No. 15/208,580, dated Mar. 21, 2017, 8 pages.

Office Action for U.S. Appl. No. 15/208,580, dated Oct. 25, 2017, 9 pages.

Office Action for U.S. Appl. No. 15/449,902, dated Jun. 19, 2019, 10 pages.

Office Action for U.S. Appl. No. 15/640,795, dated May 24, 2019, 8 pages.

Office Action for U.S. Appl. No. 15/784,093, dated Apr. 15, 2019, 11 pages.

Office Action for U.S. Appl. No. 15/784,093, dated Nov. 29, 2018, 9 pages.

Office Action for U.S. Appl. No. 15/878,353, dated Aug. 8, 2018, 14 pages.

Office Action for U.S. Appl. No. 16/018,773, dated Apr. 30, 2021, 45 pages.

Office Action for U.S. Appl. No. 16/018,773, dated Jul. 28, 2020, 34 pages.

(56) References Cited

OTHER PUBLICATIONS

Office Action for U.S. Appl. No. 16/019,411, dated Apr. 12, 2019, 12 pages.
Office Action for U.S. Appl. No. 16/019,411, dated Sep. 16, 2019, 9 pages.
Office Action for U.S. Appl. No. 16/214,029, dated Apr. 30, 2021, 22 pages.
Office Action for U.S. Appl. No. 16/214,029, dated Oct. 22, 2020, 24 pages.
Office Action for U.S. Appl. No. 16/227,632, dated Oct. 27, 2020, 9 pages.
Office Action for U.S. Appl. No. 16/656,459, dated Sep. 24, 2020, 8 pages.
Office Action for U.S. Appl. No. 16/697,110, dated Aug. 4, 2020, 7 pages.
Office Action for U.S. Appl. No. 16/697,131, dated Apr. 26, 2021, 6 pages.
Office Action for U.S. Appl. No. 16/697,131, dated Oct. 16, 2020, 12 pages.
Office Action for U.S. Appl. No. 16/986,817, dated Apr. 6, 2021, 10 pages.
Office Action for U.S. Appl. No. 17/121,971, dated Sep. 15, 2022, 13 pages.

* cited by examiner

Simplified Bitcoin Block Chain

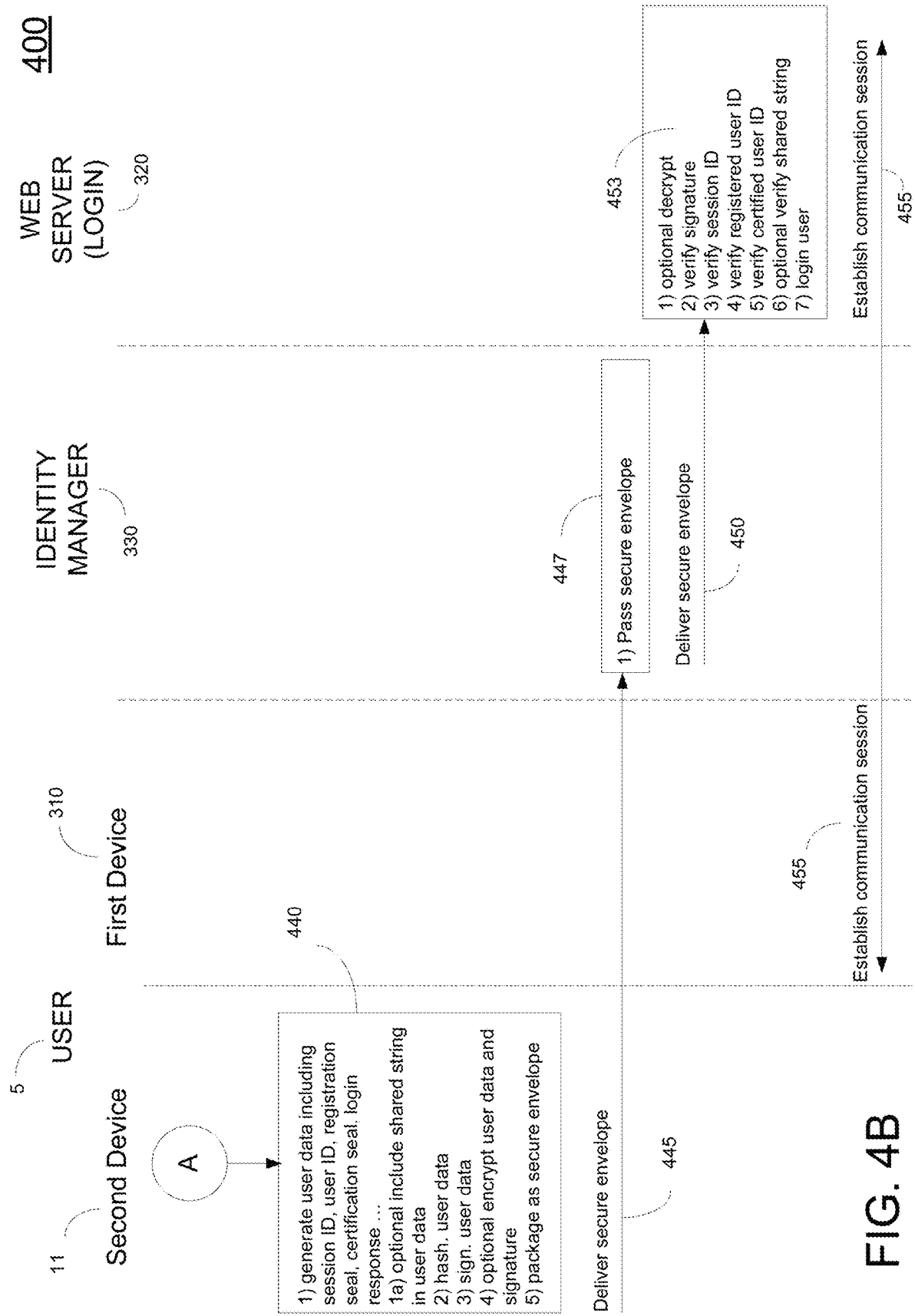

```
POST /adp/v1/shocards/:id/qrcode
{
.."ss_id": "klny10vsy",
.."ID": "n46zreRgf4zBQF9BvHDMSeT3bnHN1FZ9h1",
.."data":{
...."shocardid_er": "mmJWJS5Vp7iZzZcGPEL8qpaF459QewSNZZ",
...."shocardid_be": "n46zreRGf4zBQF9BvHDMSeT3bnHN1FZ9h1",
...."name": "ShoCard Client Demo Site",
...."email": "information@shocardemo.com",
...."audit_number": "1234"
..}
.."action": "certify"
}
```
— 632

```
POST :callback/verify
{
.."user": {
...."shocardid": "mtkJLiJGq9C9qWcBRu1EUDrgyjpbKXwRS5",
...."name": "ROBET GADBOIS",
...."data":{
......"usd.MIDDLE NAME": "LEON",
......"usd.LAST NAME": "GADBOIS",
......"usd.ISSUING COUNTRY": "USA",
......"usd.ID NUMBER": "XXXXXXX",
......"usd.FIRST NAME": "ROBERT",
....}
..},
.."state": "new"
.."site": {
...."ssid": "{"sigenc":["XXXX=="], "shocardid":"n46zreRGf4zBQF9BvHDMSeT3bnHN1FZ9h1"}",
...."shocardid_er": "mmJWJS5Vp7iZzZcGPEL8qpaF459QewSNZ2",
...."shocardid_be": "n46zreRGf4zBQF9BvHDMSeT3bnHN1FZ9h1",
...."name": "ShoCard Client Demo Site",
...."email": "information@shocardemo.com",
...."audit_number": "1234"
..}
.."id": "mmJWJS5Vp7iZzZcGPEL8qpaF459QewSNZ2",
.."action": "certify"
}
```
— 633

FIG. 6C

```
200 OK
{
.."state": "accept",
.."verified_fields": "usd.ID NUMBER", "usd.FIRST NAME", "usd.LAST NAME", "usd.CITY"
}
```
— 634

```
POST :callback/notify
{
.."version": "1"
.."username_er": "Acme Networks",
.."username_ee": "ROBET GADBOIS",
.."timestamp": 1449640106,
.."site": {
...."ssid": "{"sigenc":["XXXX=="], "shocardid":""n46zreRGf4zBQF9BvHDMSeT3bnHN1FZ9h1"}",
...."shocardid_er": "mmJWJS5Vp7iZzZcGPEL8qpaF459QewSNZ2",
...."shocardid_be": "n46zreRGf4zBQF9BvHDMSeT3bnHN1FZ9h1",
...."name": "ShoCard Client Demo Site",
...."email": "robert@shocard.com",
...."audit_number": "1234"
..},
.."shocardid_er": "mmJWJS5Vp7iZzZcGPEL8qpaF459QewSNZ2",
.."shocardid_ee": "mtkJLiJGq9C9qWcBRu1EUDrgyjpbKXwRS5",
.."shocardid_be": "n46zreRGf4zBQF9BvHDMSeT3bnHN1FZ9h1",
...."fields": ["usd.CITY", "usd.FIRST NAME", "usd.LAST NAME", "usd.ID NUMBER"]

}
```
— 635

```
registration page:
Displays the User's ShocardId
Completes the binding of the shocardId
to the website's user
```
— 636

FIG. 6D

METHOD AND SYSTEM FOR AUTHENTICATED LOGIN USING STATIC OR DYNAMIC CODES

CLAIM OF PRIORITY

This application is a continuation of U.S. patent application Ser. No. 16/227,632, filed on Dec. 20, 2018, entitled "Method and System for Authenticated Login Using Static or Dynamic Codes," now U.S. Pat. No. 11,134,075, which is a continuation of U.S. patent application Ser. No. 15/449,902, filed on Mar. 3, 2017 (now U.S. Pat. No. 10,587,609), entitled "Method and System for Authenticated Login Using Static or Dynamic Codes," which claims priority to and the benefit of U.S. Provisional Patent Application No. 62/304,144, entitled "Identity Management Service Using a Blockchain Database," filed on Mar. 4, 2016, each of which are hereby incorporated by reference in their entireties. This application is a continuation of U.S. patent application Ser. No. 15/449,902, filed on Mar. 3, 2017 (now U.S. Pat. No. 10,587,609), entitled "Method and System for Authenticated Login Using Static or Dynamic Codes," which claims priority to and the benefit of U.S. Provisional Patent Application No. 62/304,934, entitled "Identity Management Service Using a Blockchain," filed on Mar. 7, 2016, each of which are hereby incorporated by reference in their entireties. This application is a continuation of U.S. patent application Ser. No. 15/449,902, filed on Mar. 3, 2017 (now U.S. Pat. No. 10,587,609), entitled "Method and System for Authenticated Login Using Static or Dynamic Codes," which claims priority to and the benefit of U.S. Provisional Patent Application No. 62/455,199, entitled "Electronic Identification Verification Methods and Systems," filed on Feb. 6, 2017, each of which are hereby incorporated by reference in their entireties.

TECHNICAL FIELD

The present embodiments relate to methods, systems, and programs for managing the identify of users and of identifying those users to third parties, and more particularly, performing authentication and login processes using a blockchain to authenticate a user during a login process to access a web page through interactions with multiple user devices.

BACKGROUND

Identity theft causes tens of billions of dollars in losses every year. In an effort to combat identity theft, systems and methods for identifying users to third parties have been developed. In a common two factor application, a user presents a bank card or credit card in addition to the personal identification number ("PIN") corresponding to the card. In other systems, a user provides a password to identify himself/herself and may be given a Short Message Service (SMS) text message with a unique code that the user must recite for access. In still other systems, a user may be given challenge questions to verify his/her identity. Each of these systems, however, is subject to attack and ultimate defeat from a basic security breach.

It would be advantageous to have a more secure system and method for managing the identity of users and of identifying users to third parties, such as when performing login or user authentication.

It is in this context that embodiments arise.

SUMMARY

The present embodiments relate to solving one or more problems found in the related art, and specifically to provide for login without requiring a user to enter a username and password. In particular, methods and systems are presented for authenticated login, registration and call center validation. Other methods and systems are presented for scanning a dynamic code on a browser screen to authorize user login. Still other methods and systems are presented for certified user generated data (e.g., biometrics). It should be appreciated that the present embodiments can be implemented in numerous ways, such as a method, an apparatus, a system, a device, or a computer program on a computer readable medium. Several embodiments are described below.

In one embodiment, a method for authentication being performed at a web server providing web access is disclosed. For example, the method is performed when implementing a login process to a web portal of a web server. The method includes sending a login web page to a first device associated with a user. The login web page may have been requested by the user. The login web page includes a scannable code including an envelope ID and a login challenge. The envelope ID is associated with a first envelope of data including a session ID, wherein the envelope ID is generated by an identity manager at the request of the web server. The method includes receiving a confirmation login request responding to the login challenge from a second device associated with the user, wherein the confirmation login request includes a second envelope of data including the session ID, a user ID, and a seal of the user ID registering the user ID with the identity manager. The method includes verifying the confirmation login request to the login challenge using the session ID from the confirmation login request. The method includes verifying the user using the user ID and seal. The method includes authorizing user login upon successful verification of the login challenge and user. The method includes establishing a communication session having the session ID between the web server and the first device when the login is authorized.

In another embodiment, a method for authentication, such as for requesting login access to a web portal of a web server, being performed at a second device of a user that includes scanning a dynamic code on a browser screen that is implemented to enhance a user login process is disclosed. The method includes scanning a first scannable code on a login web page of a web server displayed on a first device associated with the user. The scannable code includes an envelope ID and a login challenge, wherein the envelope ID is associated with a first envelope of data generated by the web server, wherein the envelope of data includes a session ID. The envelope ID is generated by an identity manager at the request of the web server, and is used to request the first envelope of data from the identity manager. The method includes generating a challenge envelope of data including a shared-string generated by the second device, a first digital signature of a hash of the shared-string and a user ID using a private key of the user. The method includes sending the challenge envelope of data to the web server over a network. The method includes scanning a second scannable code on an updated login web page displayed on the first device. The second scannable code includes a challenge response including the shared-string and a second digital signature of a hash of the shared-string using a private key of the web server. The method includes verifying the second digital signature using a public key of the web server. The method includes generating a confirmation login request responding to the login challenge. The confirmation login request includes a second envelope of data including the shared-string, the session ID, the user ID, and a seal of the user ID registering the user ID with the identity manager; added to this second envelope of data is a digital signature of a hash of the data fields included using a private key of the user. The method includes sending the confirmation login request to the web server via the identity manager for authentication and login of the user with the web server.

In still another embodiment, a method of authentication implementing the certification of user generated data (e.g., biometrics) is disclosed. For example, the method may be performed by an authenticating entity of a web server, such as when authenticating a user (e.g., to control access to products and/or services). The method includes receiving from a device of a user a user envelope of data that includes user data and a unique session ID issued by the server and a first signature of a hash of the user data signed and the session ID by a private key of the user, wherein the user data includes a user ID, newly created biometric data, newly presented original biometric data associated with the newly created biometric data, validating seal associated with the original biometric data including a first transaction number of a first blockchain, and a certifying seal associated with the original biometric data including a second transaction number of a second blockchain. The method includes verifying the first signature using the public key of the user. The method includes verifying the certification of the original biometric data using the certifying seal and the newly presented original biometric.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 4A-4B illustrates a data flow for performing authentication and login onto a web portal of a web server as illustrated in FIG. 3, wherein two devices of the user interacts with the web server for authentication purposes, in accordance with one embodiment of the present disclosure.

FIGS. 6A-6D are diagrams illustrating a process for registering new users to a service provider website, in accordance with one embodiment of the present disclosure.

DETAILED DESCRIPTION

Figure 1A:
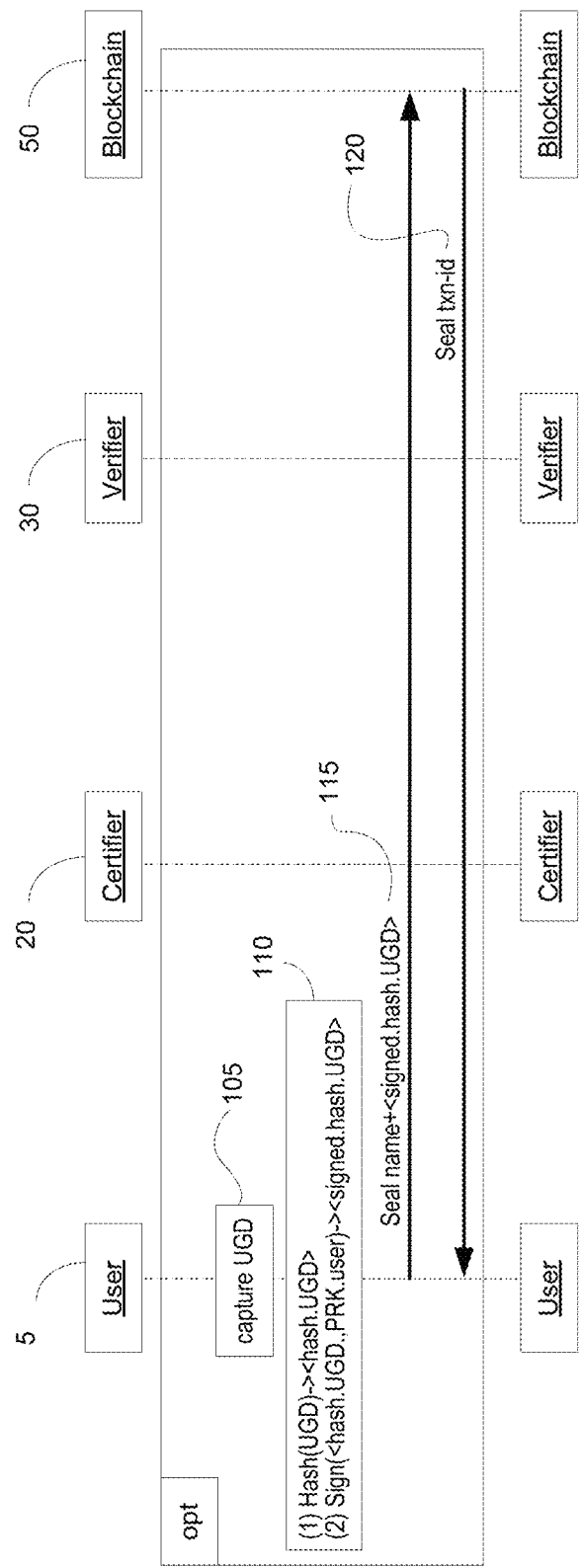
FIG. 1A illustrates a data flow for registering data in a blockchain, such as for registering user identification, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for authenticated login, registration, and call center validation. In particular, embodiments of the present invention allow users to login to websites, services and other portals without the use of usernames or passwords. Further, embodiments of the present invention allow users to remotely validate themselves such that a remote or local operator, such as those at a call center or a teller, can definitively authenticate a user in order to gain access to their profiles and other information. Other embodiments of the present disclosure describe systems and methods that provide for certification of user generated data (e.g., biometrics), which can be used for authenticating a user, and for providing access based on the certification.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

Registration, Validation, and Certification of Data

Embodiments of the present invention are based on an identity management platform implementing a technology layer that interacts with a blockchain. The blockchain securely holds data used for certifying identity transactions. In a traditional sense, a blockchain is a technology that forms the heart of the cryptocurrency, Bitcoin. In embodiments, the blockchain technology can be used by several integrated systems for purposes other than currency transactions, such as for identity management. There are various implementations of the blockchain beyond what is used in Bitcoin, including but not limited to Ethereum and Hyperledger.

In one embodiment, registration (e.g., of a user) (also referred to as validation) is implemented with an identity manager using a blockchain. Further, a certification process may be processed for certifying the registration and/or validation. In one embodiment, to register a user, some form of user identification (e.g., a driver's license or passport) is scanned. One or more fields are extracted, such as your name, license number, passport number, date of birth (or other data), etc. Also, that identifying information can be gathered individually. Further, the identifying information can be gathered manually. The data is then processed to produce a hash of the data. Optionally, to further obfuscate the original data, the hash can be produced of the original data along with a paired random data to prevent brute-force discovery of the hashed data; in this case, to validate the hash, the data and the random data must always be used together. In this example, the private key that is present on the mobile device can be used to create a digital signature of that hash. The signed hash value and optionally the public key of the user are stored to the blockchain; if the public key is not stored on the blockchain, it can be shared through other means when it is necessary to validate the digital signature. In one configuration, the various fields are put together in one record to create an ID (e.g., in the form of a seal) for that user.

The user can then provide the raw data with a public key and a pointer to that record on the blockchain in order to allow verification of the data by a third party. In particular, this provides a correlation between the data (e.g., the raw data) that the user has on the mobile device and what's on the blockchain. That is, the raw data that is newly presented may be verified using the data on the blockchain.

In still other embodiments, following the registration process, a user can be certified by some other trusted party, such as a bank or "know your customer" (KYC) checking company, which then can issue a certification for the user, based on the seal associated with the registration and validation of the user. By way of example, these certifiers can use their own private key to write the records on the blockchain, pointing to record entry of the user that is also on the blockchain. This certification may be referred to as the "User ID" (e.g., ShoCard ID issued by ShoCard, Inc.). As such, there are generally two steps: the first step is the registration process where hash signatures of the individual fields are sealed on the blockchain, and the second step is a certification of the sealed registration.

In still other embodiments, the platform providing registration and certification also provides for a secure workaround in cases when a bank suspects a credit card transaction could be fraudulent and wants to reject that transaction. The bank, for example, can send a notification/challenge (e.g., a secure notification), wherein the challenge looks for a response confirming the user, and the challenge also confirms that the user authorizes the current transaction. Additional features can include use of a biometrics for access-control (e.g., Touch II)). In one embodiment, each time a private key can be accessed to answer those questions. In one embodiment, by using the private key of the user when responding to questions (i.e., to see the data or questions), it is possible to avoid using clear text, which can ultimately be hacked.

Thus, embodiments of the present invention provide for being able to authenticate the user whenever the user does any kind of transaction, such as logging into a website, calling a call center, authenticating a transaction. In particular, the systems, methods, and technical operations described herein, and based on the identity management platform providing for registration and/or certification of data, can be implemented with the confidence of knowing who the user really is, and enabling this verification process in a timely manner.

The registration and/or validation process may be referred to as "sealing." Certification of the registration may be referred to as "certifying." In particular, sealing is the process of hashing and digitally signing the User ID data and storing it in the blockchain. Once it is sealed in the blockchain, the data becomes a permanent record. The data in the user ID may be changed, but the new data must be resealed in a new blockchain record. In one embodiment, no readable information is stored in the blockchain, only an indecipherable digital signature of a hash that can only be verified by producing the original data that was hashed and the user's public key. The user data is in control of the user and not available on the blockchain.

Certification of the registration and/or validation is the process of another party (e.g., third party, bank, airline, etc.) acknowledging the accuracy of the user ID that is registered, and marking that data (e.g., user ID) with a certification that can be recognized, such that the data can be recognized as being accurate when presented in the future, without having to see any other evidence of identity beyond the user ID. To certify a user ID, the raw data (e.g., user ID) is encrypted and delivered to the certifier. The certifier performs decryption and generates a new hash based on the newly presented raw data and then verifies the digital signature of the hash on the blockchain against the newly generated hash and the public key of the user. If the verification process is a match, this proves that the user has the private key(s) that is used to create both records. If the certifier is satisfied that the user is as they represent, the certifier can create a new record (e.g., certification record) with their own private key(s) that references the user ID that is registered and stored in the blockchain. The certifier can also create a separate signature for each field that it is able to verify (e.g., user name, date of birth, etc.). In this case, each field is ultimately a key=value pair where the value is a digital signature of the hash of the data being certified signed with the private key of the certifier. In the future, when the user presents their user ID to a third party along with the pointer to the certification records, the third party can check the certification to make sure that the user is presenting the same user ID that was previously certified.

It should be understood that the embodiments and described use cases described herein are only by way of example. Many new use cases can be encompassed and facilitated by the functionality based on the technology and identity management platform implementing registration and/or certification of data. For instance, identity verification (e.g., verification of a registration and/or certification of data) can be integrated into various commercial applications, as well as private applications. Commercial applications may include those that require commercial entities to verify the identity of a user. Verifying the identity of a user can be required for achieving any number of functions, such as traveling, making transactions, banking, communication, loan verification, credit verification, purchase verification, and other uses. In other embodiments, private identity verification can also be facilitated using the methods, apparatus, computer readable media, and systems described herein. For example, private identity verification may be useful when a user wishes to prove their identity to another user in a fast and efficient manner. The systems and methods described herein write data to the blockchain database, which is non-rewritable and permanently maintains the record without compromise. This enables writing of information to the blockchain in a manner that can be verified by one or more transactions executed by methods of the present inventions.

Additionally, the systems and methods described herein may be executed with any number of computer systems. By way of example, the computer systems may include user devices, such as mobile phones, tablets, desktop computers, watch computers, head attached computers, eyeglasses computers, or combinations thereof. Server operations may also be performed and communicated between client devices, to facilitate transactions with the blockchain database, server storage, and the like. By way of example, these computer devices can communicate over networks, such as the Internet, local area networks, Bluetooth, Near Field Communication (NFC), or even via exchange of codes such as QR codes. The networks enable individual devices to transact with each other, such as by way of sending, receiving, and processing exchanged information. The exchanged information can include different types of encrypted data, hashed data, data envelopes, codes, QR codes, PDF417 codes, messages, notifications, and other types of data.

In embodiments, the messaging and communication functions described herein are provided to enable users to exchange data over communication networks in order to verify identity, or enable or provide access to users to services, goods, or commercial transactions. In the case of banking operations, the verification process can be utilized by banks, as well as users of the bank, or third parties that require certified information from the banks regarding those users. In the case of travel type verifications, different travel entities can require identification of users, and the identification can also be verified by themselves or by other third parties that are trusted. These operations can be facilitated using the systems, methods, computer readable media, and code that execute the verification processes. Broadly speaking, verification of a user identity (e.g., verification of the registration and/or certification of data, such as user ID) can be useful in any type of industry, or private setting. The use of verification is simply facilitated by using the verifying infrastructure, programs code, applications, and combinations thereof, to ensure that verification is secure.

In some embodiments, the verification systems can be embodied in an application, such as those that can be installed on mobile devices (e.g., Apps). By way of example, users wishing to have their identity verified can use an application to seal information regarding their identity. Once the data has been sealed (e.g., encrypted data has been stored to the blockchain), this data (e.g., raw data) can be used for later certification by another party. The other party may also be utilizing a corresponding App, which enables efficient reading of the data, code, QR code, message, or notification, to validate the identity of the user.

In still other embodiments, code plug-ins can be integrated into commercial websites, which may use identity verification for different reasons or functions. For example, banks can install plug-in applications, code, or programs that can execute part or all of the verification processing to seal information and/or to certify information regarding identity. In view of the foregoing, it should be understood that the verifying processes described herein and the various use cases are only by way of example, and additional use cases will be evident to those skilled in the art.

Figure 1B:
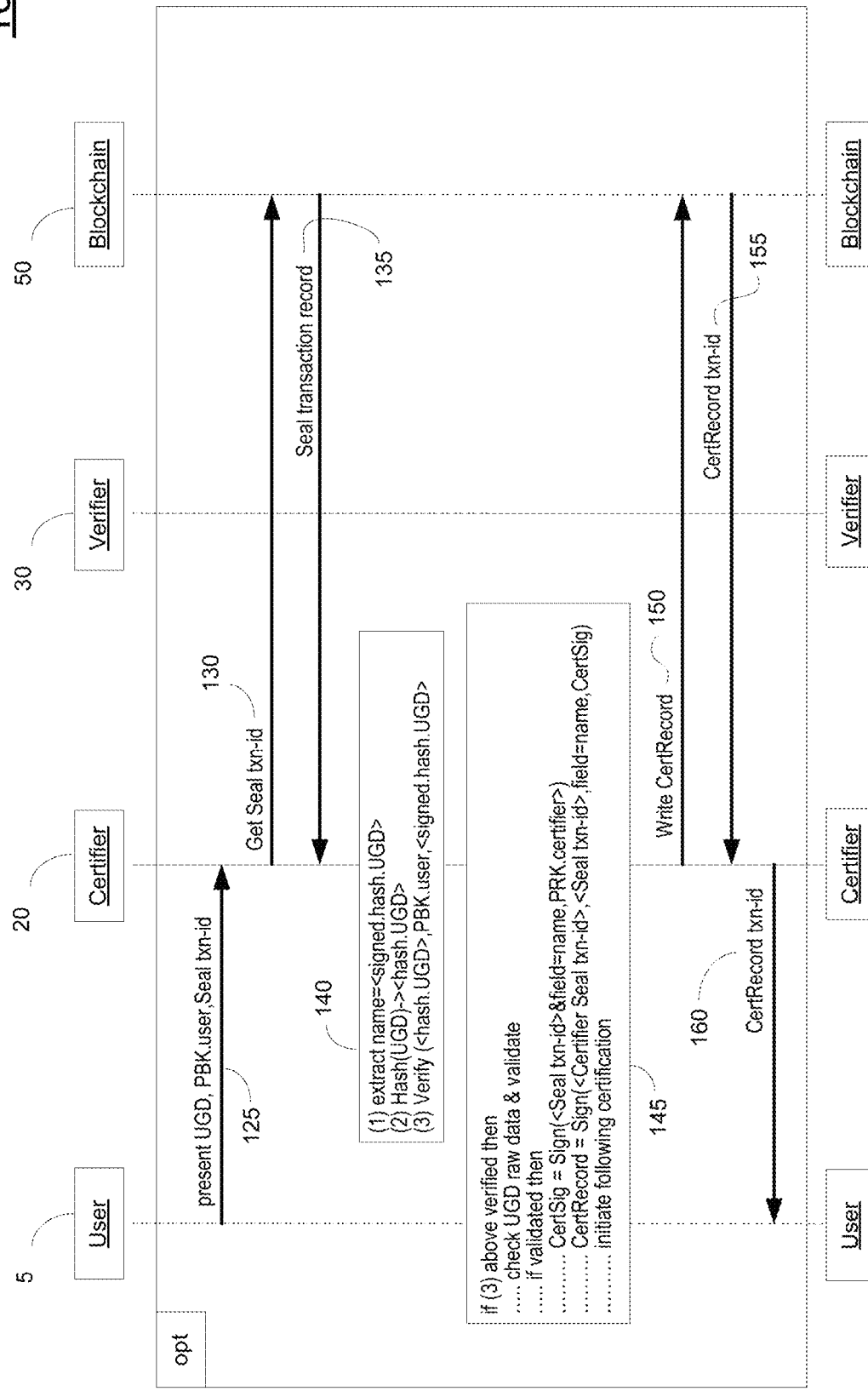
FIG. 1B illustrates a data flow for certifying the registered data using a blockchain, such as for certifying user identification that is registered with an identity manager, in accordance with one embodiment of the present disclosure.
Figure 1C:
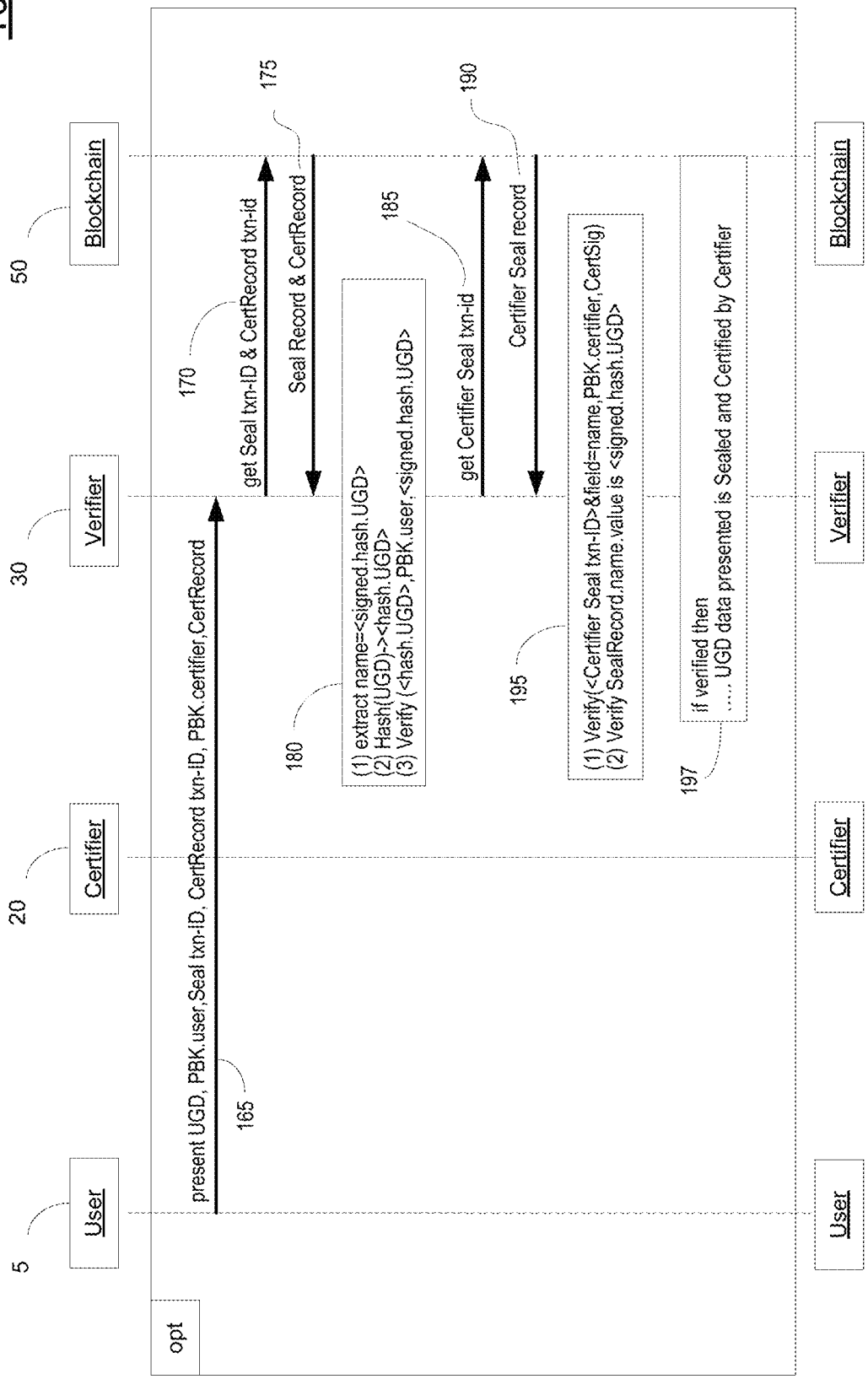
FIG. 1C illustrates a data flow for verifying the registered data, and for verifying the certification of the registered data, in accordance with one embodiment of the present disclosure.

FIGS. 1A-1C show data flows for the registration and/or validation process as well as the certification of the registered data, for example, as implemented by the identity management platform described herein, in embodiments of the present invention. These processes are performed to facilitate the implementation of authenticated login, registration, call center validation, and certification of user generated data (e.g., biometrics).

In particular, FIG. 1A illustrates a data flow 100A for registering data in a blockchain, such as for registering user identification, in accordance with one embodiment of the present disclosure. At operation 105, a user 5 may generate and/or capture any type of raw data (UGD) and have that data certified by a third party (e.g., certifier). There are no limitations as to the type of data generated. For example, the data can be any of the following types, but not limited only to these types of data: a simple text string; a date; an enumerated data type; a number; an arbitrary series of data bytes (e.g., a data block), a digital key, biometrics, etc. For distinction, the data types would have a name associated with them, so they appear in a key:value format (e.g., Name=Value).

This data can be saved locally on a device associated with the user 5 (e.g., mobile phone operating an identity management application). The user 5 would then seal her record by writing this data to a blockchain 50 in operation 115. This can be done by either inserting a new seal record with the added user generated data, that may overwrite any previous seal (if any), or a new seal that complements any prior seals.

The value field written to the blockchain is for registration and/or validation of the original, raw data only. The user 5 is expected to securely hold onto that data (e.g., through encryption) and only share it when the user chooses to.

Hence, the data is first hashed in operation 110 so the UGD becomes <hash.UGD>. In embodiments, any number of hashing algorithms can be used, such as SHA256. In addition, the user 5 then signs the <hash.UGD> with a private key of the user, producing <signed.hash.UGD> (e.g., using Touch ID). In operation 115, the signed hash becomes the value that is then written to the blockchain in the form: Name=<signed.hash.UGD>. More particularly, a seal 120 is generated that includes a transaction identifier for the blockchain that can be used to access the signed hash value (<signed.hash.UGD>) at the appropriate location in the blockchain.

FIG. 1B illustrates a data flow 100B for certifying the registered data using a blockchain, such as for verifying raw data that is registered with an identity manager using a blockchain 50, and for certifying the raw data (e.g., user identification) that is registered, in accordance with one embodiment of the present disclosure. Once the record 120 is registered and sealed, at operation 125 the user 5 may then present the UGD (securely maintained by the user or another device storage of her choosing), along with her public-key and a pointer to the seal record 120 on the blockchain to another party. In one embodiment, the other party is a verifier 30 that performs operations to verify the UGD. In another embodiment, the other party is a certifier 20 that performs operations to certify the registered UGD. Operations 130 and 135 may be performed by the certifier 20 or verifier 30 for purposes of verifying the UGD that was previously registered, though these operations are shown as being performed by the certifier 20. In particular, at operation 130, a request to access the registered seal record 120 is made to the public blockchain 50, and at operation 135, the seal record 120 is returned to the certifier.

In block 140, operations are performed for verifying the UGD. In particular, the data stored in the blockchain 50 is extracted, namely the signed hash value (<signed.hash.UGD>). In addition, the newly presented UGD is hashed using the same hash algorithm that was performed when registering the data. Verification of the raw data (UGD) is performed by performing a verification process on input data including the newly generated hash value, the public key of the user, and the <signed.hash.UGD> stored on the blockchain 50. For purposes of illustration only, in the verification process, hash values of the UGD newly generated and based on the <signed.hash.UGD> (e.g., using the public key), may be compared, and is verified when the hash values match.

In block 145, the certifier 20 begins the certification process. In particular, validation of the raw data (UGD) is performed. For example, the raw data is inspected to see if it conforms to public form (e.g., follows the form of a driver's license), and is validated if the raw data as presented conforms with the public form. Then, the seal 120 (e.g., transaction identifier or txn-ID) along with the public key of the certifier 20, and any other suitable data, is signed using the private key of the certifier 20 to generate a certification signature. In one embodiment, the seal 120 and public key optionally may also be hashed. Data may be combined in a certification record that is signed (using the private key of the certifier 20) and sealed in a blockchain, wherein the data may include one or more of the seal 120 of the UGD (e.g., seal txn-ID, pointer to the blockchain), the raw UGD, the certification signature (as the raw data of the certification record), public key of certifier, etc. At operation 150, the certification record is sealed in the same or different blockchain 50, and in operation 155 the certification record seal including the pointer to the blockchain where the certification record is stored is returned to the certifier 20 for distribution. For example, the certification record seal is provide to the user 5 to offer as certifying proof of the UGD, as is described in FIG. 1C.

In particular, FIG. 1C illustrates a data flow 100C for verifying the registered data, and for verifying the certification of the registered data, in accordance with one embodiment of the present disclosure. For example, at operation 165 the user 5 may present the raw UGD (and other information) to a third party, along with registration and certification record information, so that the third party may verify the UGD using multiple factors (e.g., registration and/or certification). That is, data may be combined for presentation, and includes one or more of the raw UGD, public key of the user 5, seal 120 of the UGD (e.g., seal txn-ID, pointer to the blockchain), the certification signature (as the raw data of the certification record), the certification record seal (e.g., certification seal txn-ID, pointer to blockchain), public key of certifier, etc. For purposes of illustration, the third party is verifier 30.

At operations 170 and 175, verifier 30 obtains the seal record 120 (e.g., using txn-ID for the blockchain) to obtain the data stored in the blockchain 50 (e.g., <signed.hash.UGD> and public key of user 5) to verify the raw data (UGD). At block 180, operations are performed to verify the data. For instance, the data stored in the blockchain 50 is extracted, namely the signed hash value (<signed.hash.UGD>). In addition, the newly presented UGD is hashed using the same hash algorithm that was performed when registering the data. Verification of the raw data (UGD) is performed by performing a verification process on input data including the newly generated hash value, the public key of the user, and the <signed.hash.UGD> stored on the blockchain 50. For purposes of illustration only, in the verification process, hash values of the UGD newly generated and that based on the <signed.hash.UGD> (e.g., using the public key), may be compared, and is verified when the hash values match.

When the hash values match, verification of the certification of the registered raw data (UGD) is performed. In particular, at operations 185 and 190, verifier 30 obtains the certification seal record (e.g., using certification seal txn-ID for the blockchain) to obtain the data stored in the blockchain 50 (same or different blockchain). That is, at operation 190 the certification record is returned to the verifier 30. At block 195, operations are performed to verify the certification record. In particular, the data stored in the blockchain 50 is extracted, namely the certification record which may be signed using the private key of the certifier 20 (e.g., signed hash value (<signed.certification record>). In addition, the newly presented certification record can be hashed using the same hash algorithm that was performed when sealing the certification record—however, the method of hashing needs to be known so it can be reproduced. Verification of the certification record is performed by performing a verification process on input data including the newly generated hash value, the public key of the certifier 20, and the <signed.certification record> stored on the blockchain 50. For purposes of illustration only, in the verification process, hash values of the UGD newly generated and hash valued based on the <signed.hash.UGD> (e.g., using the public key), may be compared, and is verified when the hash values match. In addition, in block 195, verification of the raw data, UGD, may be performed if not already performed. In that manner, the verification has been performed on the UGD itself and a certification of the UGD. As such, upon successful verification of the UGD and certification record, at operation 197 the presented UGD is trustworthy after going through a verification of the UGD and the certification record of the UGD.

Figure 2:
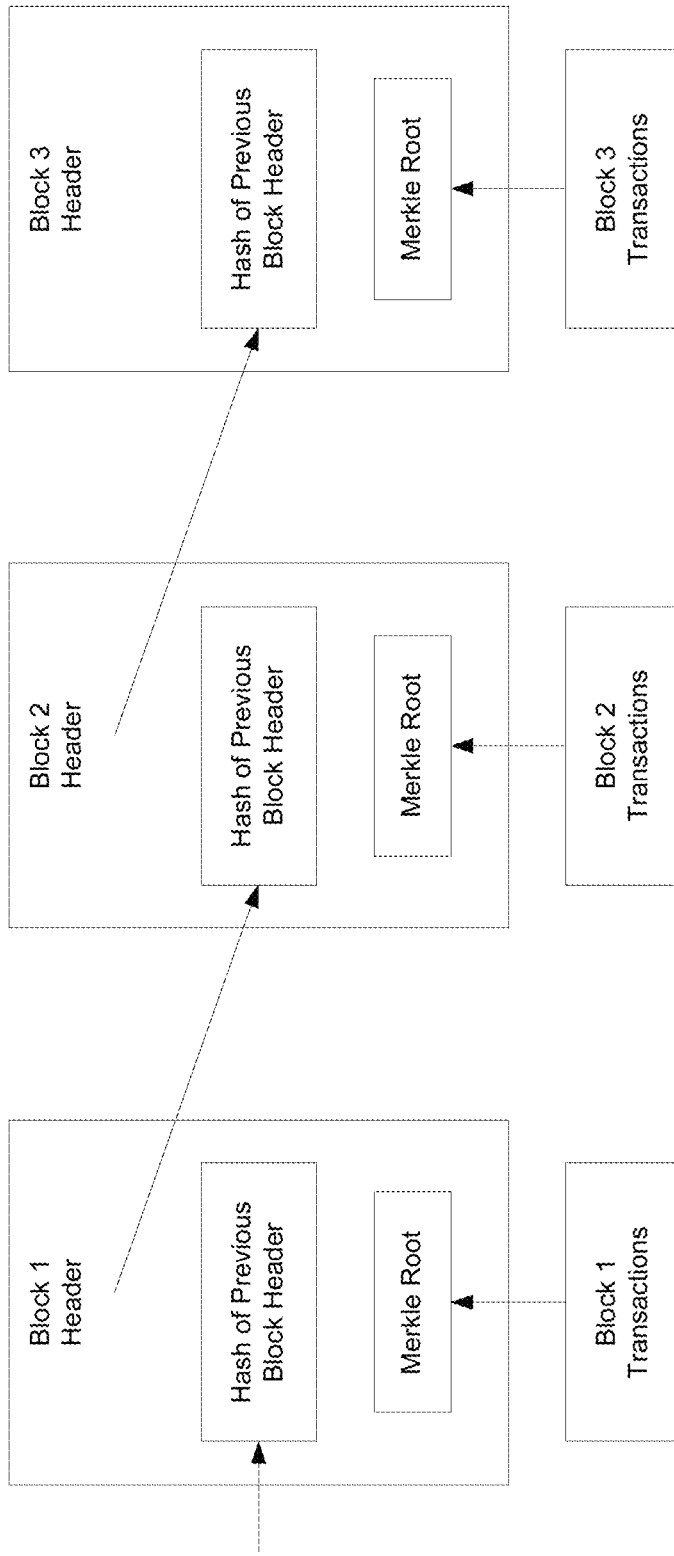
FIG. 2 illustrates the implementation of a blockchain to ensure the integrity of the data embedded within, in accordance with one embodiment of the present disclosure.

FIG. 2 illustrates the implementation of a blockchain to ensure the integrity of the data embedded within, in accordance with one embodiment of the present disclosure. The blockchain is used for implementation of processes that are performed to facilitate the implementation of authenticated login, registration, call center validation, and certification of user generated data (e.g., biometrics) based on the registration, validation, and/or certification of raw data. A simplified version of a blockchain is shown in FIG. 2. A block of one or more new transactions is collected into the transaction data part of a block. Copies of each transaction are hashed, and the hashes are then paired, hashed, paired again, and hashed again until a single hash remains, which represents the merkle root of a merkle tree. The merkle root is stored in the block header. Each block also stores the hash of the previous block's header, chaining the blocks together. This ensures a transaction cannot be modified without modifying the block that records it and all prior blocks.

Authentication and Login Using a Scannable Code

Figure 3:
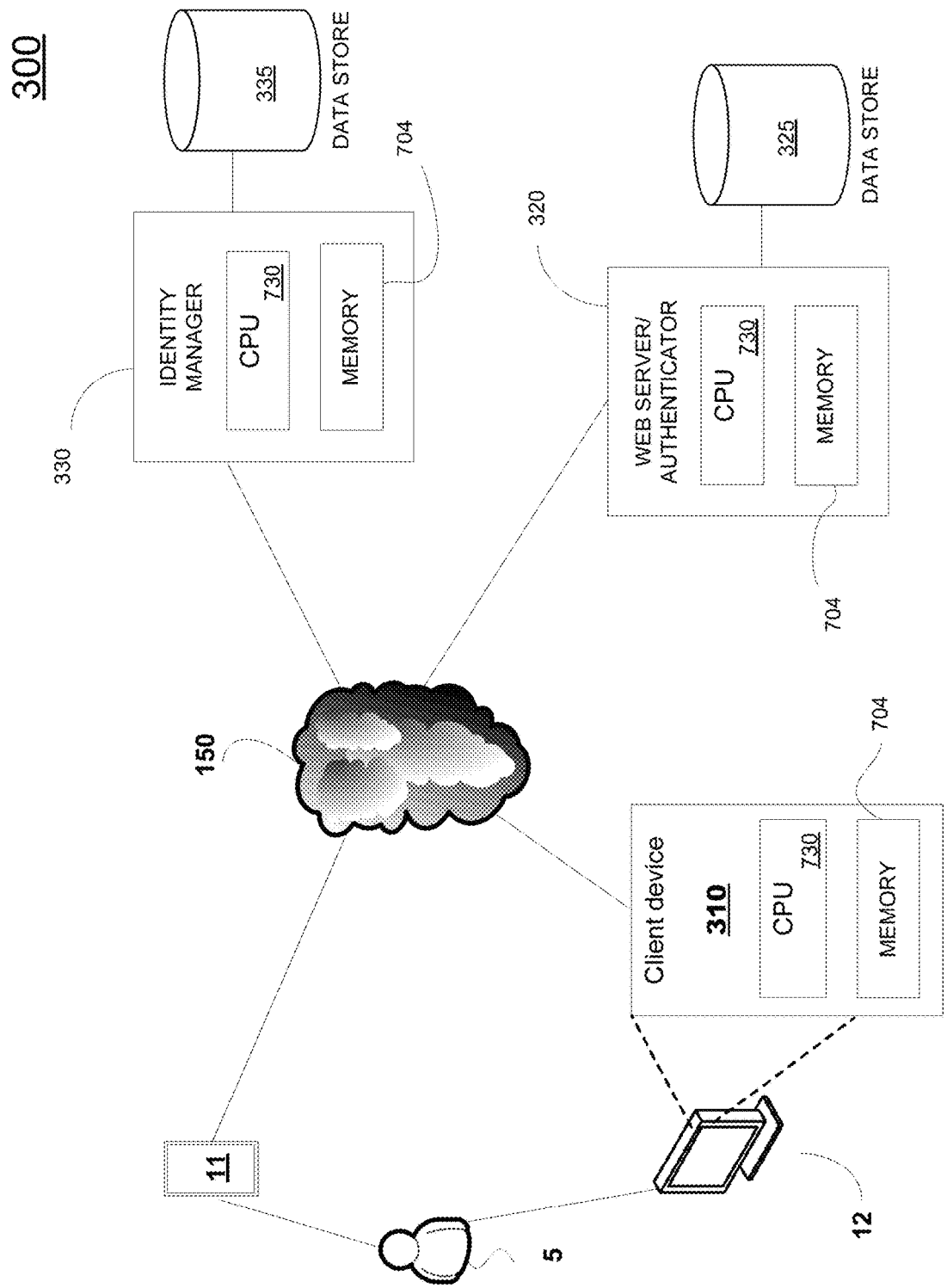
FIG. 3 is a diagram illustrating a system for performing authentication and login onto a web portal of a web server, wherein two devices of the user interacts with the web server for authentication purposes, in accordance with one embodiment of the present disclosure.

FIG. 3 is a diagram illustrating a system 300 for performing authentication and login onto a web portal of a web server, wherein two devices of the user 5 interact with the web server 320 for authentication purposes, in accordance with one embodiment of the present disclosure. For example, system 300 may be implemented to perform authenticated login, registration, and call center validation. In particular, system 300 may be configured to allow users to login to websites, services and other portals without the use of usernames or passwords. Further configurations of system 300 allow users to remotely validate themselves such that a remote or local operator, such as those at a call center or a teller, can definitively authenticate a user in order to gain access to their profiles and other information.

In particular, user 5 is associated with two electronic devices, such as client device 310 and device 11. Client device 310 may include a web browser configurable for communication over a network 150, such as the internet. For example, client device 310 may present to user 5 a login page of a web server 320, wherein the login page may be delivered to the display device 12 associated with a user 5. In addition, device 11 of the user 5 may be used in conjunction with client device 310 in order to perform the login process enabling client device 310 to access web server 320. Client device 310 and device 11 can be any type of computing device having at least a memory 1404 and a processor module 1430 that is capable of connecting to the network 150. Some examples of client device 100 include a personal computer (PC), a game console, a home theater device, a general purpose computer, mobile computing device, a tablet, a phone, or any other types of computing devices.

Web server 320 includes any type of computing device having at least a memory 1404 and a processor module 1430 that is capable of connecting to the network 150. Data store 325 may be controlled and/or accessible by web server 320. Web server 320 may be configured to provide information and/or services over network 150. In particular, web server 320 may be used, in part, to implement technology to perform registration, validation, and/or certification of raw data, as will be further described below to facilitate the implementation of authenticated login, registration, call center validation, and certification of user generated data (e.g., biometrics).

Identity manager 330 includes any type of computing device having at least a memory 1404 and a processor module 1430 that is capable of connecting to the network 150. Data store 335 may be controlled and/or accessible by identity manager 330. In particular, identity manager 330 may be used, in part, to implement technology to perform registration, validation, and/or certification of raw data, as will be further described below to facilitate the implementation of authenticated login, registration, call center validation, and certification of user generated data (e.g., biometrics).

Figure 4A:
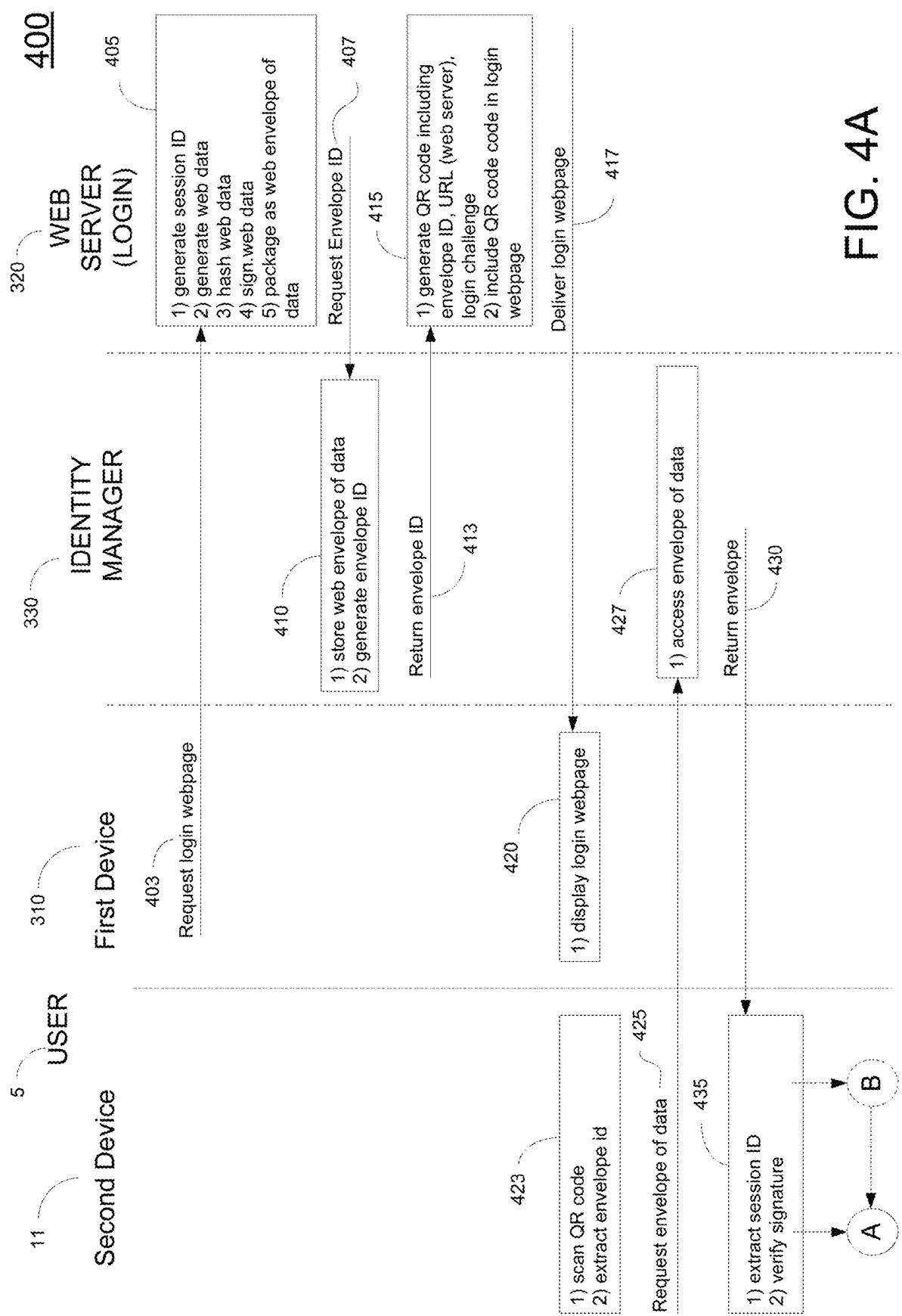

FIGS. 4A-4B illustrates a data flow 400 for performing authentication and login onto a web portal of a web server 320 as illustrated in FIG. 3, wherein two devices of the user 5 interacts with the web server for authentication purposes, in accordance with one embodiment of the present disclosure. The data flow 400 of FIGS. 4A-4B may be implemented within the system 300 of FIG. 3, and may implement portions of the methods described in the data flows 100A, 100B, and 100C of FIGS. 1A-1C. As shown, parties to the login process include a user 5, who is associated with a first device 310 and a second device 11, an identity manager 330, and a web server 320, wherein the user 5 is requesting login access to the web server 320.

In general, data flow 400 shows the flow of data when logging into a web site using a QR code. For example, a user enters a web site and may be presented with one or more forms of authentication paths to login (for example, username/password and a button to login). On the screen, there is a QR code or other similar graphics that encodes data information (such as a bar code). For purposes of illustration, the QR code is referenced and intended to represent any type of code. The user uses his/her mobile application designed to comprehend the contents of the QR code and determines that this is an authentication badge for login. The application presents the user with a question to determine if the user chooses to login and pass his/her credentials. This process may request an additional form of authentication on the mobile device such as a finger thumbprint Id (e.g., touch ID, and/or other biometric identification), or a PIN passcode. Once the user authenticates himself/herself, a message is sent to the server specified in the QR code encoding and the server is able to authenticate the user and allow the user to login on the website. The browser session in this case is connected to the server and receives notifications from the server. These notifications can be done via JavaScript polling, websockets, vendor specific push notifications or other forms of connected communication. The server then provides the browser session with the page that the user would have logged into similar to how the session would have been performed using a normal username/password login.

At operation 403, the user 5 via the first device 310 requests a login web page from the web server 320 over a communication network (e.g., internet). Upon receiving the request for login, the web server 320 performs operations as outlined in block 405. For example, the operations are performed to create a web envelope of data. In particular, a session ID is generated by web server 320, which may be generated in response to the request for the login web page, or may be generated in anticipation of a login request (e.g., such as at a login kiosk). As shown, a factor in the authentication and login process is the use of the session ID, such that the session ID is used throughout the authentication and login process, thereby connecting the devices used in the process. The session ID is associated with a communication session that will be established after successful login of the user 5. In addition, web data may be generated by the web server 320 to include one or more of the session ID, a timeout for the session ID, URL web address for the web server 320, etc. Also, the web data may optionally include the public key of the web server 320 for convenience of access with the web data, though the public key may be obtained elsewhere as commonly implemented. In addition, the web data may be hashed using a hash algorithm (e.g., using any number of hashing algorithms can be used, such as SHA256). Further, a signature of the web data may be generated, using the private key of the web server 320. The web data and the signature are combined into an envelope of web data.

At operation 407, the web server 320 sends a request for an envelope ID to the identity manager 330. The request includes the envelope of web data. In block 410, the identity manager 330 performs operations to include storing the envelope of web data, and generating the envelope ID, which is associated with the envelope of web data. As such, the identity manager 330 is able to access the envelope of web data that is stored based on presentation of the envelope ID. At operation 413, the identity manager 330 returns the envelope ID to the web server 320.

In block 415, various operations are performed by web server 320 upon receipt of the envelope ID. Generally, a login page is generated with information facilitating authenticated login. In particular, web server 320 generates a scannable code (e.g., QR code), which includes at least one of the envelope ID, URL of the web server 320, and a login challenge asking whether a login process is further requested. The scannable code is included in the login page. Though embodiments are described using a scannable code, other types of codes that are configured to deliver information between devices are also suitable.

At operation 417, the web server delivers the login web page to the first device 310 of the user 5. At operation 420, the first device 310 of user 5 displays the login web page that includes the scannable code, wherein the scannable code includes at least the envelope ID. As previously described, the envelope ID is associated with a first envelope of data including the session ID, and wherein the envelope ID is generated by an identity manager 330 at the request of the web server 320.

In block 423 various operations are performed, including configuring and/or operating the second device 11 to scan the scannable code. In that manner, the envelope ID can be extracted, and used to access the first envelope of data. Typically, the scannable code is of a limited size that may not be able to accommodate the size of the first envelope of data, though in some embodiments, the scannable code may be of sufficient size. As shown, a factor in the authentication and login process includes the use of two devices (first device 310 and second device 11) associated with the user 5. In FIG. 4A, at operation 425, the second device 11 requests the first envelope of data from the identity manager 330, wherein the request includes the envelope ID. Based on the envelope ID, the identity manager is able to access the envelope of data at operation 427, and at operation 430 return the first envelope of data to the second device. However, if the scannable code is able to include the entire data identified in block 405, it may not be necessary to create an envelope and an envelope ID—the scannable code in this case would have the entire data.

At block 435 various operations are performed by the second device 11 of user 5. The session ID is extracted from the envelope of data, as well as any other data included in the envelope. Verification of the data may be performed, such as by verification engine 1442. As previously described, the verification logic is well known, and includes inputting at least one of the web data, the public key of the web server, and the signature of the web data, wherein the verification logic confirms or denies the verification of the web data. As shown in FIG. 4A, the method proceeds to connector A. The method of FIG. 4A may proceed to intervening connector B before returning to connector A when a dynamic code is inserted into the authentication and login process, for example to provide additional security by ensuring the proper devices are participating throughout the entire authentication and login process, as will be further described in FIGS. 7A-7C.

Continuing with connector A, in FIG. 4B, the method proceeds to block 440, wherein the second device 11 performs multiple operations after the data within the envelope of data has been verified and can be trusted. In particular, user data is collected and/or generated to include at least one of the session ID, user identification that may be recognizable by the web server 320 and is registered (e.g., with the identity manager 330), a seal of the registered data (e.g., user identification), a seal of a certification record certifying the registered data, the certification record, a login response (e.g., affirmative response to login challenge), public key of the user, etc.

Further, the user data is hashed (<hash.userdata>) using any suitable hash algorithm, such as SHA256. The second device 11 is configured to sign the hash value with a private key of the user (e.g., producing <signed.hash.userdata>). The signature process may be authorized by the user for example using Touch ID. Optionally, the user data and the signature may be encrypted using a public key of the web server 320. The resulting user data and signature, or resulting encrypted user data and signature, is packaged as a return envelope of data, such as a secure envelope (e.g., when encrypted). By optionally encrypting the package in block 440, the user can ensure that the only entity able to read its response to the login request is the intended Web server and that the package being delivered remains unmodified. The signature of the user in the package can provide the Web server an assurance that this particular user has indeed composed the entire data and response being sent back. Because the data being signed also includes a unique one-time session ID, the protocol ensures that the users' response cannot be re-used for another login session using the users' credentials.

At operation 445, the secure envelope of data is delivered from the second device 11 to the web server 320 via the identity manager 330. For example, the envelope is delivered in a confirmation login request that is responding to the login challenge. The confirmation login request includes the secure envelope of data. As such, the secure envelope is received at the identity manager at operation 447, such as in the confirmation login request, wherein the envelope is delivered at operation 450 from the identity manager 330 to the web server 320. Because the envelope is secure, the identity manager 330 is prevented from extracting information from the envelope, and the secure envelope is delivered securely (without exposure) to web server 320.

At block 453 various operations are performed by web server 320 upon receipt of the secure envelope in the form of the confirmation login request. In particular, if the envelope is optionally encrypted, a decryption process is performed (e.g., using the private key of the web server 320). As such, after decryption the data in the envelope is known, to include at least one of session ID, a user ID, and a seal of the user ID registering the user ID (e.g., with the identity manager), affirmation of the login challenge, etc. A verification of the signature may be performed to determine whether the data is trustworthy (e.g., has not been modified during transmission). As previously described, the verification logic is well known, and includes inputting at least one of the user data provided in the envelope, the public key of the user, and the signature of the user data, wherein the verification logic confirms or denies the verification of the user data. In addition, the session ID may be verified as being valid. That is, the confirmation login request may be verified as a response to the login challenge issued by the web server 320 (e.g., as being part of a valid transaction) using the session ID returned with the confirmation login request. Since the web server 320 generates all the session IDs, the present session ID may be cross-checked to determine whether it is a valid session ID, and whether the session ID has not timed out, or to perform any other validation process. As shown, another factor in the authentication and login process includes the verification of the signature to trust the information (e.g., session ID), and to confirm that the user's response is in fact to this particular session ID (versus being re-used from another session).

Further in block 453, the user ID may be verified following the verification logic presented above. Verification of the user ID is another factor in the authentication and login process. Correspondingly, the user is verified based on the user ID that is presented. That is, inputs are provided to the verification logic to include the user ID, the public key of the user, the seal of the user ID (to include the transaction identifier for the blockchain that stores the signed hash value of the user ID), and the signature of the hash value of the user ID. The verification logic confirms or denies the verification of the user ID. Also in block 453, the certification of the user ID may be verified following verification logic presented above. Verification of the certification of the user ID is another factor in the authentication and login process. For example, inputs are provided to the verification logic to include the certification record, the public key of the user, the certification seal of the certification record (to include the transaction identifier of blockchain that stores the signed hash value of the certification record), and the signature of the hash value of the certification record. The verification logic confirms or denies the verification of the certification record.

User login for user 5 is authorized upon successful verification of the login challenge and user. In particular, once successful verification of the user ID and/or the verification of the certification of the user ID are achieved, the user is authorized for login. In that manner, at operation 455, a communication session is established between the web server 320 and the first device 310 of user 5.

Figure 4C:
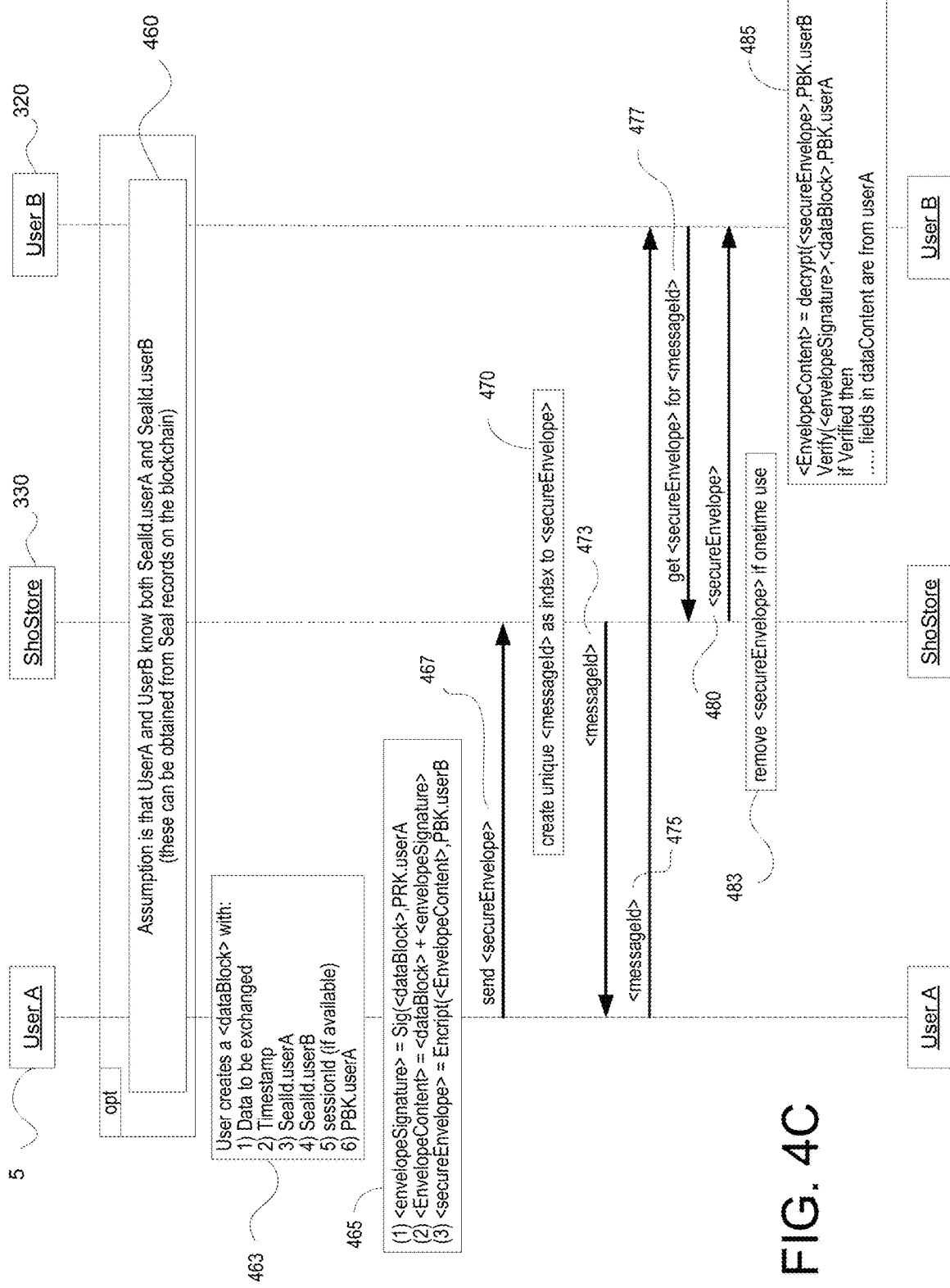
FIG. 4C illustrates a data flow when exchanging a secure envelope of data between two entities via an identity manager server, such as when performing authentication and login onto a web portal of a web server as illustrated in FIGS. 4A-4B, in accordance with one embodiment of the present disclosure.

FIG. 4C illustrates a data flow 400C when exchanging a secure envelope of data between two entities via an identity manager server 330, such as when performing authentication and login of a user 5 onto a web portal of a web server 320 as illustrated in FIGS. 4A-4B, in accordance with one embodiment of the present disclosure. That is, the data flow 400C may be implemented to deliver a secure envelope of data between the user A (e.g., user 5) and user B (e.g., web server 320), to include participation by data store server (e.g., identity manager 330).

It is possible to provide the secure exchange of data between two entities (e.g., users A and B) by using a server (data store). In the example, of FIGS. 4A-4B, the secure exchange of data is performed between user 5 and web server 320 using identity manager 330. This process allows for delivery of data when it may not be feasible to exchange large data sets directly between the two entities. For example, the two entities may be on a mobile device, or be interacting via an intervening web page. In this case, the two entities cannot exchange data directly without having a communication path.

The assumption in this exchange is that the two entities already know one another and are aware of each other's seal ID, and ultimately each other public keys associated with the private keys they've used to seal their identification. (See block 460).

In one embodiment, the two entities can share data through digital codes, such as a bar-code, a QR code, PDF417 code or any other similar type of displayable codes. As such, variable sizes of data blocks (potentially very large data blocks) can be securely exchanged between such two entities by utilizing a server (e.g., identity manager 330) in the middle. In particular, the identity manager 330 stores and directs the message for the two entities, but is unable to ever read any of its content. The server in the middle includes a data store, but can be any server (e.g., identity manager 330).

In particular, user A intends to send a block of data to user B. Block 463 illustrates multiple operations performed by user A in preparation of sending the block of data. In particular, user A places that data in a data block and may add additional identification fields to that block of data such as timestamp, its own seal Id, user B's seal Id, it's public key and if there is a session between the two, a session ID. The value of the timestamp and the session ID is to ensure vitality of the data block versus one that may have been created and somehow reused again. This data block will be referred to as <dataBlock>.

Next, as outlined in block 465, user A uses its own private key to digitally sign the <dataBlock> that was created. The result is <envelopeSignature>. Next, an <envelopeContent> is created by putting together the <dataBlock> and the <envelopeSignature>. Last, a <secureEnvelope> is created by encrypting the <envelopeContent> with user B's public key.

Once a <secureEnvelope> is created by User A, the <secureEnvelope> is sent to Store in operation 467. In operation 470, store creates a unique <messageId> that is associated with the <secureEnvelope>, and in operation 473 it returns that identifier to User A. User A then relays the <messageId> in operation 475 and possibly the address of the Store server (if not a well known server service between the two users) to user B. This data is rather short and can easily fit in nearly all digital codes such as a bar code, a QR code, PDF417-code, and the like.

User B receives the data in some form, such as scanning the code from the mobile screen of User A and then sends a message to Store to get the <secureEnvelope> associated with the <messageId> in operation 477. In operation 480, store returns the associated <secureEnvelope>. User B can view the <envelopeContent> by decrypting the <secureEnvelope> using his private key that no one else is aware of, as shown in block 485. It may then verify the <dataBlock> in the envelope content by verifying the <dataBlock> and the <envelopeSignature> with the user A's public key that was passed. It may also verify that this is the same public key that was used in user A's SealId.

Further, if the protocol requires that the transmission be a onetime process, the <secureEnvelope> can be deleted after a successful transmission, as detailed in operation 483. For example, it is also possible to delete the envelope if an expiration time is associated with it.

Figure 4D:
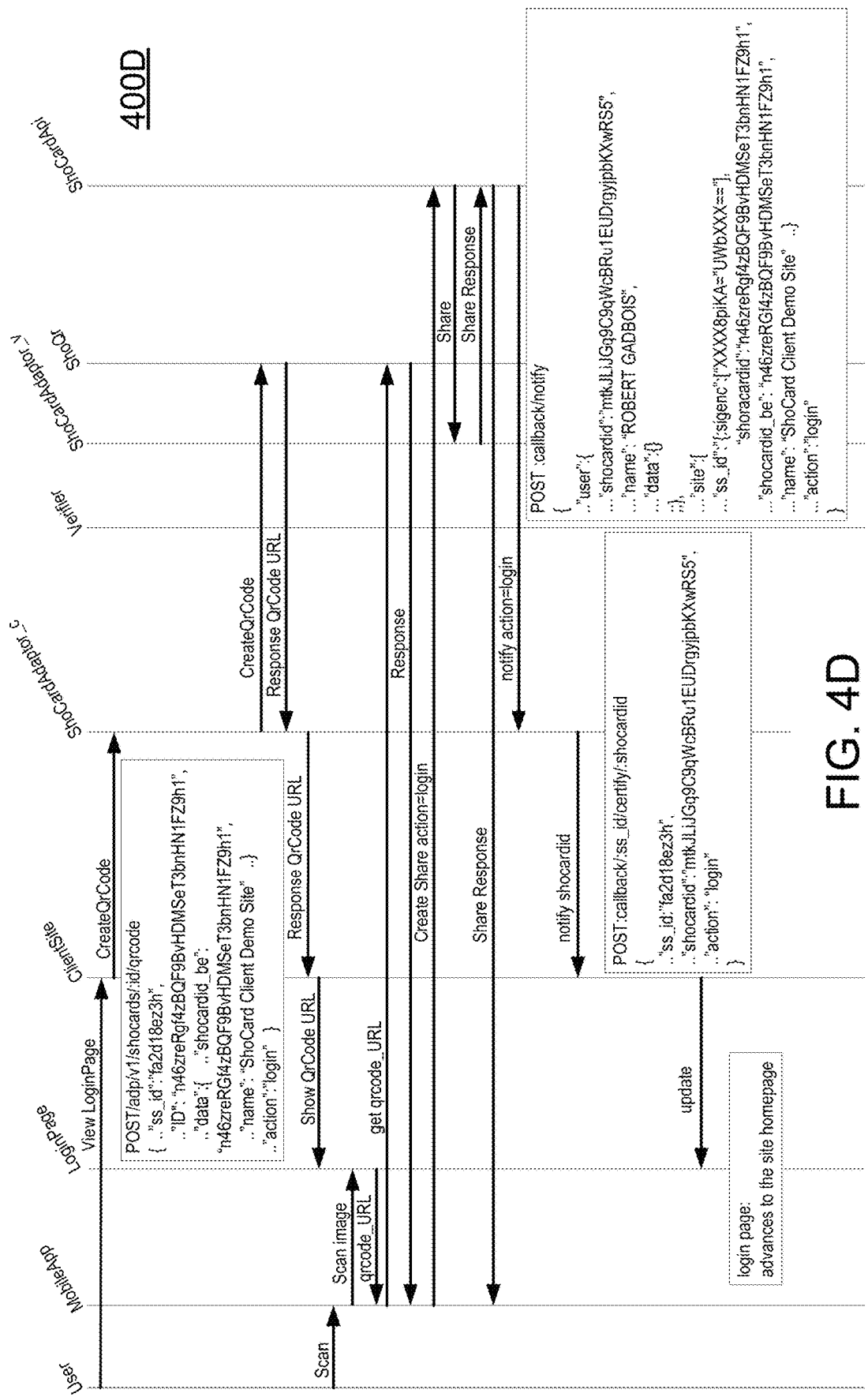
FIG. 4D is a diagram illustrating a process for logging into a website using a QR code, in accordance with one embodiment of the present disclosure.
Figure 5:
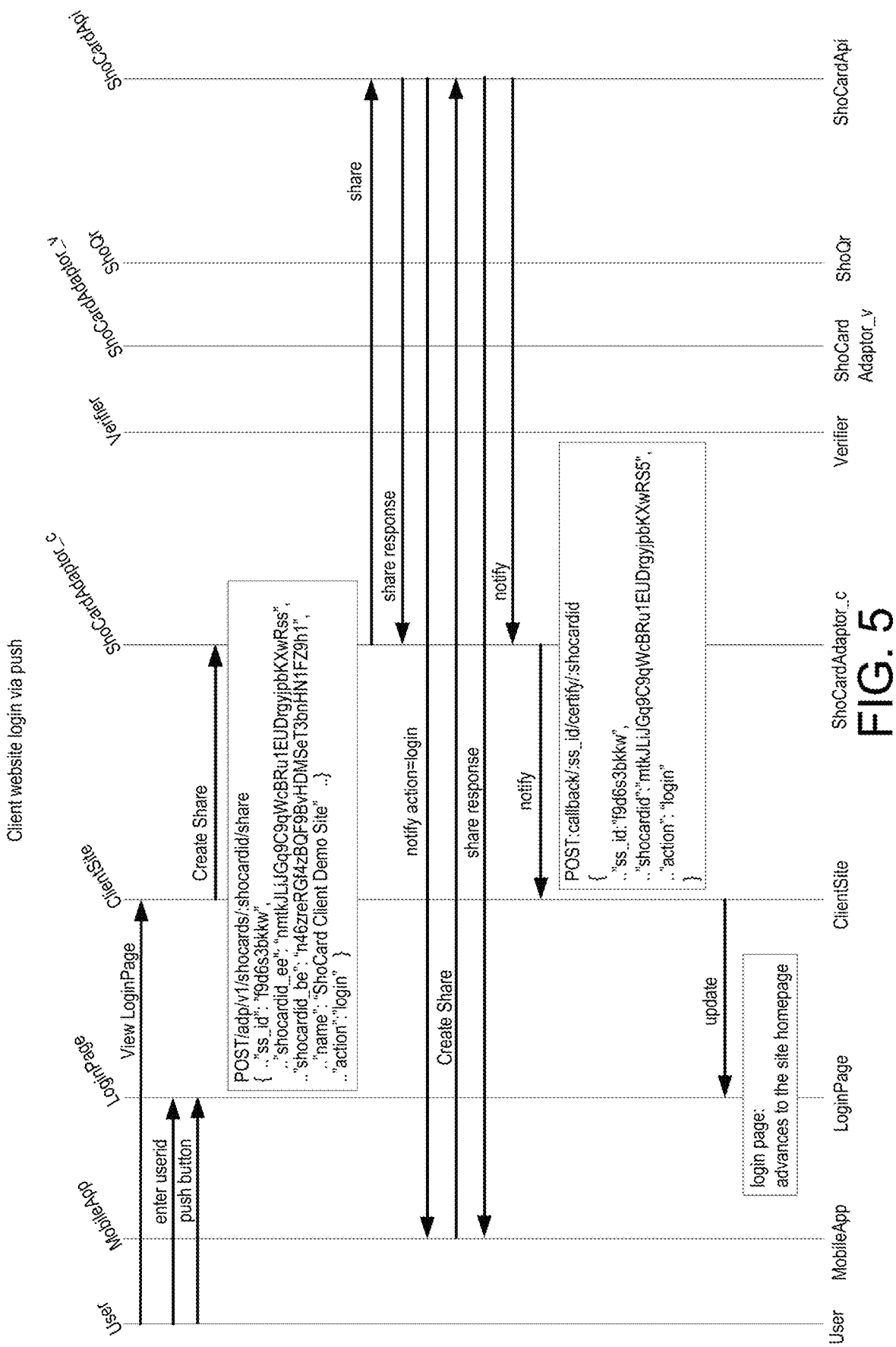
FIG. 5 is a diagram illustrating a process including a push notification login, in accordance with one embodiment of the present disclosure.
Figure 6A:
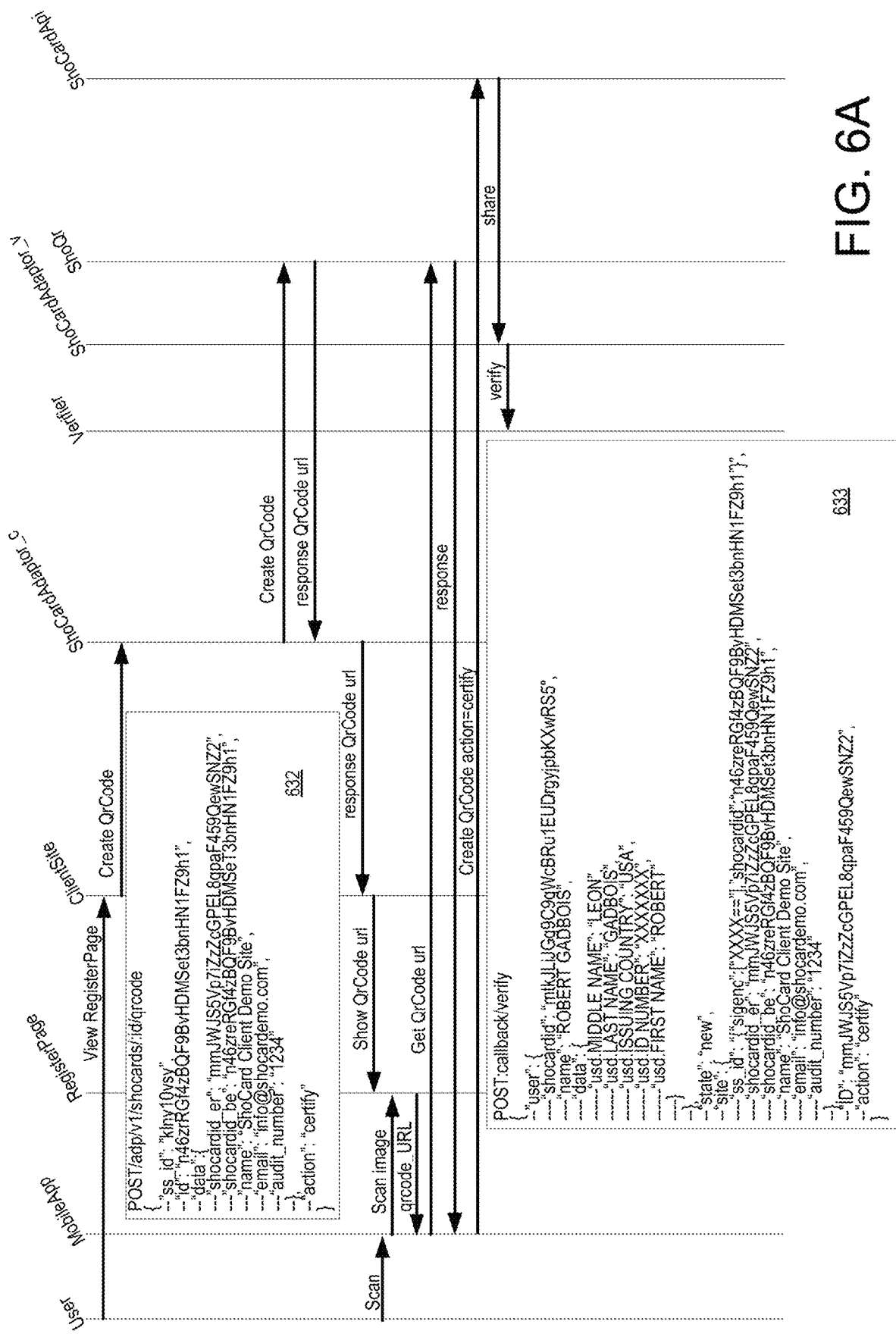
Figure 6B:
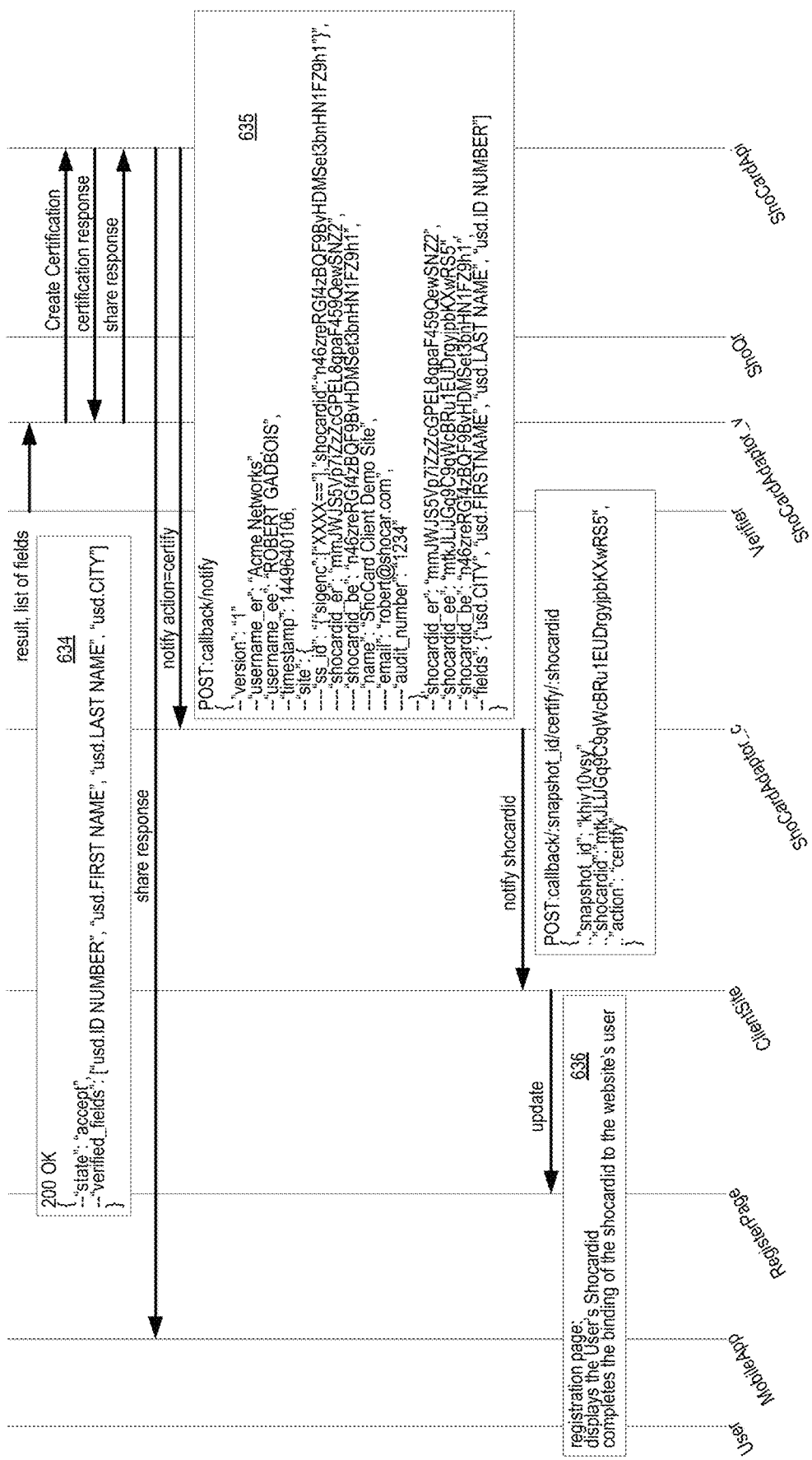

The technologies for registration, validation, and certification of data (e.g., user data) described previously in at least FIGS. 1A-1C can be used in various additional use cases that may involve authentication and/or login, in embodiments of the present invention. For example, FIGS. 4D, 5, and 6 illustrate different use cases providing for website login, logging in for services without using a password, and new user registration. Other use cases are also disclosed below.

In FIGS. 4D, 5, and 6, and throughout parts of this specification, various terms are used with similar functionality and definition, unless otherwise defined, and are summarized below. For instance, the term "user" refers to an individual who has identifying credentials. The user typically wishes to gain access to particular service or product, as is described throughout this specification. The term "service provider" refers to an entity to which a user wishes to gain access. For example, the service provider may be a website, a physical building, an employer, a club with membership privileges, an automobile, an airline, or any other service or product. The term "man-in-the-middle" refers to a system or individual listening to communication between two parties in either electronic or analog form. For example, the man-in-the-middle may be a hacker. The term "verifier" refers to a service which is configured to verify some or all of user information associated with a user. The term "certifier" refers to a service which is configured to certify the user information (which previously could have been verified and validated). The certifier is configured to produce a certification record, which uniquely further identifies data (e.g., user information), and can be used as proof that certain data belonged to a certain user at the time of the certification according to the certifier. The term "session ID" refers to a unique identifier that may be used throughout an authentication and login process, thereby connecting the devices used in the process, and wherein the session ID may be associated with a communication session that will be established after successful login of a corresponding user. The term "signature" refers to a process by which a user is able to digitally sign data using a public/private key pair. The process of signing data may be protected with access control to the App or device. For example, a Touch ID process previously introduced may be used as the user's permission to allow the App to digitally sign data on the user's behalf.

In FIGS. 4D, 5, and 6, and for other processes described throughout this specification and/or in other figures of this specification, various requirements are present for providing secure authentication between the users and the service providers, as described below. 1) For example, all communication between a user and a service provider must be secure such that if a man-in-the-middle intercepts (e.g., sniffs) the data exchange, he/she is unable to either successfully alter the request so it appears authentic, replicate the request to allow alternate authentication, or gain information on the user PII (Personally Identifiable Information) or actions being performed by the user, in one embodiment. 2) Also, in another embodiment, it is possible to provide these authentication and/or login services without requiring secure communication between the user and service provider. In this case, the capabilities for authentication and login can be provided without providing complete security. This can be the case if (a) the user is within a secure environment where outside or hacker attack is deemed not probable, (b) all communication is done through a secure channel (e.g., secure socket layer—SSL), (c) security violation is not deemed to be a threat or of importance, and/or (d) security is ignored. 3) In another embodiment, each session requiring authentication should be identified by a unique Session-ID that is generated by the service provider. 4) Also in other embodiments, the user must have previously been registered with the service provider. 5) Further, in other embodiments, the service provider does not necessarily need to know the phone number of the device the user utilizes for authentication. 6) Also, in other embodiments, each request may be authenticated in real time, although it can also be done in batch processing or offline (which may experience slower results). 7) Further, in other embodiments, the user may optimally provide an additional factor for authentication such as passcode or Touch ID on their mobile device. This additional factor may not be necessary, as the user may have other forms of security in place that would provide for additional security, or this factor may not be necessary when security is not of concern. 8) In other embodiments, the user is in possession of a private/public key for encryption/decryption and signing. 9) In still other embodiments, the service provider may not necessarily know the current public key of the user until the authentication request is initiated. 10) In other embodiments, the user is able to authenticate each request by being able to utilize its private-key to digitally sign the request. This may be an optional requirement that when performed provides for additional security.

FIG. 4D is a diagram 400D illustrating a process for logging into a website using a QR code, in accordance with one embodiment of the present disclosure. In particular, FIG. 4D illustrates another process for performing authentication and login onto a web portal of a web server 320 as illustrated in FIG. 3, and performs similar operations as those described in FIGS. 4A-4C. That is, the process outlined in diagram 400D uses the technologies for registration, validation, and certification of data (e.g., user data) described previously in at least FIGS. 1A-1C, to allow users to login to websites, services, and other portals without the use of a username or password.

The authentication and login process shown in FIG. 4D may be used to authenticate a user to a website. In embodiments, a user enters a web site and may be presented with one or more forms of authentication paths to login (for example, username/password and a button to login). On the screen, there is a QR code or other similar graphics that encodes data information (such as a bar code). For purposes of illustration, the QR code is referenced and intended to represent any type of code. The user uses his/her mobile application designed to comprehend the contents of the QR code and determines that this is an authentication badge for login. The application presents the user with a question to determine if the user chooses to login and pass his/her credentials. This process may request an additional form of authentication on the mobile device such as a finger thumbprint Id (e.g., touch ID, and/or other biometric identification), or a PIN passcode. Once the user authenticates himself/herself, a message is sent to the server specified in the QR code encoding and the server is able to authenticate the user and allow the user to login on the website. The browser session in this case is connected to the server and receives notifications from the server. These notifications can be done via JavaScript polling, websockets, vendor specific push notifications or other forms of connected communication. The server then provides the browser session with the page that the user would have logged into similar to how the session would have been performed using a normal username/password login.

In one embodiment, the authentication and login process outlined in FIGS. 4A-4D can be modified and/or applied to a use case wherein login to a physical port is performed using a QR code. In particular, a user may wish to gain access to a physical portal such as a door that is locked, enter a gym where he/she has an active membership, or enter company premises. At a point of entry, the user scans a QR code that is electronically generated. The message is sent to the server processing authentication. Once the user is authenticated, the server allows access for the user. If the user is at a physical portal, such a locked door, the server may send an authenticated request to the lock box to have it electronically opened. If the user is at a physical portal guarded by an operator, such as a gym-club staff member, the server may send a message with identifying information such as the person's name that was authenticated, their picture and other information and confirm their authentication so they are allowed access. Instead of using a QR code to initiate this process, other forms of communication such as Bluetooth, NFC and other communication methods may also be used, in other embodiments.

In another embodiment, the authentication and login process outlined in FIGS. 4A-4D can be modified and/or applied to a use case wherein login for access to services is performed using a QR code. In particular, for authentication of a user, a service provider may alternatively employ a QR code scanner through a device and read a QR code generated by the user's mobile app that identifies the user. The identity of the user can be authenticated and based on that determine if the user should be granted access. This can be done with a reader at a portal such as a locked door or entrance into a physical facility guarded by an operator.

In another embodiment, the authentication and login process outlined in FIGS. 4A-4D can be modified and/or applied to a use case where login to services is performed using a username, but no password. For illustration, FIG. 5 is a diagram illustrating a process including a push notification login for purposes of logging into services using a username, but no password, in accordance with one embodiment of the present disclosure. In particular, a user can gain access to services mentioned previously by entering a username and then processing a control button that ultimately verifies the user—we can refer to this as a "Verify" button. In this case, pressing the Verify button causes the browser or portal to send the username entered to its server that then looks up the reference-ID to the user associated with the username. It then sends a request to a server that is able to send direct or vendor specific push notifications to the user's mobile app requesting authentication. The user is prompted with an option to authenticate and login or deny the request. He/she may be challenged with a passcode or a biometric test such as touch ID. If the user agrees, an authentication message is sent back to the server allowing the user to login. This system can be used for both web based browser authentication as well as physical world authentication.

In still another embodiment, the authentication and login process outlined in FIGS. 4A-4D can be modified and/or applied to a use case where remote or local user based login is performed. In particular, a user may be required to allow third party access to his/her account. This can be done where the user is local to the third party or remote from the third party. A local example is when a user goes to a bank branch and wants to allow the teller to have access to his/her account so he/she can perform a transaction or inquiry. A remote example is when a user calls a Call-Center to have the operator on the phone access his/her account to answer a question, perform a transaction or respond to an inquiry. In the physical case, the user may use a QR code authentication scheme. On the other hand, the user may simply provide a user-name, account number, or other identifying information so that the call center is able to identify the user, and access related identifying information. Also, the operator (e.g., call center agent) may then initiate a process to send a Verify request to the user on his/her mobile app (e.g., to device 11 of user 5), wherein the request includes a newly generated session ID. As such, the user 5 will then receive a request that he/she needs to approve after providing a passcode or biometric authentication (such as Touch ID). For example, a message may be displayed on device 11 notifying the user that a login process is requested on behalf of the user by a call center. The message is generated by the call center, and includes a newly generated session ID, for example. The user may accept or reject the login process described in the notification (e.g., selecting an accept or reject button on the display). At this point, the process outlined in FIGS. 4A-4B may begin at connector A and starting at block 440 on FIG. 4B. Upon approval and authentication, a request is sent back to the server connected to the operator's console and after verification of the response, the operator is then authorized to view the user's information based on the rules of their system.

In another embodiment, the authentication and login process outlined in FIGS. 4A-4C can be modified and/or applied to a use case where new registration is performed for securely registering new users to a website of a service provider. For illustration, FIGS. 6A-6D are diagrams illustrating a process for registering new users to a service provider website, in accordance with one embodiment of the present disclosure. In particular, a user visits Service Provider's website and is presented with a registration form. The form has a QR Code or other similar graphics which user can scan with his personal mobile device. As a result of this action the Verifier is notified of the request. Verifier validates user data against 3rd party services, publicly available information and other sources of data. Verifier will produce a verification record which can be used by the Certifier to generate a certification record. Service Provider uses this record and user's data to derive information necessary to complete website registration process. Certification record is cryptographically signed, encrypted and stored to prevent alteration. It can be used to verify the data at later time.

In another embodiment, the authentication and login process outlined in FIGS. 4A-4C can be modified and/or applied to a use case where a user is securely associated with an existing account or user registration in a system of a service provider. In particular, a user visits Service Provider's website and logs in using conventional methods, specific to provider's site. The user navigates to a special page, for example on his profile or setting page and is presented with a form. The form has a QR Code or other similar graphics which user can scan with his personal mobile device. As a result of this action the Verifier is notified of the request. Verifier validates user data against 3rd party services, publicly available information and other sources of data. Verifier will produce a verification record which can be used by the Certifier to generate a certification record. Service Provider uses this record and user's data to derive information necessary to associate this user's identity with an existing account.

Authentication and Login Using a Dynamic Code

As previously described in relation to FIGS. 4A-4B, an alternative method providing authorization for user login into a service (e.g., via a web page) without using a username and password is to scan a code on the web page screen that contains a specific unique session ID (e.g., using a mobile application facilitating identity management). The application can send the necessary credentials to the web server managing the website along with the session ID to allow the user to login without having to enter a username and password on the screen. In particular, the application is configured to respond with the identity of the user as managed through the use of private/public keys. The key is that the user avoids entering a username and password on the login screen and instead, can scan a code enabling the application to allow the scanning device to communicate directly with the service provider during the login process. The code on the screen can be in any form, such as a bar code, QR code, PDF417 code, or any other format. These codes can be referenced interchangeably in this application, but ultimately perform the same functions.

The code may be used for requesting and accessing large amounts of data used during the login process. Though the process can be made secure, especially with the use of secure envelopes of data as previously described, the codes are static and possibly may be copied and used for login by a fraudulent user. For example, the code may be copied by a hacker off of a browser that is viewable by the hacker through various techniques. Because the code has a valid session ID, if the hacker presents the static code to a real user (e.g., displayed on a phishing site), the unsuspecting user can possibly scan the code and assume that he/she is interacting the real site (instead of the phishing site). As a result, the user believes that login credentials are being sent to the real server. The hacker is able to pose as the user, such that the real server may authenticate the user associated with the session ID and allow the user session to be logged in. However, the browser session that is logged in exists on the browser of the hacker and not the real user.

Embodiments of the present invention increases the burden of a hacker through the use of an additional dynamic code, which can be another factor in the authentication and login process described in FIGS. 4A-C. As such, the burden of phishing becomes significantly harder, and a hacker cannot simply copy a static code (e.g., QR code) to fake the user into participating in a fraudulent login process. The user experience remains seamless even with additional steps implementing the dynamic code during the authentication and login process, and the user need not enter a username and password.

Figure 7A:
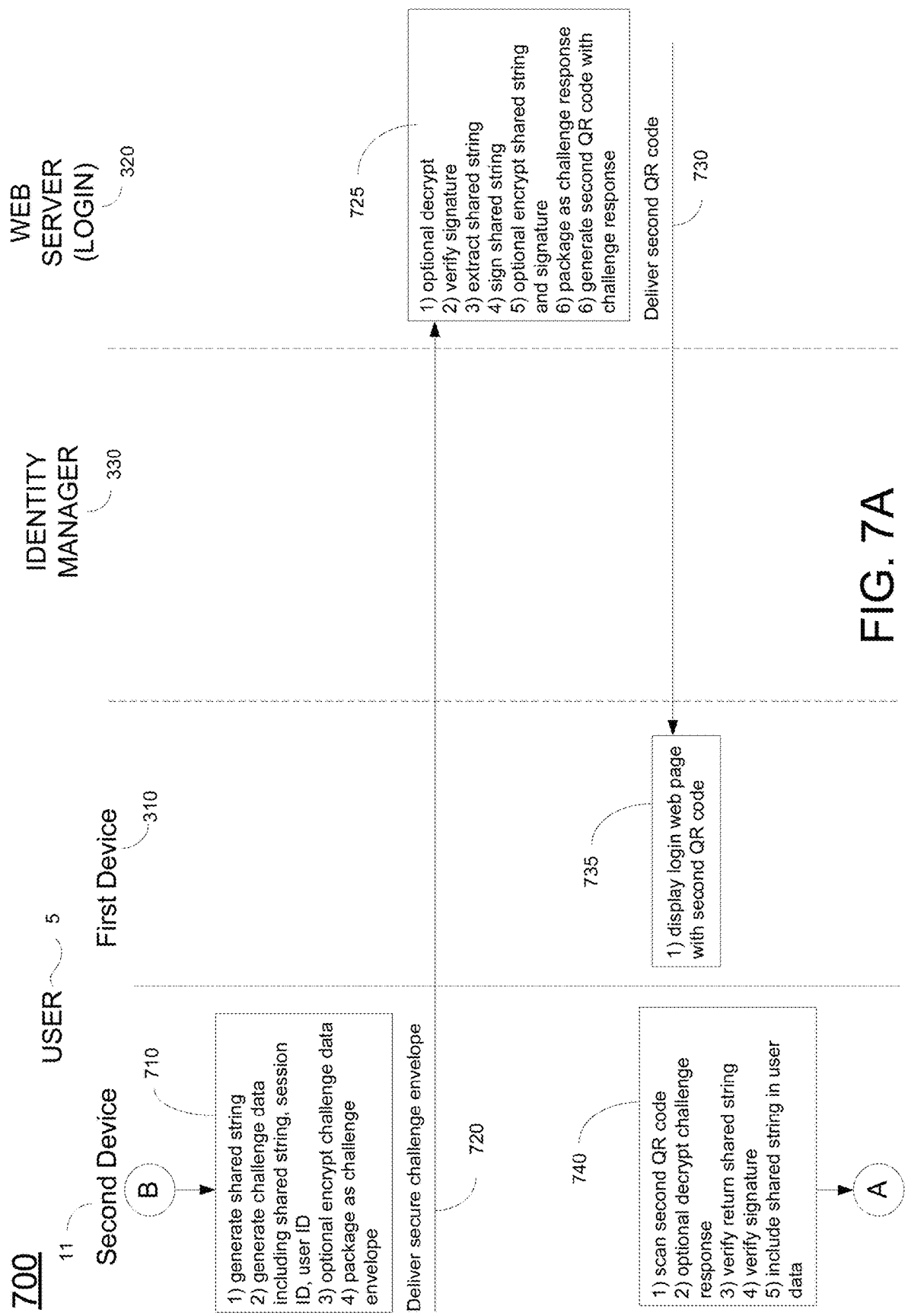
FIG. 7A illustrates a data flow for using a dynamic code to implement a challenge code that is passed between devices used when performing authentication and login onto a web portal of a web server as illustrated in FIGS. 4A-4B, in accordance with one embodiment of the present disclosure.

FIG. 7A illustrates a data flow 700 for using a dynamic code to implement a challenge code that is passed between devices used when performing authentication and login onto a web portal of a web server as illustrated in FIGS. 4A-4C, in accordance with one embodiment of the present disclosure. For example, data flow 700 is implemented in the data flows of FIGS. 4A-4B through connector B, before returning to connector A, such as when a dynamic code is inserted into the authentication and login process to a website of a web server 320. Data flow 700 may be performed to provide additional security by ensuring the proper devices are participating throughout the entire authentication and login process. As previously introduced, the process outlined in FIGS. 4A-4D and 7A-7C assumes that the user is already registered with the service provider (e.g., web server 320), and that the service provider maintains at least the following record on the user: a user identification, such as a name or a username (optional), and a public key of the user that matches the private key maintained by the user in his or her identity management application.

Figure 7B:
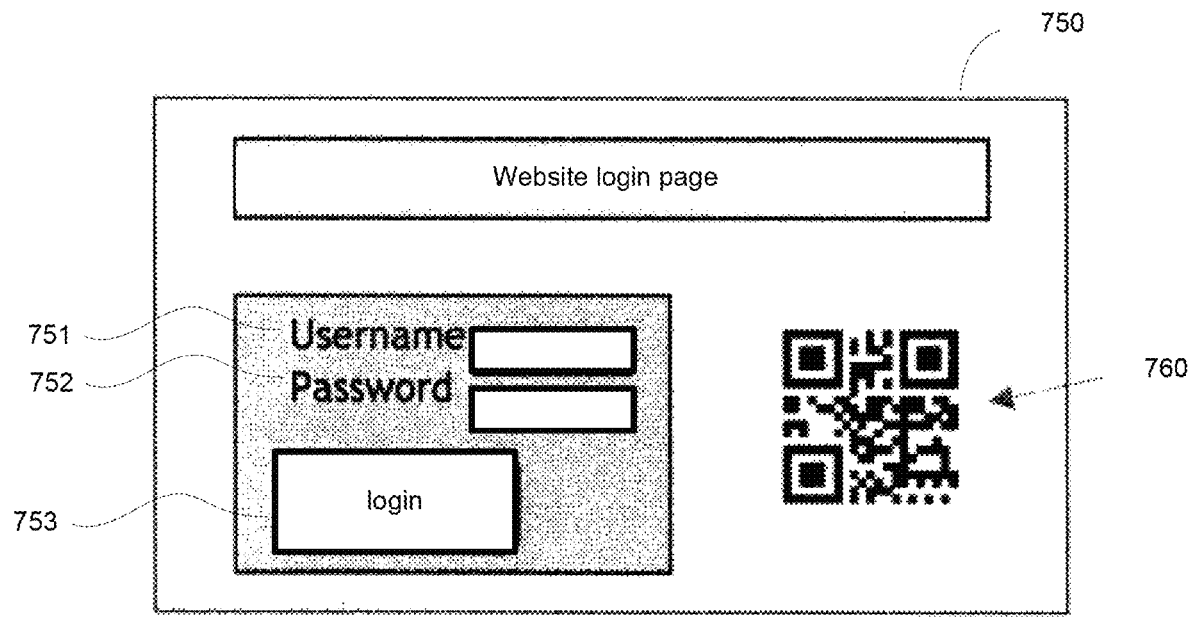
FIG. 7B illustrates a QR code including a session ID, in accordance with one embodiment of the present disclosure.
Figure 7C:
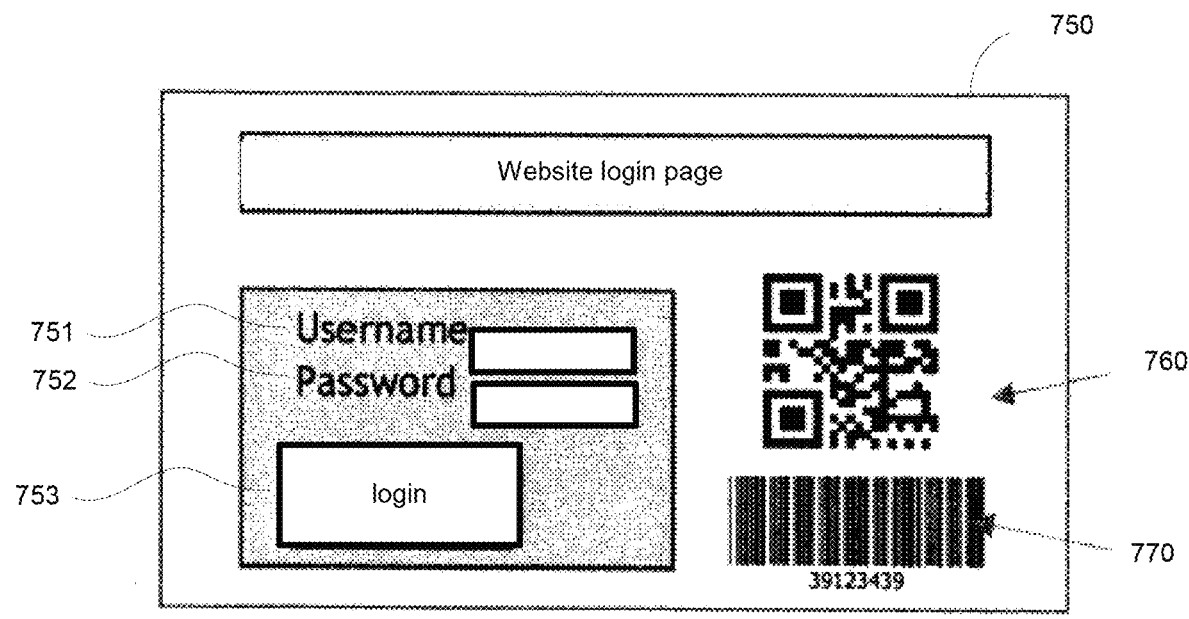
FIG. 7C includes a second bar code including a signed shared-string, in accordance with one embodiment of the present disclosure.

As shown in FIG. 7A, the authentication and login process performed before connector B is shown in FIGS. 4A-4B. In particular, the website login page 750 of FIGS. 7B-7C may or may not display username and password fields 751 and 752, respectively, for purposes of login. However, the login page 750 would display a code 760 (e.g., QR code) that a user can scan for use by an identity management application, as is shown in FIGS. 7B-7C. For example, the QR code 760 contains a session ID and the URL of the web server 320 requiring a response to a login challenge.

The user scans the QR code 760 to retrieve the referring URL, as well as the session ID. The session ID may be digitally signed by the web server 320 to provide that it was generated by the service provider (e.g., web server 320) that the user intended to interact with. As such, the user can verify the signature using the public key of that service provider. The verification step is optional. Additionally, the QR code may contain other information, including codes that indicate that this is a login request or challenge. In particular, the a first scannable code (e.g., QR code 760) is scanned on a login web page 750 of a web server 320, wherein the login webpage 750 is displayed on a first device 310 associated with the user 5. The scannable code includes an envelope ID and a login challenge, wherein the envelope ID is associated with a first envelope of data generated by the web server 320 and includes a session ID. The envelope ID is generated by an identity manager 330 at the request of the web server 320, and wherein the envelope ID is used to request the first envelope of data from the identity manager 330.

Beginning with block 710 of FIG. 7A, various operations are performed by the second device 11 after scanning the QR code 760, receiving back the envelope of data, and performing other operations on that data. In particular, a unique shared-string is generated. This can be a random string that is created on-the-fly (e.g., a GUID). Other challenge data is generated by the device 11, including at least one of the shared-string, session ID, user ID, etc. generally, the session ID and the shared-string is digitally signed using the private key of the user to prove that the second device 11 generated the request, and passes the data to the referring URL. For example, a hash of the challenge data may be digitally signed using a private key of the user to prove the trustworthiness of the challenge data later presented. A challenge envelope of data is generated and includes at least one of the shared-string generated by the second device, a first digital signature of a hash of the shared-string using a private key of the user, and a user ID.

The message sent to the web server 320 may be optionally encrypted with the public key of the web server 320. That is, the data in the envelope may be optionally encrypted using the public key of the web server 320. The public key is either known to the user during registration, or included in the QR code 760.

The challenge data (encrypted or not) in the challenge envelope is delivered to the web server 320 in operation 720 over a network. At the web server 320, various operations are performed as outlined in block 725. A decryption process is performed using the private key of the web server 320, if the data in the challenge envelope was encrypted.

In addition, the web server 320 may verify the signature against the data in the challenge envelope (e.g., at least one of the shared-string, session ID, etc.) using the public key of the user 5. As previously described, the verification logic is well known, and includes inputting at least one of the challenge data provided in the envelope (e.g., session ID, the shared-string), the public key of the user, and the signature of the challenge data (hashed or no hash), wherein the verification logic confirms or denies the verification of the challenge data. In one embodiment, if the public key of the user was passed with the challenge envelope/request, the public key may be used as the user ID. Otherwise, another user identification must be passed to the web server 320, so that the server can look up the public key in its records (and to identify the user 5). If the signature is verified, the web server 320 knows that the user 5 in possession with the private key did indeed sign the session ID (along with the data in the envelope), that was previously generated by the web server 320. That is, the session ID can be trusted.

The web server 320 generates a challenge response including the shared-string and a signature of the shared-string. That is, the shared-string created by device 11 of the user 5 is extracted from the challenge envelope, and signed by the web server 320 using its private key. Optionally, the data included in the challenge response may be encrypted using the public key of the user.

The challenge response is included in a second code 770 generated by the web server 320. The new display code could be another QR code, or even one of a different format, such as a bar code, or PDF417 code, etc., as is shown in FIG. 7C. At operation 730, the challenge response is delivered to the first device 310 of user 5. In particular, in operation 735 the new code 770 is passed back to the login web page. The login webpage is updated to include the new code 770, wherein the web page can either remove the initial scannable code 760 (e.g., QR code) including the session ID and display the second code 770, or the webpage can display the second code 770 concurrently with the first code 760 (e.g., adjacent to the first code 760).

Importantly, the dynamically created shared-string is displayed using the proper form (e.g., contained within the second code 770), so that the second device 11 of user 5 can scan the second code 770, and allow the identity management application to confirm that the web server 320 is establishing a session with a device of the user (e.g., first device 310 and/or second device 11) during a login process using both user devices, and not trying to establish a session with some other user. In particular, block 740 includes various operations performed by the second device 11 of user 5. The second scannable code 770 includes a challenge response including at least one of the shared-string and the digital signature of the hash of the shared-string (e.g., signed using the private key of the web server 320). After scanning, the data contained in the challenge response is optionally decrypted using the private key of the user, if the data was previously encrypted. The shared-string is extracted.

In addition, device 11 is configured to verify the signature of the data in the challenge response (e.g., the shared-string). Verification of the signature is performed to ensure that the web server 320 received the challenge envelope and that the web server has acknowledged by sending the challenge response that is digitally signed. As previously described, the verification logic is well known, and includes inputting at least one of the data provided in the challenge response (e.g., the shared-string), the public key of the web server 320, and the signature of the data (hashed or no hash) in the challenge response, wherein the verification logic confirms or denies the verification of the response data (e.g., the shared-string). In addition, verification of the returned shared-string included in the challenge response is performed to ensure the same value for the shared-string is being passed throughout this portion of the login process.

After successful verification of the shared-string and the signature, the shared-string may be included in the user data, previously described in FIGS. 4A-4B. That is, the process returns back to FIGS. 4A-4B through connector A, and now includes the shared-string as another factor for authentication. In short, returning back to the data flow 400 through connector A, the device 11 sends a request to the web server 320 with an authorization to login. Device 11 signs both the session ID and the shared-string along with a confirmation request to login. The data in the message is optionally encrypted using the public key of the web server 320, and sends the confirmation request to the web server 320. In other words, a confirmation login request is generated by device 11 which responds to the login challenge, wherein the confirmation login request includes a second envelope of data comprising at a minimum the shared string and optionally the session ID, the user ID, and a seal of the user ID registering the user ID with the identity manager. The confirmation login request is delivered to the web server (e.g., via the identity manager) for authentication and login of the user with the web server. In response, after the web server 320 receives the message (e.g., second envelope of data), the data contained therein is optionally decrypted. All the signatures are verified to be authentic from the user 5 (e.g., verified with the public key of the user). After successful verification, the user is logged into the web site of the web server 320, and the web server 320 pushes out a landing page for display by the browser of the user (e.g., on the first device 310).

Authentication Using Certified User Generated Data (Biometrics)

Figure 8A:
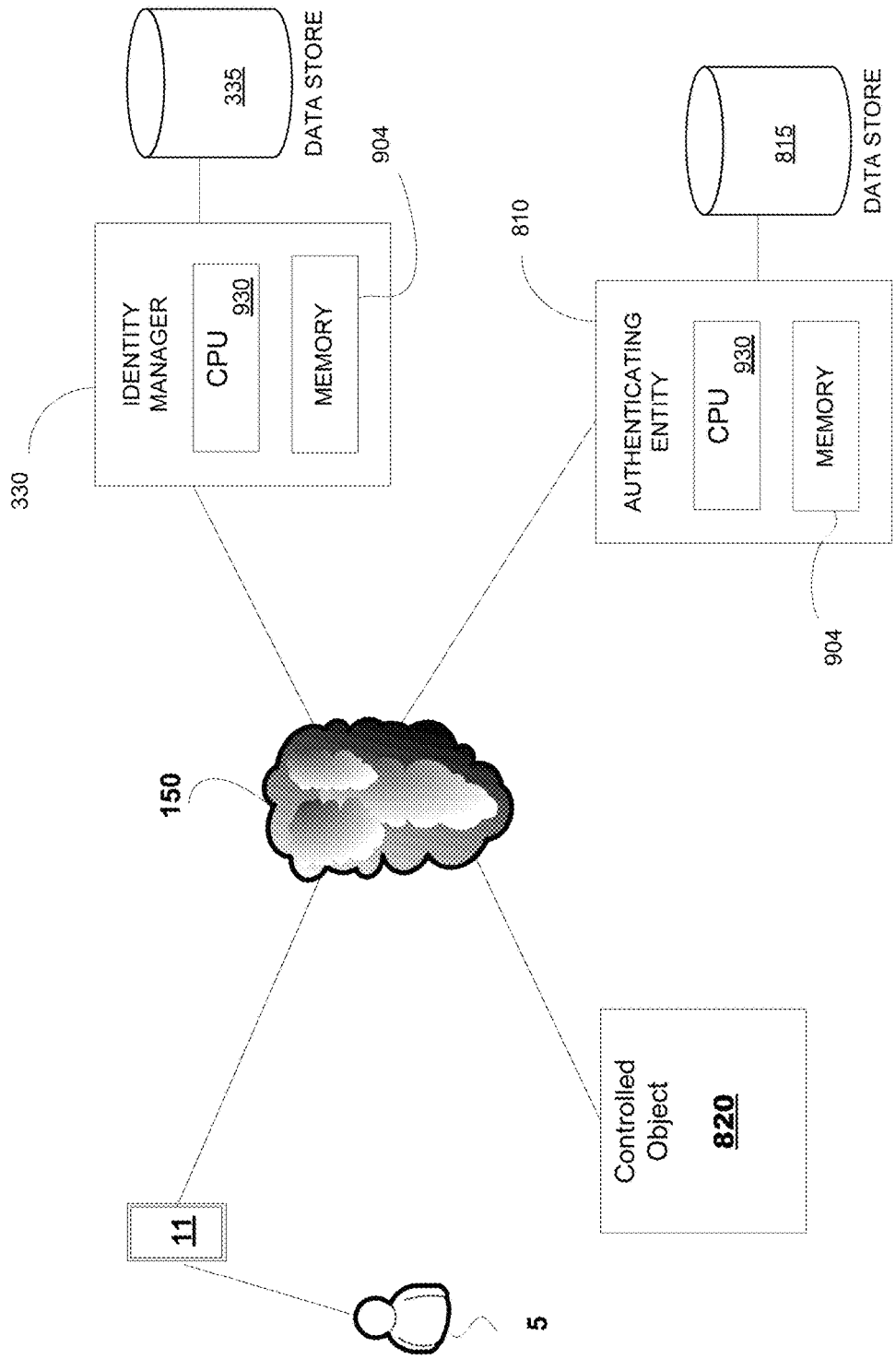
FIG. 8A is a diagram illustrating a system for performing biometric authentication of a user, in accordance with one embodiment of the present disclosure.

FIG. 8A is a diagram illustrating a system 800A for performing biometric authentication of a user 5, in accordance with one embodiment of the present disclosure. Authentication may be performed in conjunction with a login process, previously introduced in FIGS. 3-7, in some embodiments. In other embodiments, the biometric authentication process may be performed to control access to services, objects, devices, etc. It is important to note that biometric controls such as TouchID are generally used for Access Control to an App, App function or a mobile device. However, as implemented today, the biometrics of the user is not made available such that a server can do a biometric authentication. Using TouchID in one embodiment would require a server to trust a mobile device, such as device 11 in FIG. 6A. Biometrics authentication described in this method allows the server to biometrically authenticate the user.

For example, user 5 interacts with authenticating entity 810 for purposes of authenticating the user, such as for controlling access to products and/or services. User 5 is associated with device 11, previously introduced, which is used for interacting with the authenticating entity 810. In general, device 11 is configured for communication with authenticating entity 810 over network 150 (e.g., internet, phone, etc.). For example, device 11 may include a web browser configurable for communication over network 150.

Authenticating entity 810 includes any type of computing device having at least a memory 1404 and a processor module 1430 that is capable of connecting to the network 150. Data store 815 may be controlled and/or accessible by entity 810. Authenticating entity 810 may be configured to provide information and/or services over network 150, such as through a website, and may use the biometric authentication process as part of an authentication and login process providing access to the web server 320, as previously described in FIGS. 4A-4D and 7. In other embodiments, authenticating entity 810 may be configured to control access to products and/or services. For example, authenticating entity 810 is configurable to control access to object 820 to user 5, once the user has been authenticated using biometric data that is registered and/or certified. Object 820 may take on any form, including products, services, applications, doors, entryways, etc. In one example, object 820 may be an automobile that is available for short term leasing (e.g., hours, weeks, months, etc.). User 5 has leased the object for a period of time, and the authentication process is performed to provide access to the object 820 once the user 5 has been authenticated using biometrics. In addition, authenticating entity 810 is configured to implement the identity management technology used to perform registration, validation, and/or certification of raw data, to facilitate the implementation of biometric authentication (e.g., through the verification of the biometric data, and certification of biometric data.

Identity manager 330 includes any type of computing device having at least a memory 1404 and a processor module 1430 that is capable of connecting to the network 150. Identity manager 330 may be utilized for registration of the user ID associated with user 5, and more specifically the user generated biometric data. Data store 335 may be controlled and/or accessible by identity manager 330. As such, identity manager 330 may be used, in part, to implement technology to perform registration, validation, and/or certification of raw data, as will be further described below to facilitate the implementation of authenticated login, registration, call center validation, and authentication and certification of user generated data (e.g., biometrics).

Figure 8B:
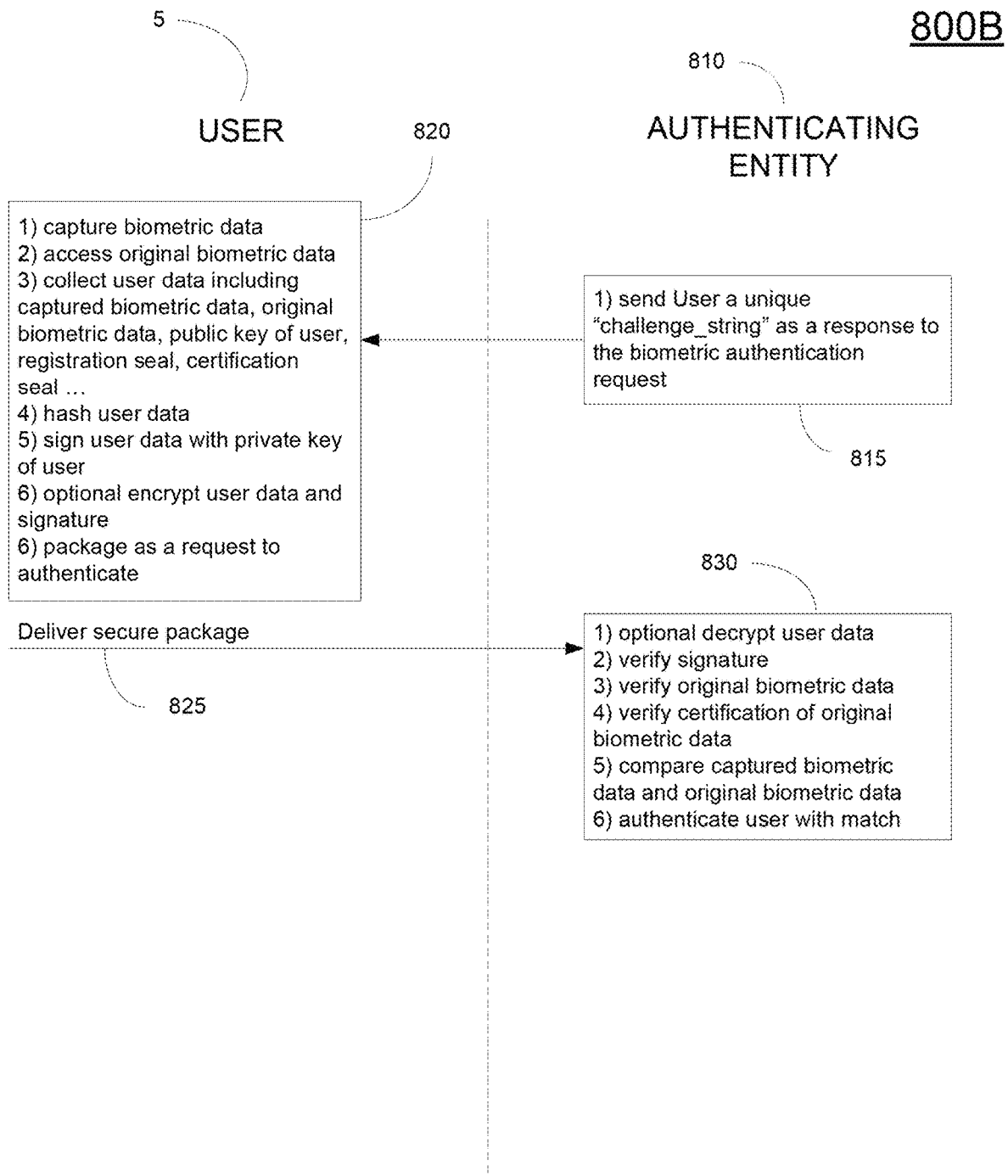
FIG. 8B illustrates a data flow for using the verification of the certification of user generated data (e.g., biometrics), such as in a method for authenticating the user, to control access to products and/or services, in accordance with one embodiment of the present disclosure.

FIG. 8B illustrates a data flow 800B for using the verification of the certification of user generated data (e.g., biometrics), such as in a method for authenticating the user, to control access to products and/or services using a biometric authentication process, in accordance with one embodiment of the present disclosure. Data flow 800B may be implemented within system 800A of FIG. 8A to perform the biometric authentication process.

In particular, newly captured biometric data is associated with original biometric data, wherein the original biometric data is registered, validated, and/or certified. The newly captured biometric data and the original biometric data is used to perform biometric authentication. For purposes of illustration, an original image (e.g., facial image) of user 5 is used for the biometric data, while it is understood that the biometric data may take on any form (e.g., audio, fingerprint, body part imaging, facial image, iris, DNA, etc.).

In one embodiment, the original biometric data (e.g., original image) is registered, validated and/or certified using a blockchain. User 5 also has a copy of the original biometric data, as well as corresponding registration and certification information (e.g., seals), such as by storing that information on device 11. In another embodiment, the blockchain is not used to store the original biometric data that is registered and certified. For example, a central server could maintain the signature.hash(original image), wherein the central server could be the identity manager 330, or the authenticating entity 810 (e.g., stored on data store 815).

As shown in FIG. 8B, block 820 includes operations performed by device 11 of user 5. At operation 815, the authenticating entity 810 sends the user 5 a unique challenge_string that the user is expected to use in the authentication correspondence. In particular, biometric data is newly captured by device 11 (e.g., camera capturing a facial image of user 5). As such, device 11 has a copy of the original biometric data (original image) that was registered and certified (with supporting information on the device 11), and the newly captured biometric data (newly captured image), both of which can be delivered to the authenticating entity 820 for purposes of performing biometric authentication. In particular, user data is collected, to include at least one of the captured biometric data, the original biometric data, the challenge_string, the public key of the user 5, the registration seal, the certification seal, etc. The user data is hashed, and then signed using the private key of the user. The user data and the signature of the hashed user data may be packaged in an envelope of data, for example as a request to authenticate. In one embodiment, the contents within the request package is optionally encrypted using the public key of the authenticating entity 810. The secure envelope is delivered to the authenticating entity 810 in operation 825.

Block 830 includes various operations performed by the authenticating entity 810. In particular, entity 810 is configured for receiving from device 11 of user 5 a user envelope of data. The user envelope includes user data and a signature of a hash of the user data signed by a private key of the user. The user data includes at least one of a user ID (e.g., recognizable by the authenticating entity 810), newly created biometric data, newly presented original biometric data associated with the newly created biometric data, the unique challenge_string, a registration seal associated with the original biometric data comprising a first transaction number of a first blockchain, and a certifying seal associated with the original biometric data comprising a second transaction number of a second blockchain, wherein the second blockchain may incorporate the first blockchain in one embodiment.

In addition, the signature of the user data is verified in order to confirm that the data is trustworthy. As previously described, the verification logic is well known, and includes inputting at least one of the user data (e.g., original biometric data), the public key of the user 5, and the signature of the user data (hashed or no hash), wherein the verification logic confirms or denies the verification of the user data in the envelope. This signature of the user data also guarantees that the user data, including the new biometric data, is a fresh response to the exchange between the authenticating entity and the user and it is not an old, reused package of data being sent. This can be established since the user data includes the new biometric data along with the challenge_request among other data units and the fact that the entire user data is digitally signed by user 5's private key. Since the challenge_request is unique in each exchange, it is not possible to reuse this user data in another exchange with a different challenge_request without first signing it. Therefore, not only does user 5 have to provide newly captured biometric data, it has to be able to sign it in real time in conjunction with the unique challenge_request that changes for every request. This increases the burden for a hacker as they need to both have biometric data to pass on as a new image, but also have the access to the private key of the user to sign the new request (since the old signatures won't work with the new challenge_request).

Further, the original biometric data is verified. The verification logic is well known, and includes inputting at least one of the original biometric data, the public key of the user 5, and the registration seal (including the transaction identifier pointing to the stored data in the blockchain, for example). Also, the certification of the original biometric data is verified. In particular, the verification logic is well known, and includes inputting at least one of the certification record, the original biometric data, the public key of user 5, the certification seal (including the transaction identifier pointing to the stored certification data in the blockchain, for example).

In general, the verification process can be summarized in the following steps: step 1) get challenge_string, original image, and newly captured image; step 2) get signature.hash (original image) from the blockchain record; step 3) hash (original image); step 4) verifysignature(hash(original image), signature.hash(original image), public_key.signee);

and step 5) verify envelope signature with hash(message data including biometric data and challenge_string), 6) if step 4 and 5 was valid, then perform biometric comparison between original and new biometric data (e.g., imagecomparison(original image, newly captured image)).

In particular, once the verification of the registration and certification of the original biometric data is successfully completed, a comparison process is performed. In particular, the newly captured/created biometric data is compared against the newly presented original biometric data (e.g., a copy). The user is authenticated when the newly captured/created biometric data and the newly presented original biometric data match.

At this point, additional processes may be performed. For example, the previously introduced (e.g., in FIGS. 3-7) authentication and login processes may be completed, in conjunction with the biometric authentication process. In this case, authentication of the user biometric is another factor in the authentication and login process. Also, in another example, a process for controlling access to object 820 may be performed. For example, the object 820 may be unlocked for user 5 if authentication is successful. On the other hand, object 820 may remain locked for user 5 is authentication was unsuccessful.

Use Case for Transportation Service

FIGS. 9A-9B, and 10-12 combined describe processes involved when performing authentication and login for travelers, transportation agents, and transportation services. Use cases are disclosed for the various parties involved. In particular, FIGS. 9A-9B describe processes performed on the traveler side in a traveler use case. The traveler use case is taken from the standpoint of a Traveler who wishes to access various forms of transportation services (e.g., airline, bus, train, etc.). In general, the sequence flow for the traveler use case includes: 1) Traveler setting up his/her App; 2) Traveler taking a selfie and publishing it for use; 3) Transportation Agent screening and ultimately certifying the traveler ID & selfie, and further giving the Traveler a travel-token; 4) at a later point, the Traveler can present trip-credentials including, traveler ID, selfie, and travel-token so that the traveler information can be retrieved and verified, and so that a new picture can be taken of purposes of performing face recognition in order to confirm the user/traveler. A separate sequence is disclosed for the Transportation Agent as he/she is added to the Transportation Service system in order to be able to login while in the Transportation Service station (e.g., an airport) so that he/she can perform traveler check-in and verification. A Transportation Service is an entity such as an airline that provides transportation for persons. The concepts described below (e.g., in relation to transportation service) might well be used in other embodiments by entities that provide transportation for nonpersons (e.g., goods) or services in addition to other services other than transportation. In particular, FIGS. 10-12 are more focused on processes performed on the Traveler Agent side in a transportation service use case. In general, the sequence flow for the Transportation Service use case includes: 1) Transportation Agent newly registers with the Transportation Service portal for the first time; 2) an Admin who operates the Transportation Service portal confirms the Transportation Agent as a valid employee and grants access; 3) the Transportation Agent subsequently logs into the Transportation Service portal to perform his/her duties. This operation may only be done while on the Transportation Service station premises, in one embodiment.

Figure 9A:
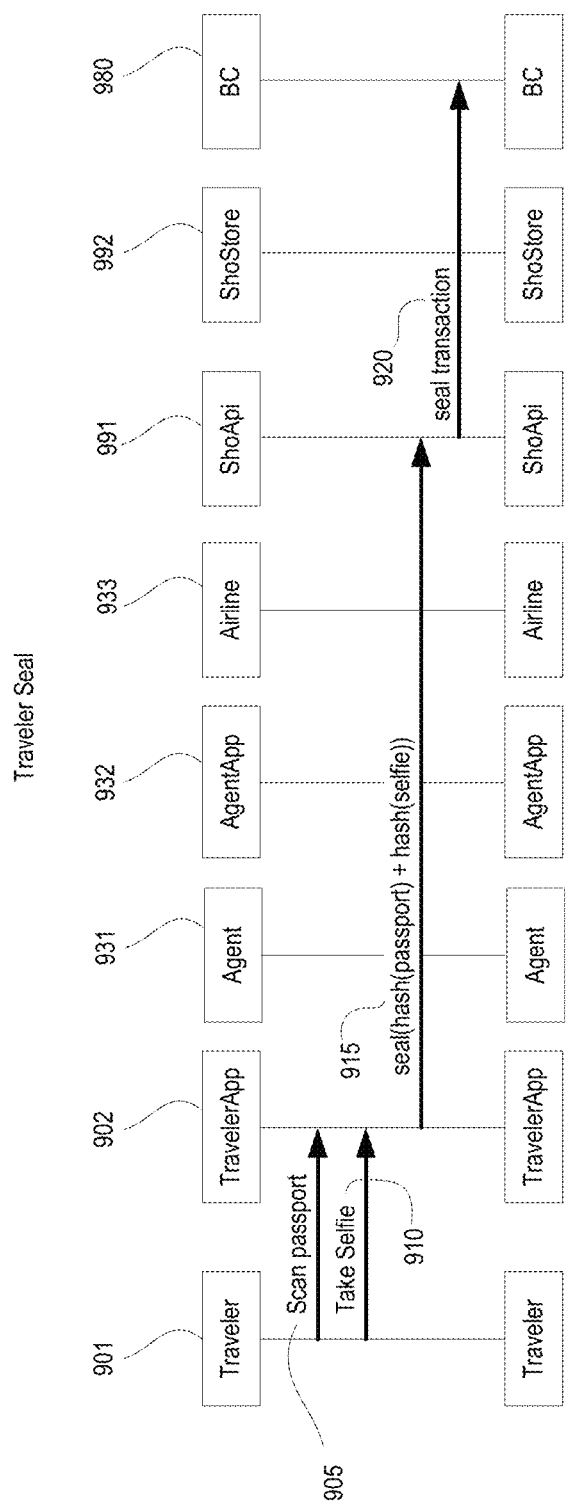
FIG. 9A is a diagram illustrating a process for registering and validating a user, which in this case is the Traveler, in accordance with one embodiment of the present disclosure.
Figure 9B:
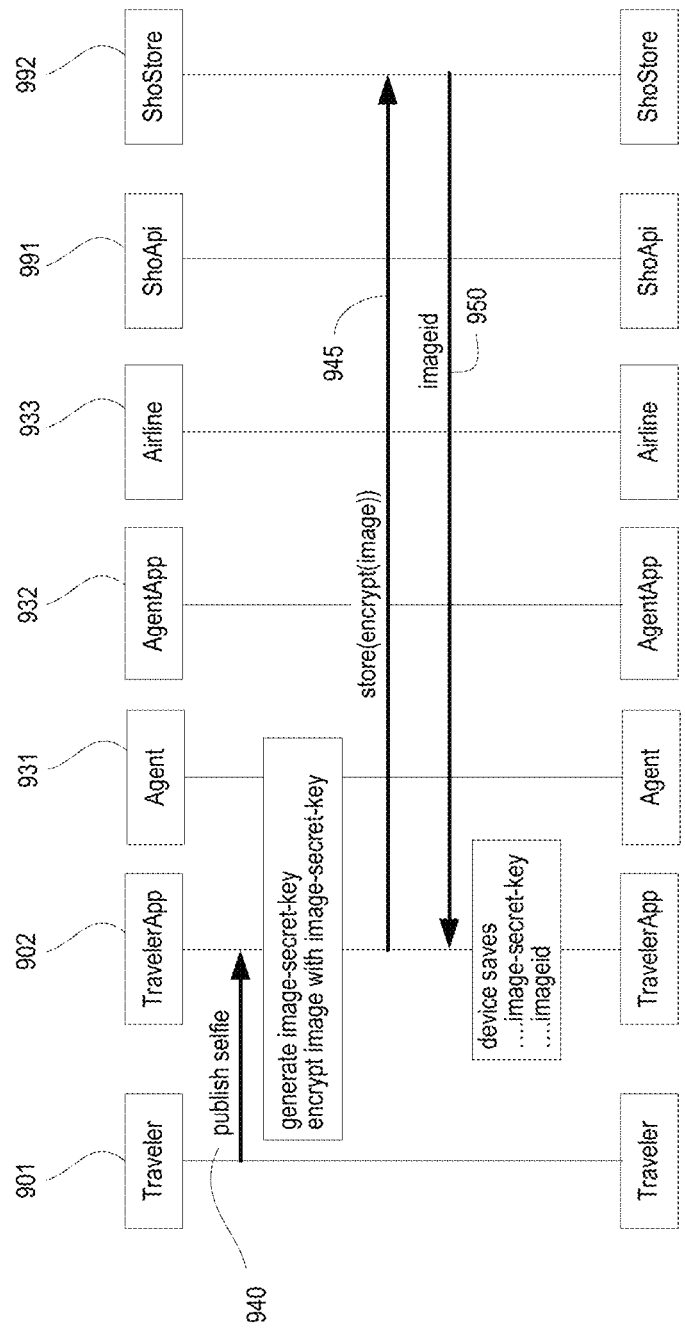
FIG. 9B is a diagram illustrating a process for registering and validating the image of the Traveler (e.g., selfie), in accordance with one embodiment of the present disclosure.

As previously introduced, FIGS. 9A-9B describe processes performed on the traveler side in a traveler use case. FIG. 9A is a diagram illustrating a process for registering and validating a user, which in this case is the Traveler 901, in accordance with one embodiment of the present disclosure. The Traveler 901 is assumed to have downloaded a Traveler App 902 providing an interface and functionality for performing the registration, validation, authentication, login, etc. At this point, at operation 905 the Traveler 901 scans his/her passport or a required form of government ID, and at operation 910 takes a selfie using his/her Traveler App 902. The Traveler App 902 then creates a signed hash of the passport information, and a separate signed hash of the selfie. Optionally, the data given to the hashing algorithm can include the data to be hashed along with a random data string, referred to as a Salt. The resulting hash is then digitally signed. This process prevents a hacker from discovering the data through brute force. In this optional process, the user must always pair and pass the data (e.g., passport information) with the corresponding Salt values in order for a verifier to validate the signatures.

At operation 915, this information is sent to the identity-management service server to be sealed. The identity-management service server "ShoStore" 992 is accessed through an API 991 called "ShoApi". ShoApi 991 is configured to also provide access to the blockchain database "BC" 980. Throughout this specification, the term "ShoStore" is also referred to as "ShoCard") server to be sealed. At operation 920, the server forwards the request to the blockchain 980 to be written as a transaction. This becomes the Seal of the Traveler 901.

Next, the Traveler 901 needs to setup her selfie so that it can be retrieved later at her request. FIG. 9B is a diagram 900B illustrating a process for registering and validating the image (e.g., selfie) of the Traveler 901, in accordance with one embodiment of the present disclosure. This is achieved via a delayed-secure-envelope transmission, in one embodiment. Normally, communication between the Traveler 901 (the user of the identification-management service—"ShoStore") and another user or entity (such as a transportation service—"airline" 933) is performed through a secure-envelope transmission. In this process, the Traveler 901 creates the message that is to be transmitted, and envelopes it securely so it cannot be spoofed by any other third party (e.g., hacker) in any way (including the ShoStore servers 992). In a delayed-secure-envelope transmission, the message is created and enveloped securely, but stored for a delayed use when the Traveler 901 authorizes the transmission to the appropriate party of her choosing, such as the airline 933.

To establish delayed-secure-envelope transmission, at operation 940 the Traveler App 902 generates an image-secret-key that is kept on the Traveler App only. The Traveler App 902 also encrypts the Traveler's selfie. This information is encrypted and packaged as a message. At operation 945, the encrypted message is then stored with the ShoStore server 992, and an imageId is returned to the Traveler App 902 that references that encrypted message. The Traveler App 902 stores both the image-secret-key for the message and the ShoStore imageId. At this point, the Traveler App 902 is ready to use the image as a form of registered identification with the transportation service 933.

Figure 10A:
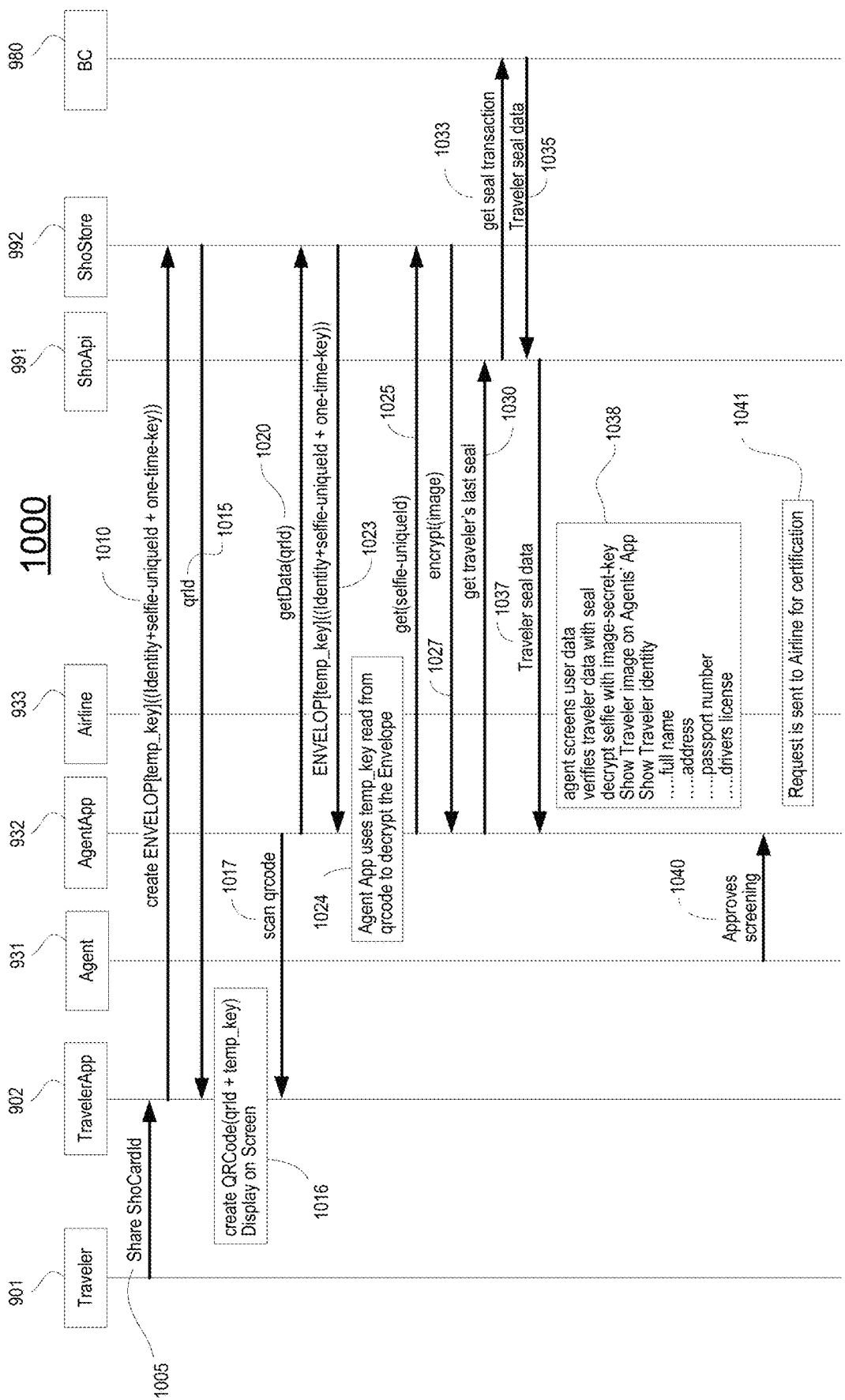
FIGS. 10A-10B are diagrams illustrating the authentication of a Traveler at a transportation service (e.g., airline), in accordance with one embodiment of the present disclosure.
Figure 10B:
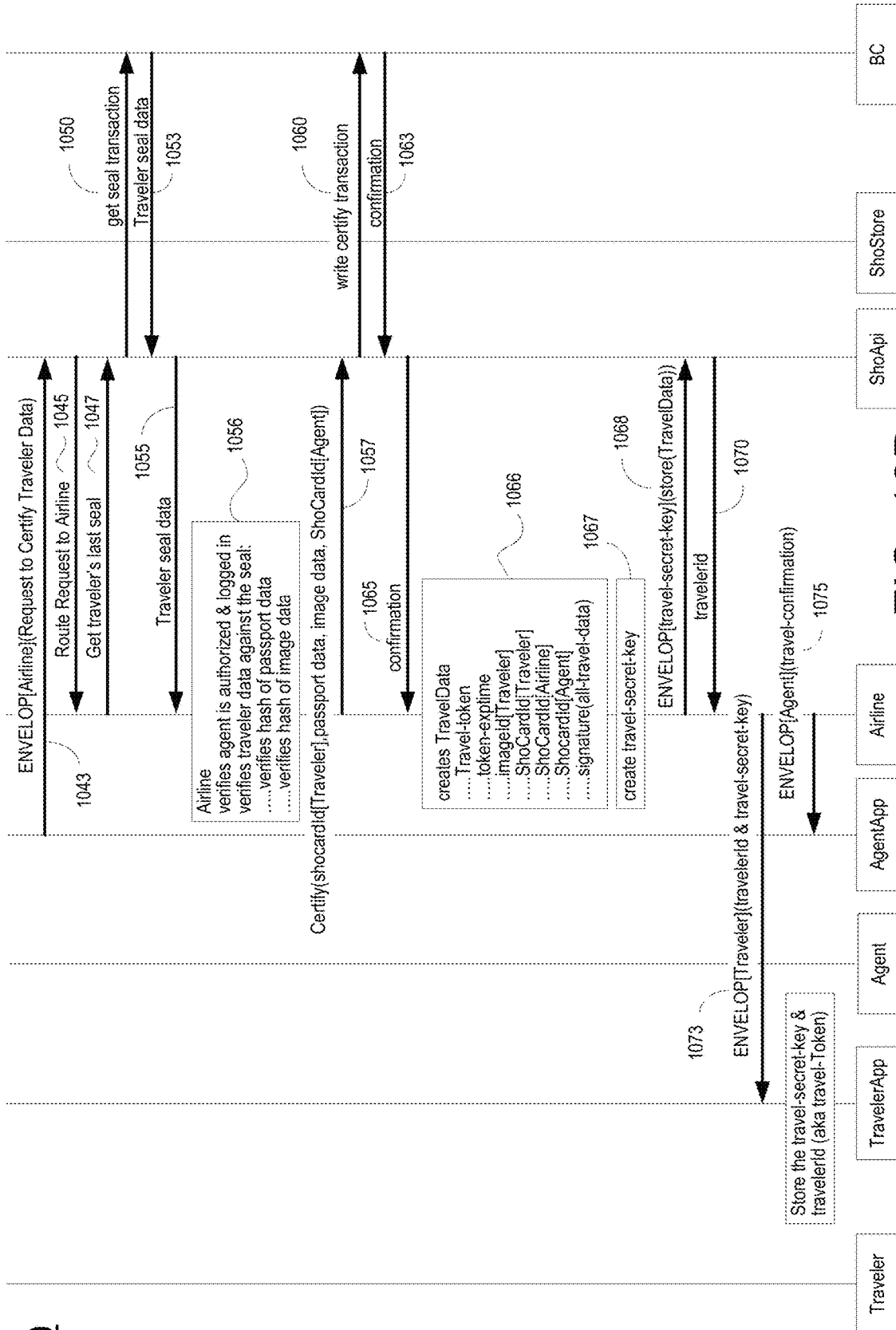

FIGS. 10A-10B are diagrams 1000 illustrating the authentication of the Traveler 901 at a transportation service 933 (e.g., airline), in accordance with one embodiment of the present disclosure. For example, the Traveler 901 shows up at the transportation service 933 and is greeted by an Agent

931. The Traveler 901 initiates sharing her ShoStoreId by creating a QRCode on her Traveler App 901 at operation 1005 <Share ShoCardID>. The ShoStoreID is provided by ShoStore 992, the identity-management service, during the registration process of the Traveler 901. The ShoStoreID may also be referenced as "ShocardID" in the figures and elsewhere in the specification. In addition, the ShoStoreID may include a transaction ID referencing the location in the blockchain 980 where the user data is stored. In order to create this QR Code, the Traveler App 902 creates a secure-envelope that includes her passport identity information along with her ShoStoreId, the imageId she received when she created her stored encrypted image, and the image-secret-key used to decrypt the stored image. The envelope is secured with a temporary passcode, temp-key, that encrypts the entire message. The envelope is sent to the ShoStore 992 at operation 1010 <create ENVELOP [temperature_key] ((Identity+selfie-uniqueID+one-time-key))>. The ShoStore 992 returns a QR Id that uniquely identifies this secure-envelope to the Traveler App 902 at operation 1015 <qrID>.

The Traveler App 902 then creates a QRCode with two pieces of information in operation 1016 <create QRCODE (qrId+temporary_key), and Display on Screen>. First is the QR ID returned from the ShoStore 992, and second is the temp-key (e.g., public key of ShoStore 992) necessary for the receiver (Traveler App) to decrypt the secure envelope.

Using the Agent App 932, the QRCode is scanned by the Agent 931 at operation 1017. The App 932 temporarily saves the temp_key in the QR code, and uses the "qrId" field to send a getData request to ShoStore 992 at operation 1020 <getData(qrId>. ShoStore 992 returns the secure-envelope that the Traveler 901 had saved, and simultaneously removes that secure-envelope from ShoStore at operation 1023 <ENVELOP[temperature_key]((Identity+Selfie-uniqueID+one-time-key))>. The Agent App 932 uses the temp_key retrieved from the QR Scan to decrypt the envelope at operation 1024. The Agent App 932 then makes a request to the ShoStore to retrieve the encrypted selfie-image referred to by the imageId at operation 1025 <get (selfie-uniqueId)>. At 1027, the encrypted image is returned. Next, the Agent App 932 retrieves the Travelers' latest Seal record via ShoApi from the blockchain 980 at operations 1030, 1033, 1035, and 1037, wherein operation 1030 sends a request to ShoApi 991 for the seal <Get traveler's last seal>, wherein operation 1033 sends the request to the blockchain 980 <get seal transaction>, wherein operation 1035 delivers the seal data to ShoApi 991 <Traveler seal data>, and wherein operation 1037 delivers the traveler seal data back to Agent App 932 <Traveler seal data>.

Alternatively, if the Traveler 901 does have network connectivity, it can create a QR Code on its App requesting the id information of the Agent and its public key in order to share data. In this case, the Agent 931 scans the QR Code of the user to identify its ShoCard ID so it can send it messages and notifications. It then creates a Secure Envelope and within it, it embeds its own ShoCard ID and public key. The Traveler 901 then creates the secure-envelope described earlier, but encrypts it with the Agent's public key instead of temp_key described above. It then sends the secure_envelope to the Agent 931.

As another alternative, if the Traveler 901 does not have network connectivity, it can exchange data with the Agent's device directly using Bluetooth, NFC, Streaming QR Codes as described in another embodiment, or other means of local transmission of data. In this scenario, the Traveler 901 would still retrieve the Agent's ShoCard ID and public key using local transmission of data and return to it the complete secure_envelope using local transmission of data.

At this point, the Agent 931 has all the digital assets it needs to verify the user—this process is referred to as "screening" the user data, as performed in operation 1038. In particular, the Traveler's passport data passed via the QR Scan is compared to the data on the blockchain (e.g., verifies traveler data with seal). Also, the selfie-image passed is decrypted (e.g., decrypt selfie with image-secret-key) and made viewable on the Agent's App—the agent does a visual comparison of the selfie and the Traveler. Alternatively, the Agent may snap a new image of the user and use systems to perform a biometric comparison of the image taken and the image passed by the Traveler 901. The Agent may now verify the physical documents that the Traveler presents such as physical passport, driver's license, travel itinerary or ticket and other required information (e.g., full name, address, passport number, driver's license number, etc.). This process may also be automated with a self-service kiosk or other non-human devices to validate the Traveler's data.

If all checks out and are valid, the Agent approves the screening using the Agent App 932 at operation 1040 <Approves screening>. This approval becomes a request for a certification message to the transportation-service server, at operation 1041 <Request is sent to Airline for certification>. The request to certify, is created and it includes the Agent's ShoStoreId, approval-code, and all the information that was retrieved in the QR Scan from the Traveler 901. At operation 1043 <ENVLOP[Airline](Request to Certify Traveler Data)>, this request is placed in a secure-envelope with the Transportation-service server's public key and transmitted to ShoApi 991, for routing to the Transportation-service server 933 at operation 1045 <Route Request to airline>.

The Transportation-service server 933, upon receiving the request at operation 1045, retrieves the Traveler's last seal from the blockchain via ShoApi 991 at operation 1047 <Get traveler's last seal>, wherein operation 1050 forwards the request to the blockchain 980 <get seal transaction>, wherein operation 1053 returns the seal to ShoApi 991 <Traveler seal data>, wherein operation 1055 returns the seal to the transportation server 933 <Traveler seal data>. The transportation server 933 is configured to verify the identity of the Agent 931 using the Agent's ShoStoreId. In addition, the transportation server 933 is configured to ensure that the Agent has an active logged-in session at the transportation service station. The transportation server 933 then verifies the Travelers' passport data and image-hash against the Seal record <verifies traveler data against the seal>_<verifies hash of passport data>_<verifies hash of image data>, etc.

If everything matches, transportation server 933 sends a certification request to be written to the blockchain for the Traveler 901 at operation 1057 <certify(shocardId[Traveler], passport data, image data, ShoCardId[Agent]>, at operation 1060 <write certify transaction> writing certification record data to blockchain 980, at operation 1063 <confirmation> confirmation of the blockchain transaction is returned, and at operation 1065 <confirmation> the confirmation information (e.g., blockchain transactionID, etc.) is delivered to transportation server 933. The certification record specifically identifies the passport fields confirmed and the hashed-image-data.

Once the Certification is completed, the Transportation-service server creates the Traveler's TravelData at operation 1066. This TravelData includes at least one of a Traveltoken, Traveler's ShoStoreId (ShoCardId[Traveler]), expiration time for the Traveltoken, imageId of the Traveler (imageId[Traveler]), the ShoCardId of the transportation service (ShoCardId[Airline]), optionally the Agent (ShoCardId[Agent]), and a signature of all of these fields using its own private-key <signature(all-travel-data)>.

The Transportation-service server 933 then places the TravelData in a secure-envelope encrypted with a new password it creates, namely travel-secret-key at operation 1067 <create travel-secret-key>. This secure-envelope is sent to the ShoStore server as another delayed-secure-envelope at operation 1068 <ENVELOPE[travel-secret-key](store(TravelData))>, and receives a travelerId in return in operation 1070 <travelerId>. The travelerId along with the travel-secret-key is then passed in a secure-envelope encrypted with the Traveler's public key to the Travelers' App 902 at operation 1073 <ENVELOP[Traveler](travelerId & travel-secret-key)>.

Lastly, the Agent 931 through the Agent App 932 is given a confirmation of the travel-token being issued by the Transportation Service Portal in another secure-envelope at operation 1075 <ENVELOP[Agent](Travel-confirmation)>. The Traveler App 902 saves both the travelerId and the travel-secure-key for future presentation. This TravelData is the authenticated travel-Token that is presented at future gates of entry.

Figure 11A:
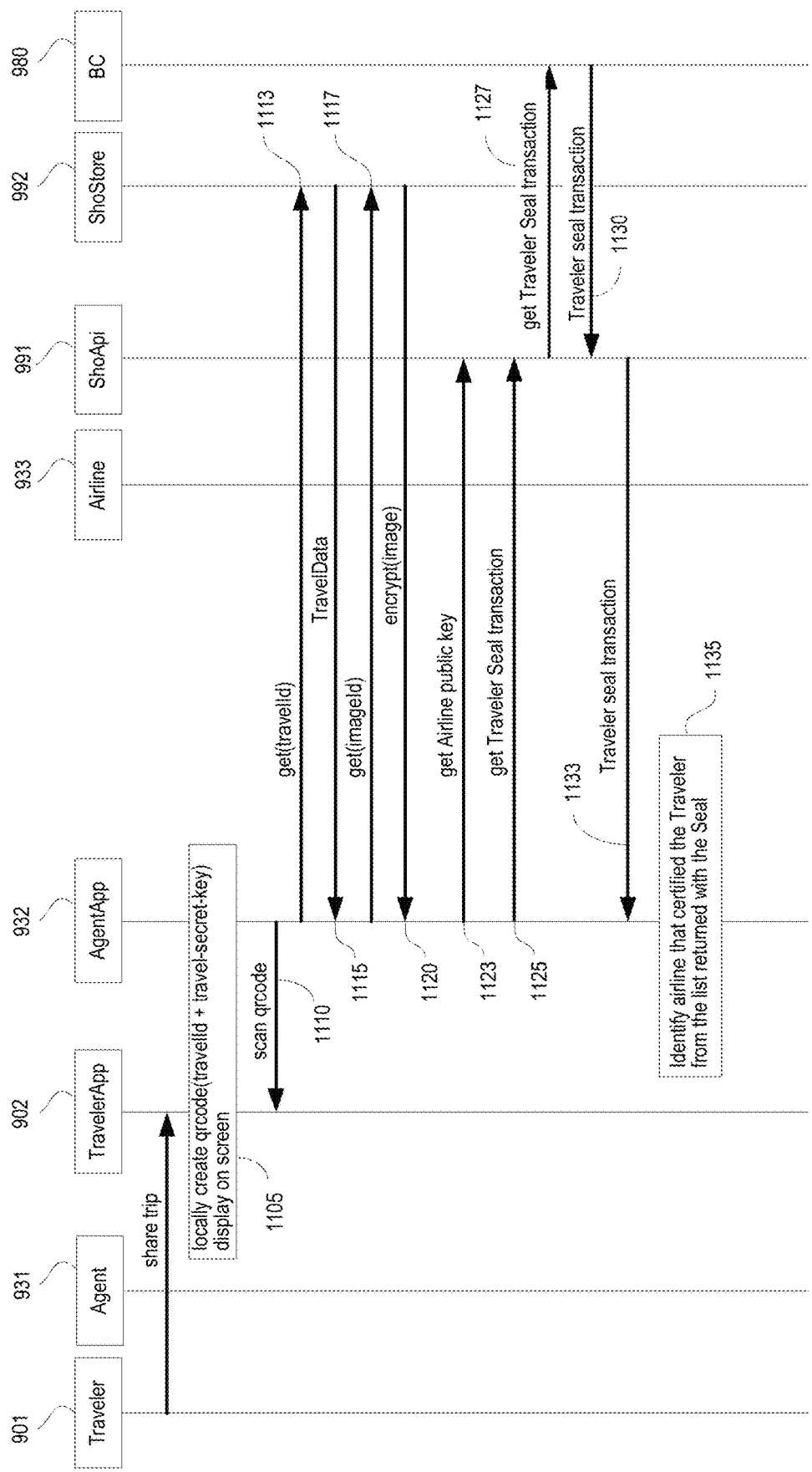
FIGS. 11A-11B are diagrams illustrating a method for checking a certification of a Traveler, such as by an Agent of a transportation service, in accordance with one embodiment of the present disclosure
Figure 11B:
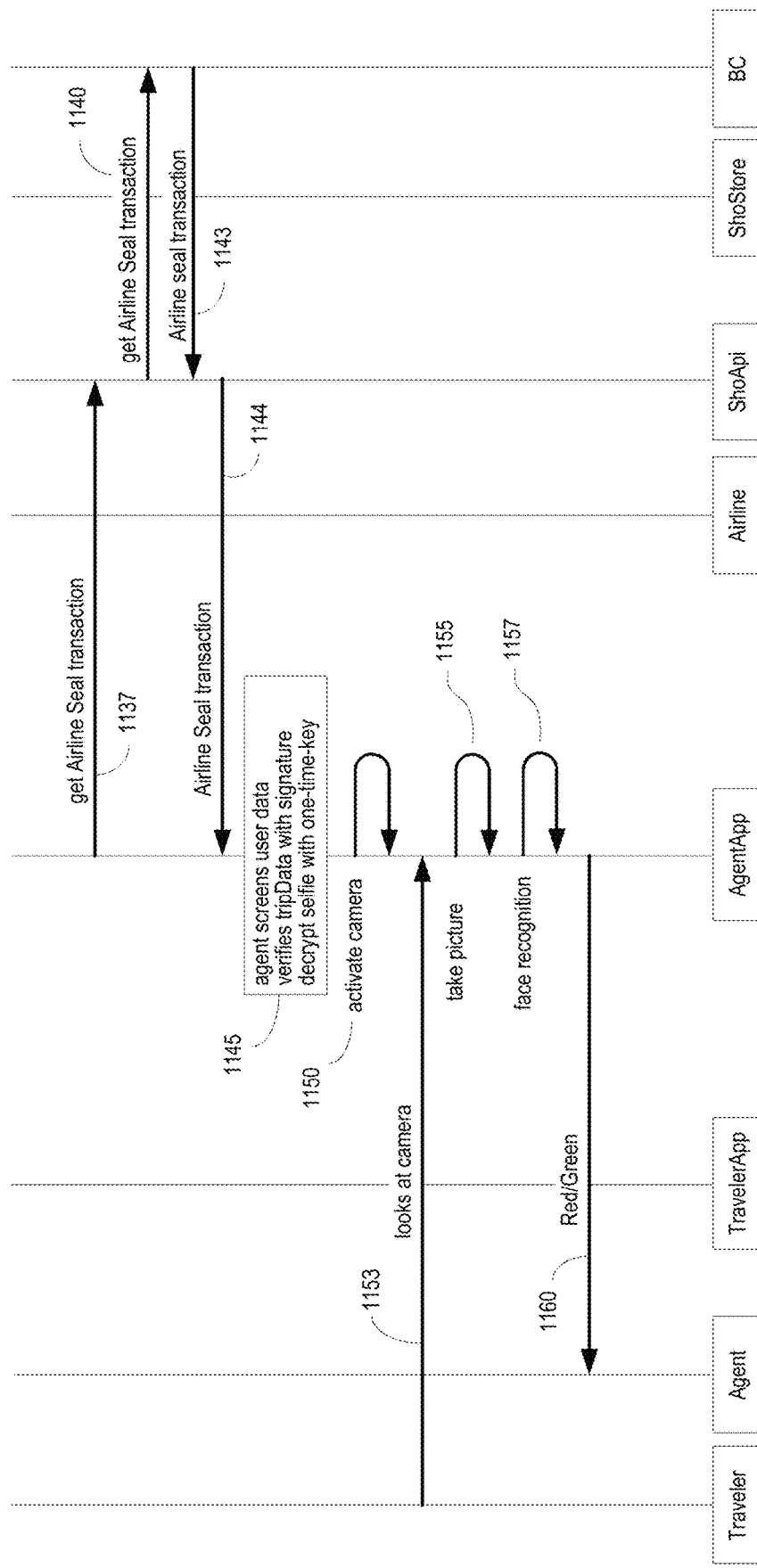

FIGS. 11A-11B are diagrams 1100 illustrating a method for checking a certification of a Traveler, such as by an Agent of a transportation service, in accordance with one embodiment of the present disclosure. For example, when the Traveler 901 has reached a gate of entry, a transportation-service Agent 931 needs to verify the user—the Traveler. A gate of entry can be entrance into a lounge, boarding on a plane, going to a travel agent desk for assistance or any other engagement where a transportation-service Agent 931 must validate the identity of the Traveler 901. The Agent 931 may or may not be from the same transportation service that originally checked the user in (Traveler 901) and certified her credentials. The gate of entry may or may not be in the same transportation-service station or even country that the Traveler 901 originated in. It is also assumed that the Traveler 901 may not have internet or Wi-Fi connectivity in some embodiments. Additionally, the transportation-service Agent does not necessarily have to be a real person and can be substituted with a self-service kiosk equipped with a camera or other similar systems.

The Traveler 901 is greeted by the Agent 931 and presents her identification and trip information by locally creating a QR Code at operation 1105 <locally create qrcode(travelId+travel-secret-key+image-secret-key) and display on screen>. The QR Code includes the travel-uniqueId, travelPassKey and the image-secret-key used to encrypt the selfie mentioned earlier. The Agents App scans the QR Code at operation 1110 <scan qrcode>. The Agent App 932 then requests the encrypted-TravelData from the ShoStore server 992 at operation 1113 <get(travelId)>, and once the data is received at operation 1115, the Agent App 932 decrypts it using the travelPassKey. The Agent App 932 then requests the encrypted-image pointed to by the imageId at operation 1117 <get(ImageId)>, returned in operation 1120 <encryption(image)>, and the Agent App 932 decrypts it with the image-secret-key.

Alternatively, if the Traveler App is equipped with other local transmission technology such as Bluetooth, NFC, streaming QR Codes (as described in a separate embodiment) or other similar forms of local transmission, it does not need to save and use the encrypted data that is stored on the ShoStore server as described above. In this scenario, the Traveler App would create a QR Code that requests the id of the Agent and its public key. The Agent App would scan the QR Code and respond back using local transmission technology with the requested information and it would also send an optional sessionID string to the Traveler. The Traveler would then create a secure_envelope that would include the travel token, Traveler's identification information (e.g., passport data), originally certified selfie-image and pointer to its seal and certification records on the blockchain and the optional sessionID. This secure_envelope would be digitally signed by the Traveler's private key and encrypted with the public key of the Agent. The secure_envelope is then transmitted to the Agent using local transmission technology. The Agent App decrypts the secure_envelope using its private key and begins the validation process of the Travelers' data.

The Agent App then retrieves the Seal transaction and related Certification records of the Traveler via ShoApi from the blockchain. In that manner, identity of the Transportation service that certified the Traveler 901 can be confirmed. In particular, the Agent App 932 retrieves the Transportation service's own Seal transaction from the blockchain via the ShoApi 991. The assumption is that the transportation service was previously certified by this Agents' transportation service as well and within the App, it can confirm that, which makes the originating transportation service a trusted and certified transportation service at operation 1135 <identify airline that certified the Traveler 901 from the data returned with the seal>. For example, the following operations are performed: operation 1123 <get Airline public key>; operation 1125 <get Traveler Seal transaction> a request to ShoApi 991 is made for the seal; operation 1127 a request is made for the seal to the blockchain 980 <get Traveler Seal transaction>; at operation 1130 the seal is returned to ShoApi 991 <Traveler Seal transaction>; at operation 1333 the seal is delivered to Agent App 932 <Traveler Seal transaction>; at operation 1137 the transportation service seal is requested <get Airline Seal transaction>; at operation 1140 the request is delivered to the blockchain <get Airline Seal transaction>; at operation 1143 the seal is delivered to ShoApi 991 <Airline Seal transaction>; at operation 1144 the seal is delivered to Agent App 932 <Airline Seal transaction>.

At this point, the Agent App 932 verifies that the travelData was authentically signed by the transportation service at operation 1145 <agent screens user data, verified tripData with signature, and decrypts selfie with one-time key>. The Agent App 932 confirms the travel-token and expiration date, and confirms that the Traveler image-data was certified by the transportation service as well.

The Agent App 932 then takes a picture of the Traveler using its own camera at operation 1150 <activate camera>; operation 1153 <traveler looks at camera>; and operation 1155 <take picture>. The Agent App 932 performs facial recognition comparing the newly taken picture and the certified image it had retrieved at operation 1157 <face recognition>. If all matches, the Traveler 901 is verified and a green signal is given for the Traveler to proceed at operation 1160 <Red/Green>, or red if the Traveler 901 is not verified.

Figure 12A:
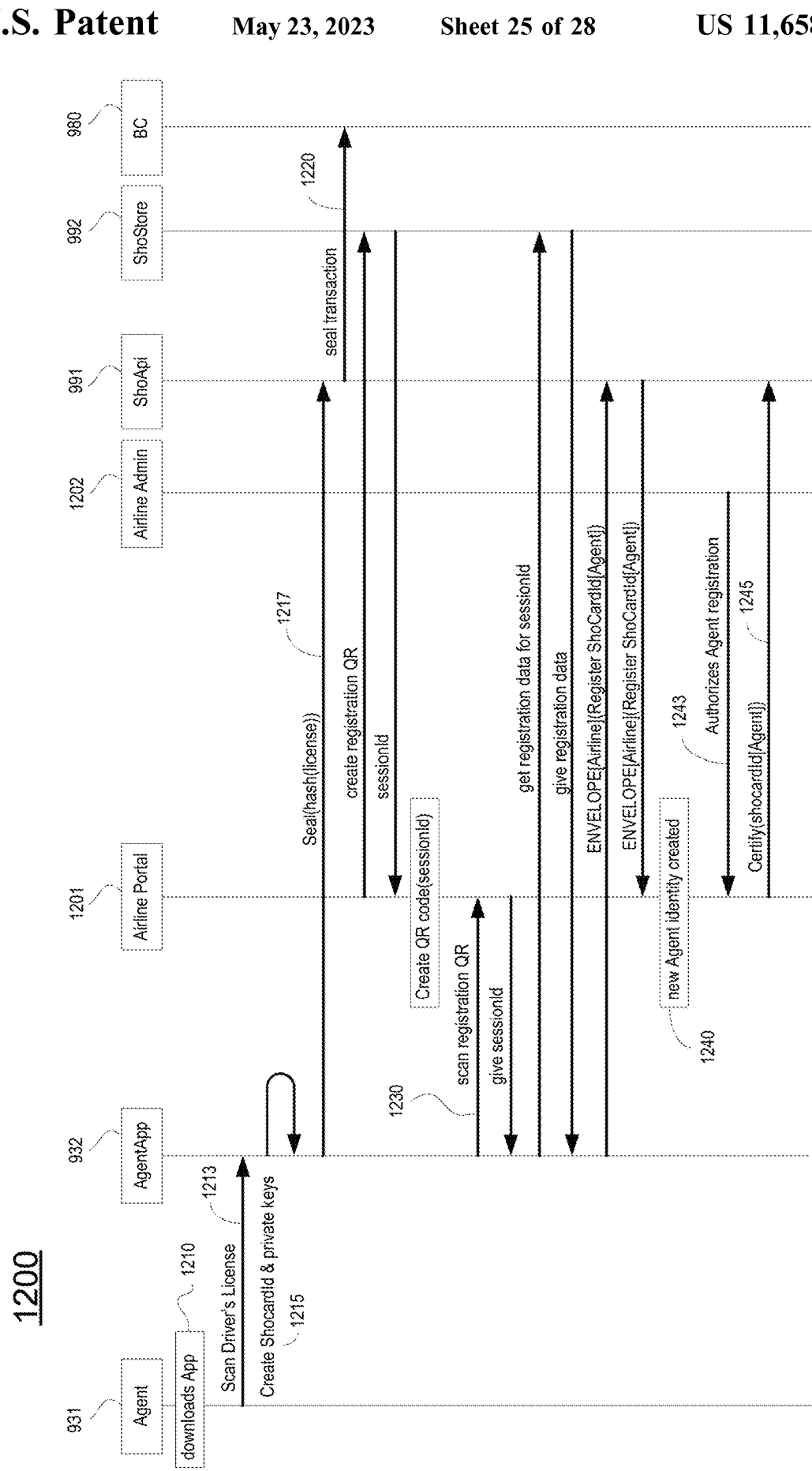
FIGS. 12A-12B are diagrams illustrating a method for registering an Agent of a transportation service and logging in the Agent, in accordance with one embodiment of the present disclosure.
Figure 12B:
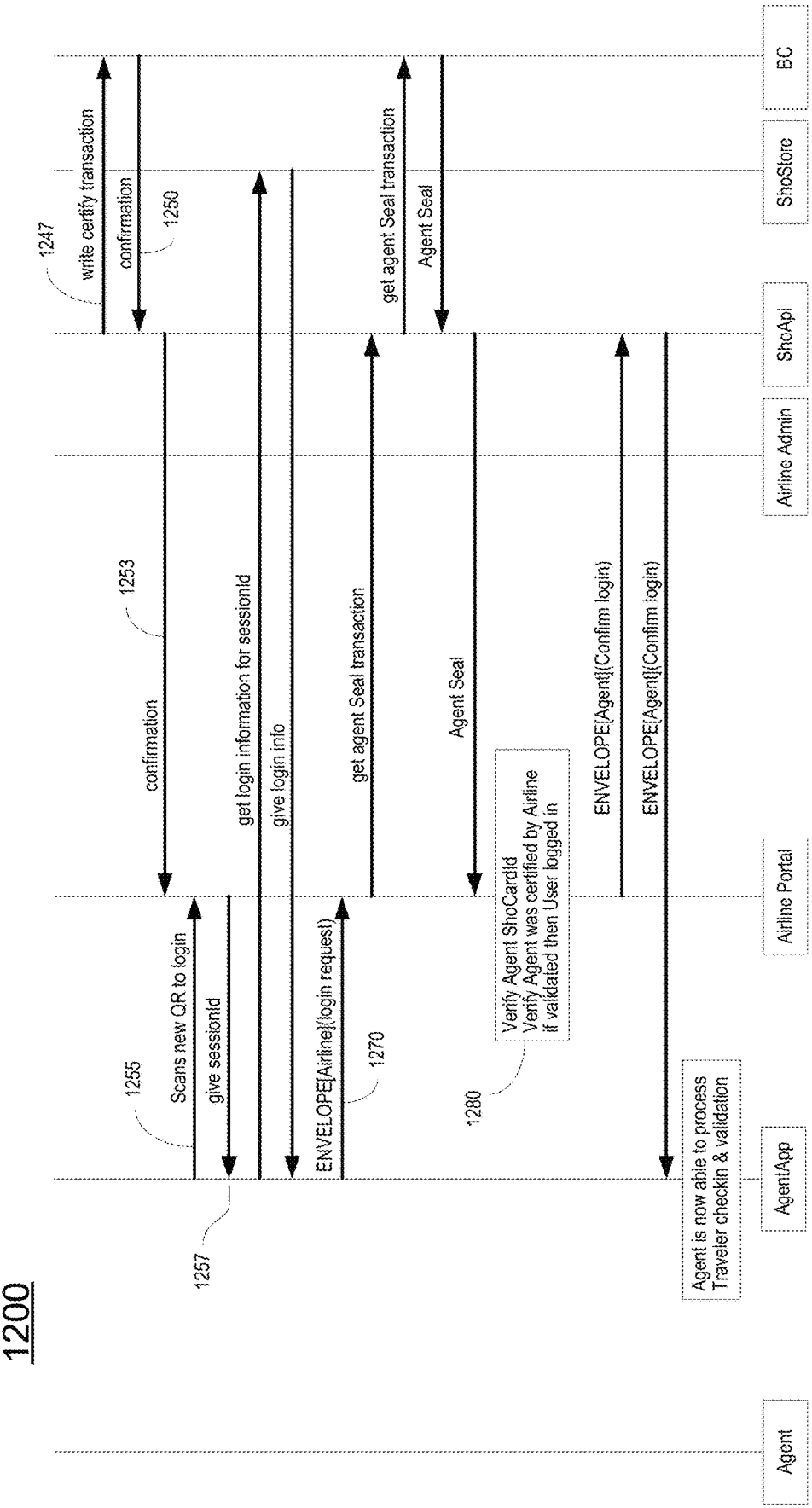

FIGS. 12A-12B are diagrams 1200 illustrating a method for registering an Agent 931 of a transportation service and logging in the Agent, in accordance with one embodiment of the present disclosure. In this use case, the transportation-service Agent 931 has two functions. The Agent checks-in a new Traveler 901 and provides her with a travel-Token. The same or a different Agent later checks the identity of that Traveler 901 and the travel-Token, which is issued to grant permission to proceed through various gates of entry. For purposes of illustration, the Agent is referred to with reference number 931, and in this diagram can be the same agent or two different agents in diagram 1200. In order to perform these functions, the Agent 931 must download the Agent App 932, have it registered with the transportation service and have a logged in session.

In particular, the Agent 931 first downloads the Agent App 932 at operation 1210 <downloads App>. To setup the App 932, the Agent 931 scans her Driver's License at operation 1213 <Scan Driver's License>. Then the Agent App 932 creates a ShoStoreId for that Agent along with a new set of private/public keys for the Agent at operation 1215 <Create ShoCardId & private keys>. The Agent App 932 hashes each field of the Agent's identification and digitally signs it using its private-key. The Agent App 932 then sends a request to the ShoApi 991 to Seal the record at operation 1217 <Seal (hash(license))>. ShoApi 991 forwards the request to perform a seal transaction to the blockchain 980 at operation 1220 <seal transaction>.

At this point, the Agent is able to register with the Transportation Service Portal. To do so, on the Transportation Service Portal's registration page, the Agent App 932 is used to scan the registration-QR code at operation 1230 <Scan registration QR>, where the portal 1201 creates a new Agent identity at operation 1240 <new Agent identity created>. The Transportation Service Portal 1201 requests the Seal transaction of the Agent from the blockchain through ShoApi and validates the information against the employee record database it has in order to ensure this is a valid Agent of the transportation service. If all is valid a record of this new Agent is created for the transportation service Admin to authorize.

Since this is a new Agent 931 being added to the system, a Transportation-service Admin 1202 must authorize the Agent registration through the portal at operation 1243 <authorizes Agent registration>. This process is done through a different interface on the portal visible only to the Admin 1202. Once the Agent 931 is authorized, a Certify request of the Agent's ShoStoreId is sent to the blockchain via the ShoApi at the following operations: operation 1245 <Certify(shocardId[Agent])>; operation 1247 <write certify transaction>; operation 1250 <confirmation> confirmation certification returned to ShoApi 991; operation 1253 <confirmation> confirmation certification returned to airline portal 1201.

The registration process is a one-time event per employee. Now the Agent 932 is able to login to the Transportation Service Portal 1201. To do so, the Agent 932 scans a new QR on the login page at operation 1255 <Scans new QR code to login>. The Agent App 932 is given a session ID at operation 1257 <give sessionId>. The Agent App 932 uses the sessionId to send a secure Envelope to the Transportation Service Portal in order to login to the portal at operation 1270 <ENVELOPE[Airline](login request)>. The Transportation Service Portal validates that login request against the Agent's sealed and certified records on the blockchain and ultimately logs the Agent in if everything is validated at operation 1280 <verify Agent ShoCardId; verify Agent was certified by Airline; if validated then user logged in>. The Agent 931 is now able to perform Traveler operations until the Transportation Service Portal session expires or the Agent logs out.

In one embodiment, the Transportation Service Portal 1201 has a set of administrative capabilities and reporting. These functions may not be available to the Agents, but only to the administrators of the system (the Admin). When logged in as the Admin, the Transportation Service Portal 1201 may provide the following capabilities: view a list of Agents (logged in or not); create a list of actively logged in Agents; ability to disable an Agent; ability to remove an Agent; ability to approve newly registered Agents; Agent can logout via Agent App. In addition, the Transportation Service Portal 1201 may be configured to provide real-time and historical reports on: agent registrations; agent logins and login session timers; and Travelers' Identity screening and certifications. In one embodiment, the Transportation Service Portal 1201 might be a Ruby on Rails web application. Further, each transportation service has its own instance of the Transportation Service Portal 1201 in one embodiment. In another embodiment, the Transportation Service Portal 1201 might be deployed in the cloud (Heroku/Amazon) and operated by the identity-management service ("ShoStore" also called "ShoCard") Traveler's App. In one embodiment, the Traveler App might be an iOS based App designed to run on iPhone 5 or higher model. In another embodiment, each traveler is to be equipped with a new instance of the Traveler App. Further, the Agent App might be an iOS based App, wherein each Agent is to be equipped with a new instance of the Agent App.

Third Party Certification of Custom Name/Value Pairs

Figure 13:
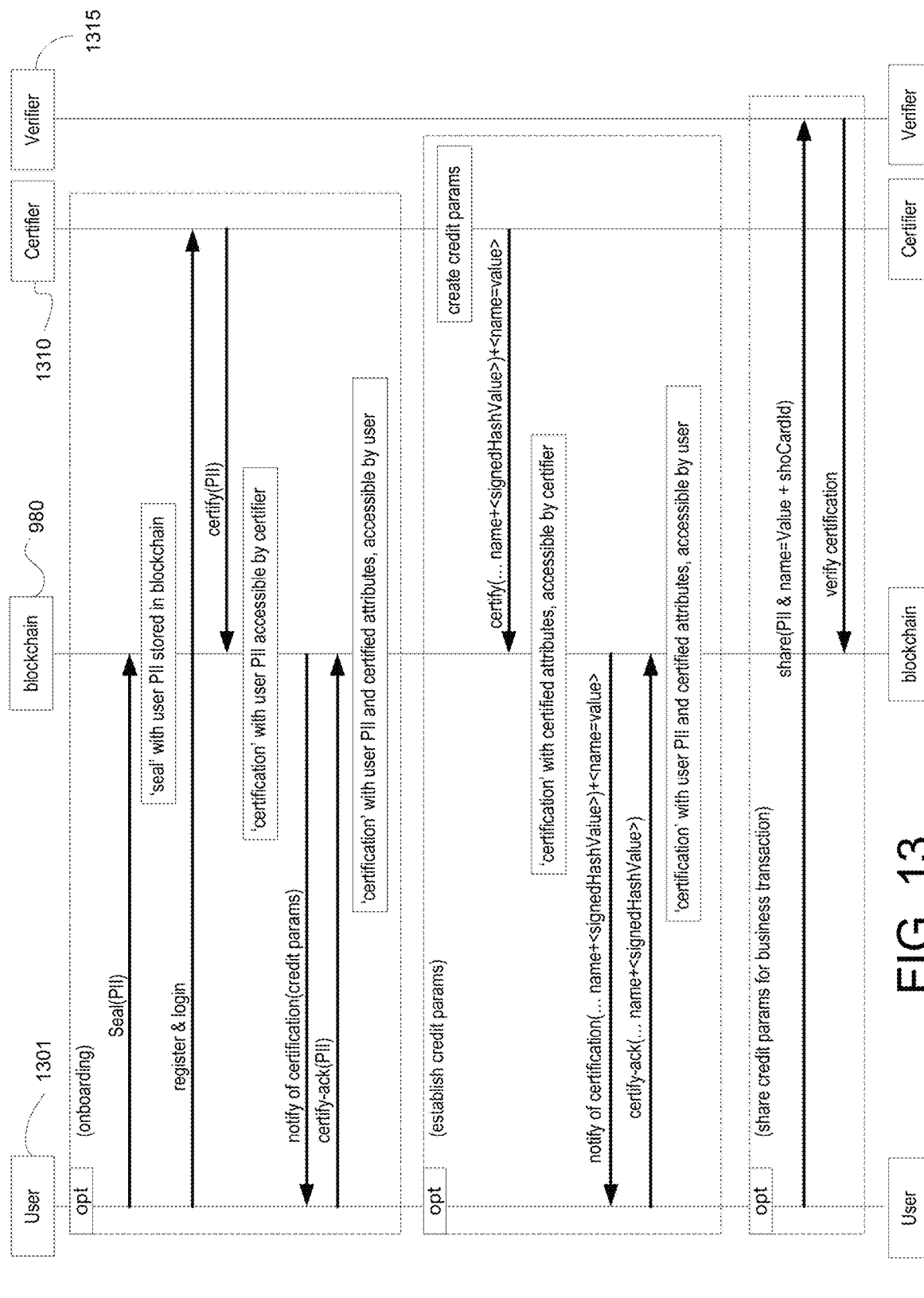
FIG. 13 is a diagram illustrating a method for performing third party certification of custom name/value pairs, in accordance with one embodiment of the present disclosure.

FIG. 13 is a diagram 1300 illustrating a method for performing third party certification of custom name/value pairs, in accordance with one embodiment of the present disclosure. A third party (herein Certifier) 1310 can provide a certification for a ShoCard User 1301 and provide specific "name=value" for that certification. The ShoCard user 1301 must first be known to the Certifier 1310 where at a minimum, the ShoCardId of the user has been exchanged. The Certifier 1310 may or may not have certified the ShoCardId previously.

The Certifier 1310 may then write a record to the blockchain 980 using its private-key encapsulating at least one of the following set of data (additional field types may be included as well): ShoCardId being certified; an optional transactionId that would point to a Sealed entry on the blockchain for that user; and a list of Names/Values.

The data for the transaction being written to the blockchain may or may not fit in a single transaction. If it does not fit, a hash of the entire data is made and the hash is written to the blockchain 980. The data is then stored on a different device that may or may not be shared. To access the certification record on the blockchain, the data associated with that hash may have to be accessed and verified that it matches the same hash. This process is an indirection that may or may not be necessary to the overall operation depending on the size of the data fields supported by the given blockchain 980.

There are two keys to the certification process. First, the record being written to the blockchain must be signed with the private-key of the Certifier 1310. This ensures that no one else is committing this transaction. If the transaction is written to something other than a blockchain, the data must be digitally signed and the digital signature must be submitted along with the data to be written, in one embodiment.

The second key item is the composition of the Name/Value fields. The Name field can be a text string describing the field type, in one embodiment. The Value however is a digital signature of the hash of the data associated with that field name. For example, if the name field is "Ranking" and the data associated with the field Ranking is the string "superior", the following transformation would take place:

1) The string "superior" would be hashed and a data stream would be produced from that hash: <hashValue>, wherein there are many algorithms that can be used for the hash such as, but not limited to SHA256; and 2) the Certifier then uses its private-key to digitally sign the <hashValue>, wherein the result is: <signedHashValue>.

The Value field would then be <signedHashValue>. The Name/Value fields can be passed in any number of methods, such as a JavaScript Object Notation (JSON) data structure, name=value strings with a separator, or any other structural form that passes the data.

The Certifier 1310 must pass the data to the blockchain, but also needs to pass a copy of the certification record being written along with original data to the ShoCard User 1301. The ShoCard user 1301 then has the opportunity to acknowledge the receipt and acceptance of the certification by also writing a copy of the certification record on the blockchain using its own private-key. In this case, the ShoCardId of the Certifier 1310 must also be written. Additionally, it must keep a copy of the clear-text name/value fields that is passed to it by the Certifier 1310 so it can refer to the data. This clear text data is maintained in the users' local device (e.g., his/her phone).

At this point, the ShoCard User 1301 can share the certification information with another party (herein referred to as Verifier 1315). To do so, the ShoCard User 1301 can pass the specific name/value fields in clear text that it intends to share and a reference to its own ShoCardId on the blockchain 980. It may also pass to the Verifier 1315 the address of the certification record it wrote on the blockchain 980. The Verifier 1315 can retrieve all transactions associated with the ShoCardId from the blockchain 980 and look for a match to the Certifiers' record. It then reads the fields in the certification record which includes the Certifier's own ShoCardId on the blockchain 980. This leads to the public key of the Certifier. Verifier 1315 then uses the Certifier's public key, the Value field for the specific Name fields given to it by the ShoCard User 1301 and the <signedHashValue> for that same exact field in the certification record to verify that the field was signed by the Certifier 1310. If it is signed by the Certifier 1310, the Verifier 1315 can be assured that the Value given to it is authentic so long as the Verifier 1315 trusts who the Certifier is. At a minimum, it can tell that the Certifier 1310 was indeed the person or entity that signed this certification for the Value.

A certification may also include an expiration time in addition to the fields stated above. The expiration time is basically a timestamp that indicates when this certification becomes invalid. If the Certifier 1310 then wishes, it can create a new Certification with a new expiration. Removing the expiration means the certification does not expire and would have to be explicitly cancelled.

If the Certifier 1310 wants to cancel the certification, it may write a new record that points to the prior certification record and identify it as a cancel-certification. It would also notify the ShoCard User 1301 so that it too can be aware of the cancellation. It may also update an older certification in a similar way where it would point to the older certification record and the data passed to the user. The linking of the cancel-certification record or an update are done in clear text so that any user can tell if the state of the certification has been modified (i.e., updated or cancelled) by searching other records that may point back to it.

Figure 14:
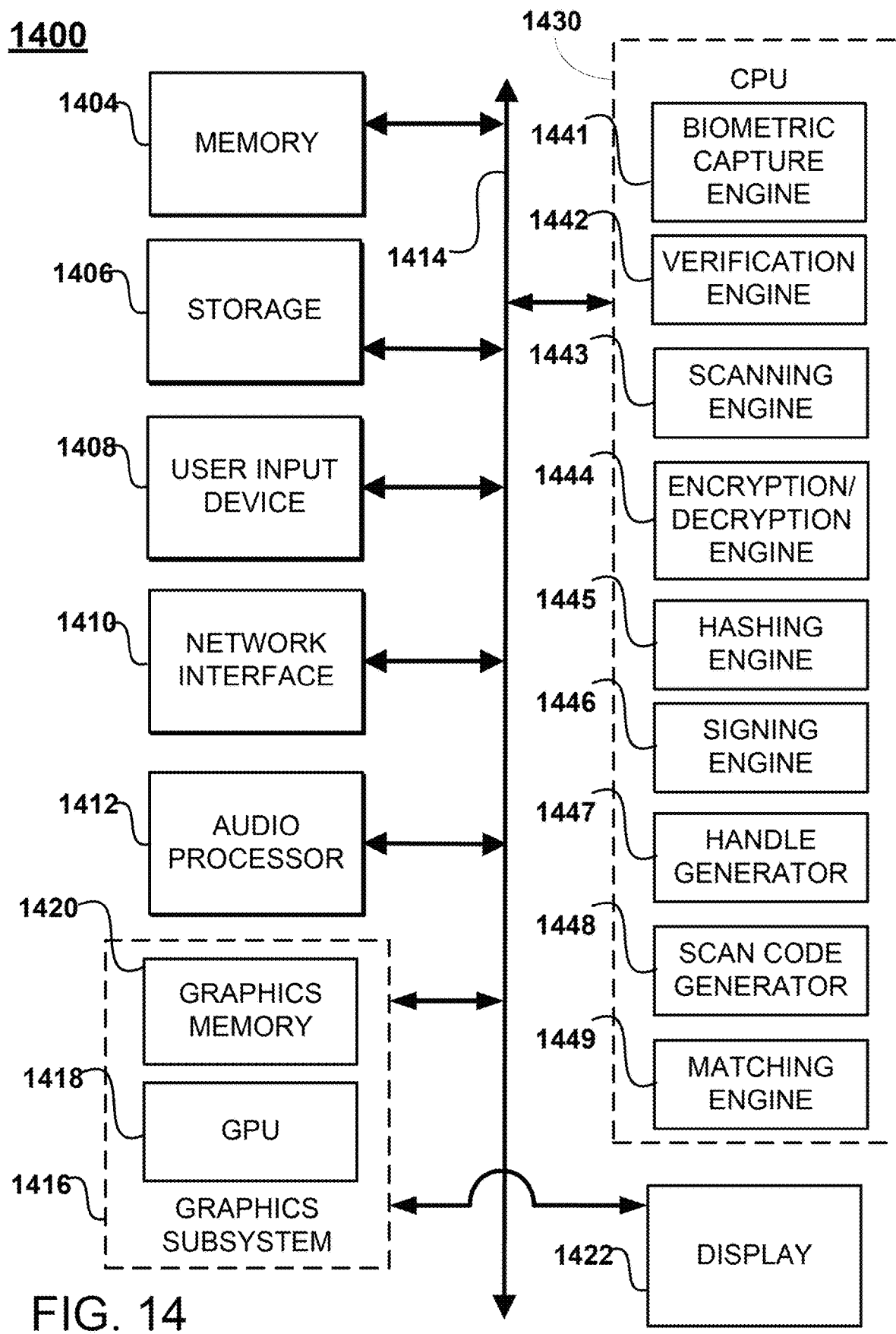
FIG. 14 illustrates components of an example device that can be used to perform aspects of the various embodiments of the present disclosure.

FIG. 14 illustrates components of an example device that can be used to perform aspects of the various embodiments of the present disclosure. For example, FIG. 14 illustrates an exemplary hardware system suitable for implementing a device in accordance with one embodiment. This block diagram illustrates a computer system 1400, such as a personal computer, video game console, personal digital assistant, or other digital device, suitable for practicing an embodiment of the invention. Computer system 1400 includes a central processing unit (CPU) 1402 for running software applications and optionally an operating system. CPU 1402 may be comprised of one or more homogeneous or heterogeneous processing cores.

In accordance with various embodiments, CPU 1402 is one or more general-purpose microprocessors having one or more processing cores. Further embodiments can be implemented using one or more CPUs with microprocessor architectures specifically adapted for highly parallel and computationally intensive applications. For example, CPU 1430 may be configured to include a biometric capture engine 1441 configured for capturing biometric data, a verification engine 1442 for performing verification logic (e.g., verifying data that is signed, registered, and/or certified), a scanning engine 1443 configured for scanning codes (e.g., QR code, scan code, PDF417 code, etc.), an encryption/decryption engine 1444 configured for encrypting and decrypting data using a public/private key pair, a hashing engine 1445 configured for hashing data using any one of a number of well known hashing algorithms, a signing engine 1446 configured for creating a digital signature using a private key, a handle generator 1447 configured for generating a session ID or envelope ID, a scan code generator 1448 for generating a scannable code (e.g., QR code, scan code, PDF417 code, etc.), an a comparator or matching engine 1449 configured for comparing newly captured biometric data and original biometric data.

Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to the computer system 1400, examples of which may include keyboards, mice, joysticks, touch pads, touch screens, still or video cameras, and/or microphones. Network interface 1410 allows computer system 1400 to communicate with other computer systems via an electronic communications network, and may include wired or wireless communication over local area networks and wide area networks such as the Internet. An audio processor 1412 is adapted to generate analog or digital audio output from instructions and/or data provided by the CPU 1402, memory 1404, and/or storage 1406. The components of computer system 1400, including CPU 1402, memory 1404, data storage 1406, user input devices 1408, network interface 1410, and audio processor 1412 are connected via one or more data buses 1422

A graphics subsystem 1414 is further connected with data bus 1422 and the components of the computer system 1400. The graphics subsystem 1414 includes a graphics processing unit (GPU) 1416 and graphics memory 1418. Graphics memory 1418 includes a display memory (e.g., a frame buffer) used for storing pixel data for each pixel of an output image. Graphics memory 1418 can be integrated in the same device as GPU 1416, connected as a separate device with GPU 1416, and/or implemented within memory 1404. Pixel data can be provided to graphics memory 1418 directly from the CPU 1402. Alternatively, CPU 1402 provides the GPU 1416 with data and/or instructions defining the desired output images, from which the GPU 1416 generates the pixel data of one or more output images. The data and/or instructions defining the desired output images can be stored in memory 1404 and/or graphics memory 1418. In an embodiment, the GPU 1416 includes 3D rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1414 periodically outputs pixel data for an image from graphics memory 1418 to be displayed on display device 1422. Display device 1422 can be any device capable of displaying visual information in response to a signal from the computer system 1400, including CRT, LCD, plasma, and OLED displays. Computer system 1400 can provide the display device 1422 with an analog or digital signal.

Accordingly, embodiments of the present disclosure disclosing authenticated login, registration, call center validation, and biometric authentication of a user have been described. While specific embodiments have been provided to demonstrate the use of registration, validation, and certification of data, these are described by way of example and not by way of limitation. Those skilled in the art having read the present disclosure will realize additional embodiments falling within the spirit and scope of the present disclosure.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
sending, from a server to a first device of a user, a first scannable code encoding an envelope identifier and a login challenge, the envelope identifier associated with a first envelope of data having a session identifier;
receiving, at the server and from a second device of the user, a challenge envelope of data, the challenge envelope of data including the session identifier, a user identifier, a shared-string, and a first digital signature defined by digitally signing a first hash value of the shared-string using a private key associated with the user;
verifying the first digital signature using a public key associated with the user;
extracting the shared-string from the challenge envelope of data;
generating, at the server, a challenge response including at least one of the shared-string or a second digital signature defined by digitally signing a second hash value of the shared-string using a private key of the server;
generating, at the server, a second scannable code encoding the challenge response;
sending, from the server to the first device of the user, the second scannable code;
receiving, at the server and from the second device of the user, a confirmation login request responding to the login challenge, the confirmation login request including a second envelope of data, the second envelope of data having the user identifier, the session identifier, and the shared-string;
authorizing the user after verifying the user identifier, the session identifier, and the shared-string from the second envelope of data; and establishing a communication session having the session identifier between the server and the first device of the user.

2. The method of claim 1, wherein:
the shared-string is a Globally Unique Identifier (GUID) generated by the second device of the user.

3. The method of claim 1, further comprising:
decrypting the challenge envelope using the private key of the server after the challenge envelope is encrypted by the second device of the user using a public key of the server.

4. The method of claim 1, further comprising:
receiving, at the server, a request for a login web page from the first device;
generating, at the server, the session identifier in response to the request for the login web page;
generating, at the server, the first envelope of data;
sending, from the server, the first envelope of data to an identity manager that generates the envelope identifier associated with the first envelope of data;
receiving, at the server, the envelope identifier from the identity manager; and
generating, at the server, the first scannable code and the login web page including the first scannable code.

5. The method of claim 1, wherein the first scannable code encodes a public key of the server.

6. The method of claim 1, wherein the first scannable code or the second scannable code includes at least one of a QR code, a bar code, or a PDF417 code.

7. The method of claim 1, wherein:
the verifying the session identifier includes determining that the session identifier in the confirmation login request is valid when it matches the session identifier in the first envelope of data.

8. The method of claim 1, wherein:
the verifying the user identifier includes certifying the user using the user identifier and a certification seal included in the second envelope of data.

9. The method of claim 1, wherein:
the second envelope of data includes a third digital signature defined by digitally signing a hash value of the user identifier, the session identifier, and the shared-string using the private key associated with the user,
the authorizing the user includes verifying the third digital signature.

10. The method of claim 1, further comprising:
sending, from the server to the second device of the user, a unique challenge string;
receiving, at the server from the second device, a third digital signature defined by digitally signing a hash value of user data using the private key associated with the user, the user data including newly-captured biometric data of the user, the unique challenge string, and a certification seal of original biometric data; and
the authorizing the user includes comparing a hash value of the newly-captured biometric data with a hash value of the original biometric data retrieved based on the certification seal of the original biometric data.

11. An apparatus, comprising:
a memory; and
a processor operatively coupled with the memory, the processor configured to:
send, from a server to a first device of a user, a scannable code encoding an envelope identifier and a login challenge, the envelope identifier associated with a first envelope of data having a session identifier;
receive, at the server and from a second device of a user, a challenge envelope of data, the challenge envelope of data including the session identifier, a digital signature defined by digitally signing a hash value of newly-captured biometric data of the user using a private key of the user, and a certification seal of original biometric data of the user, and;
verify the digital signature using a public key of the user;
retrieve a hash value of the original biometric data from a distributed ledger based on the certification seal of the original biometric data;
compare the hash value of the newly-captured biometric data with the hash value of the original biometric data;
authorize the user upon successful verification of the hash value of the newly-captured biometric data with the hash value of the original biometric data; and
establish a communication session having the session identifier between the server and the first device of the user.

12. The apparatus of claim 11, wherein:
the original biometric data is at least one of a fingerprint identification or a facial image.

13. The apparatus of claim 11, wherein:
the challenge envelope of data includes a shared-string and a first digital signature defined by digitally signing a first hash value of the shared-string generated by the second device of the user;
the processor is further configured to:
extract the shared-string from the challenge envelope of data,
generate, at the server, a challenge response including at least one of the shared-string or a second digital signature defined by digitally signing a second hash value of the shared-string using a private key of the server,
generate, at the server, a second scannable code including the challenge response;
send, from the server to the first device of the user, the second scannable code;
receive, at the server and from the second device of the user, a confirmation login request responding to the login challenge, the confirmation login request including a second envelope of data having a user identifier, the session identifier, and the shared-string,
the processor configured to authorize the user upon successful verification of the shared-string.

14. The apparatus of claim 13, wherein the shared-string is a Globally Unique Identifier (GUID) generated by the second device of the user.

15. The apparatus of claim 13, wherein:
the processor is further configured to decrypt the challenge envelope using the private key of the server after the challenge envelope is encrypted by the second device of the user using a public key of the server.

16. The apparatus of claim 11, wherein the scannable code includes the public key of the server.

17. The apparatus of claim 11, wherein the scannable code includes at least one of a QR code, a bar code, or a PDF417 code.

18. The apparatus of claim 13, wherein:
the second envelope of data includes a third digital signature defined by digitally signing a hash value of the user identifier, the session identifier, and the shared-string using the private key associated with the user, the processor is configured to authorize the user based on verifying the third digital signature.

19. A non-transitory processor-readable medium storing code representing instructions to be executed by a processor, the code comprising code to cause the processor to:

send, from a server to a first device of a user, a first scannable code encoding an envelope identifier and a login challenge, the envelope identifier associated with a first envelope of data having a session identifier;

receive, at the server and from a second device of the user, a challenge envelope of data, the challenge envelope of data including a session identifier, user data, a hash value of newly-captured biometric data of the user, and a first digital signature defined by digitally signing a hash value of user data using a private key of the user, the user data including a user identifier, a shared-string, the newly-captured biometric data of the user and a certification seal of original biometric data of the user;

retrieve a hash value of the original biometric data from a distributed ledger based on the certification seal of the original biometric data;

compare the hash value of the newly-captured biometric data with the hash value of the original biometric data;

authorize the user upon successful verification of the hash value of the newly-captured biometric data with the hash value of the original biometric data;

send, from the server to the first device of the user, a second scannable code encoding at least one of a shared-string or a second digital signature defined by digitally signing a hash value of the shared-string using a private key of the server;

receive, at the server and from the second device of the user, a confirmation login request responding to the login challenge, the confirmation login request including a second envelope of data having the user identifier, the session identifier, and the shared-string;

verify the shared-string by comparing the hash value of the shared-string with a hash of the shared-string received with the confirmation login request;

authorize the user after successful verification of the shared-string; and establish a communication session having the session identifier between the server and the first device of the user.

20. The non-transitory processor-readable medium of claim 19, wherein:

the original biometric data is at least one of a fingerprint identification or a facial image.

21. The non-transitory processor-readable medium of claim 19, wherein the shared-string is a Globally Unique Identifier (GUID) generated by the second device of the user.

* * * * *